United States Patent
Geppert et al.

(10) Patent No.: US 7,995,733 B2
(45) Date of Patent: Aug. 9, 2011

(54) TELECOMMUNICATIONS ENDPOINT FOR MANAGING MULTI-CONFERENCING

(75) Inventors: Birgit A. Geppert, Basking Ridge, NJ (US); Frank M. Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 887 days.

(21) Appl. No.: 11/904,666

(22) Filed: Sep. 28, 2007

(65) Prior Publication Data
US 2009/0086951 A1    Apr. 2, 2009

(51) Int. Cl.
*H04M 3/42*    (2006.01)
(52) U.S. Cl. .............. 379/204.01; 370/260; 709/204
(58) Field of Classification Search ............ 379/204.01, 379/202.01; 370/260; 709/204
See application file for complete search history.

(56) References Cited

U.S. PATENT DOCUMENTS
| | | | | |
|---|---|---|---|---|
| 7,865,180 B2 * | 1/2011 | Davis et al. | ............ | 455/416 |
| 2002/0078153 A1 * | 6/2002 | Chung et al. | ............ | 709/204 |
| 2004/0228463 A1 * | 11/2004 | Sauvage et al. | ............ | 379/202.01 |
| 2007/0133436 A1 * | 6/2007 | Provino et al. | ............ | 370/260 |
| 2007/0285503 A1 * | 12/2007 | Asthana et al. | ............ | 348/14.08 |

OTHER PUBLICATIONS

IPhone: Using Conference; Jul. 23, 2007. http:/support.apple.com/kb/TA38608?viewlocale=en_US.

* cited by examiner

*Primary Examiner* — Creighton Smith
(74) *Attorney, Agent, or Firm* — Cohen Pontani Lieberman & Pavane LLP

(57) ABSTRACT

An apparatus or endpoint device is disclosed for providing the capability to simultaneously manage multiple conference calls, move participants in the conference calls from one conference call to another and subdivide or join multiple conference calls together, and the like, wherein the apparatus or endpoint device provides a multi-conferencing capability that enables one or more teleconferencing participants to manage multiple teleconferences simultaneously. Each participant in the teleconference call manages their respective teleconference through their apparatus or endpoint device at their specific location by using it to adjust the teleconferencing topology, i.e., who should form what part of each specific teleconference call.

16 Claims, 67 Drawing Sheets

Multi-Conference Scenarios: Create

Helen

Helen conferences in Paul and Daniel.

Helen conferences in Paul and Daniel.

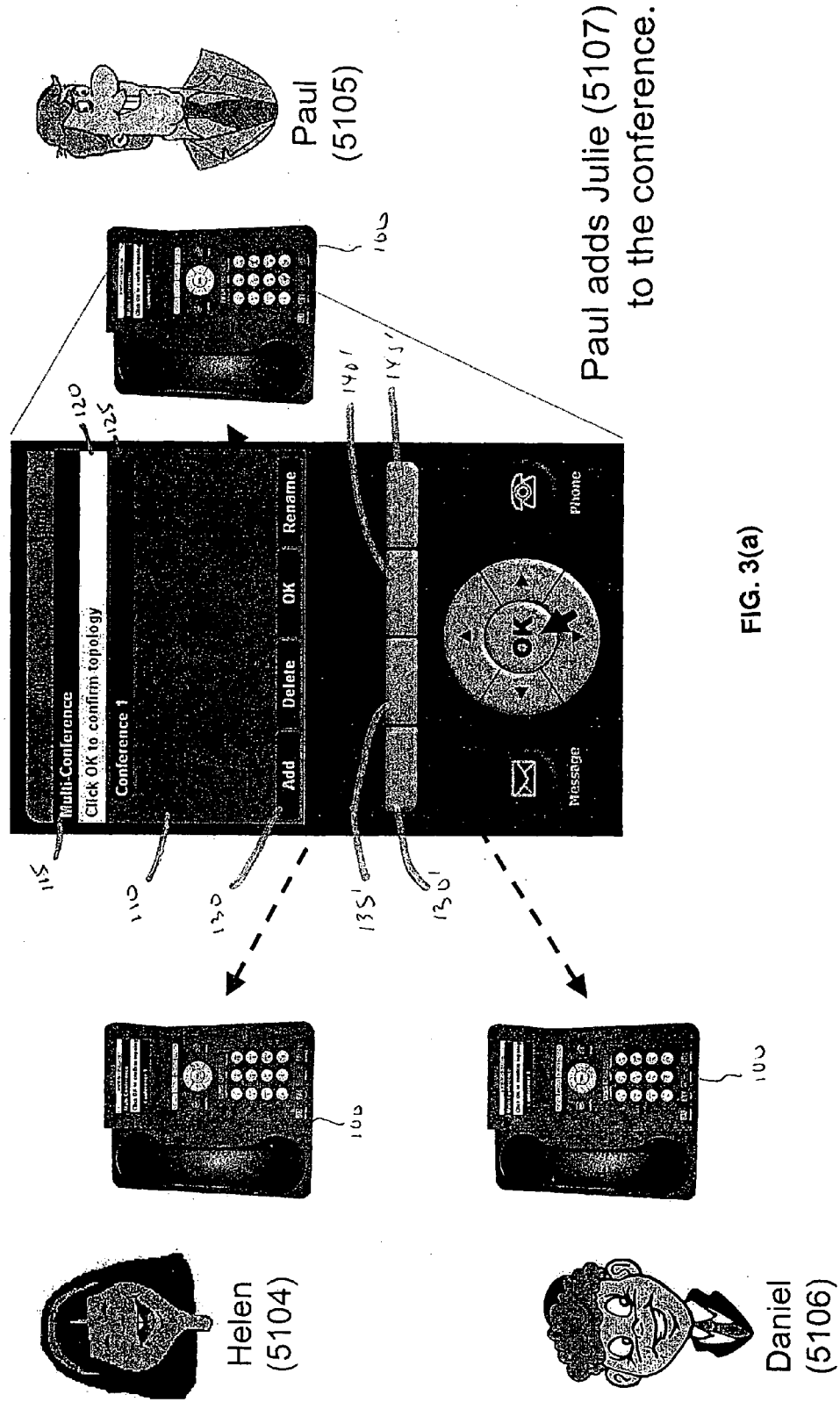

Multi-Conference Scenarios: Extended

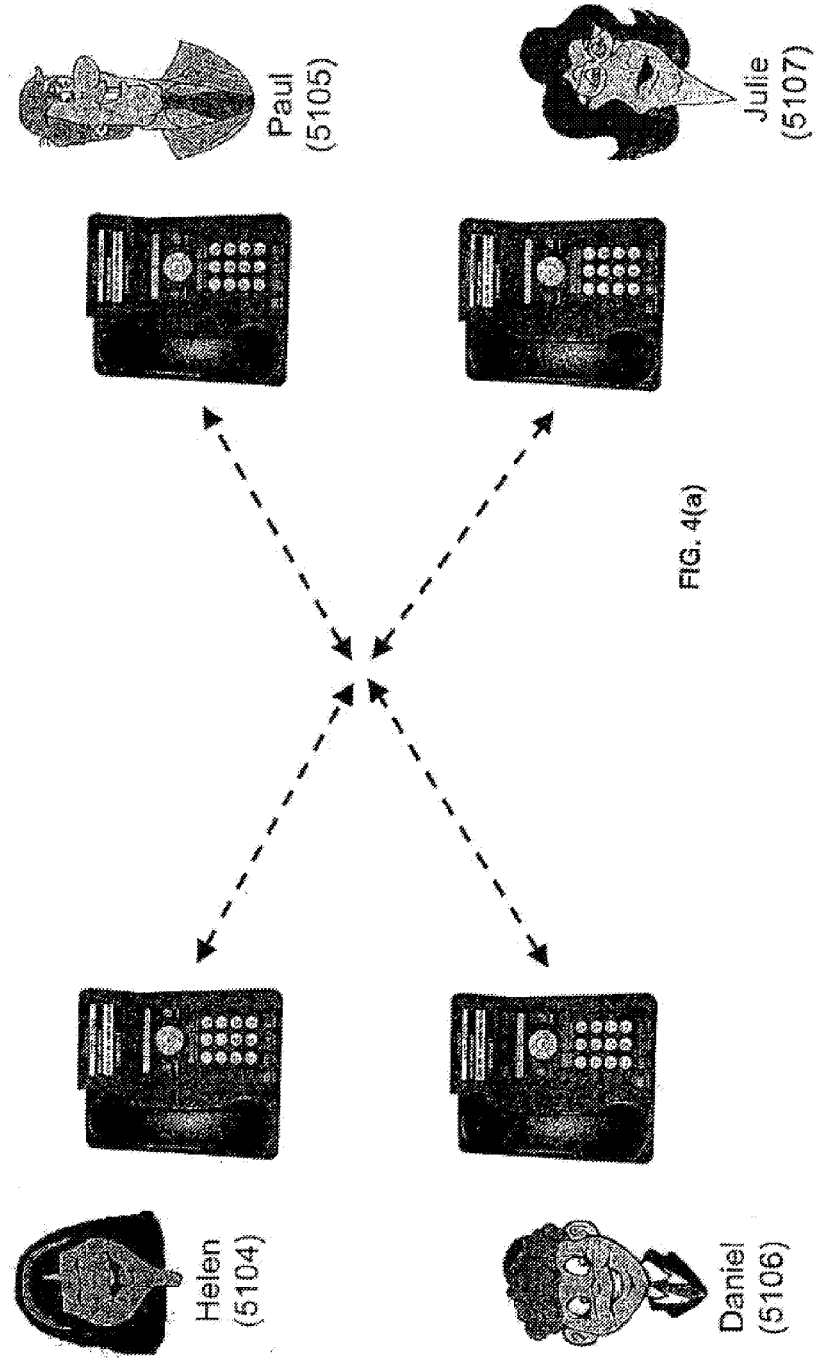

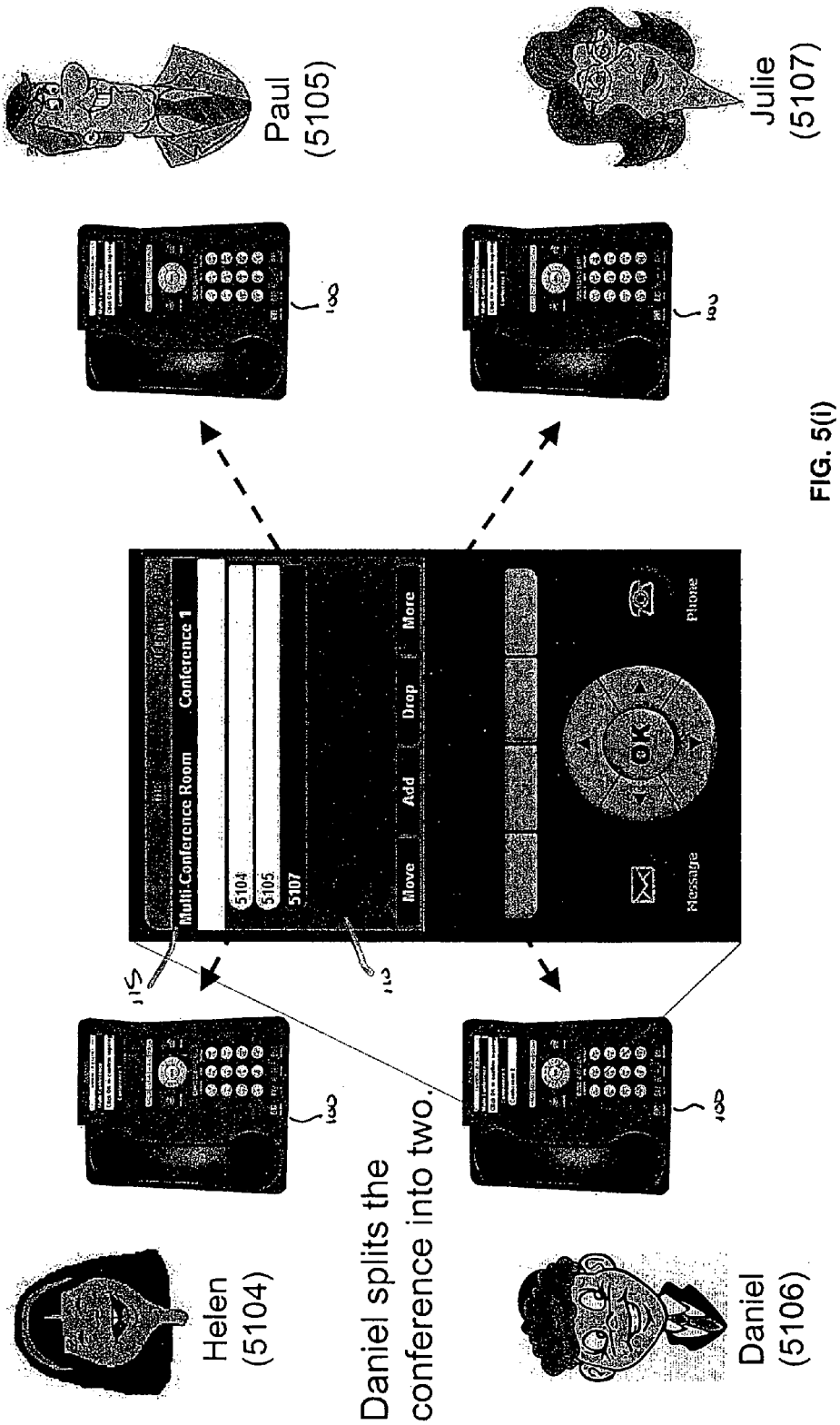
FIG. 5(i) Multi-Conference Scenarios: Split

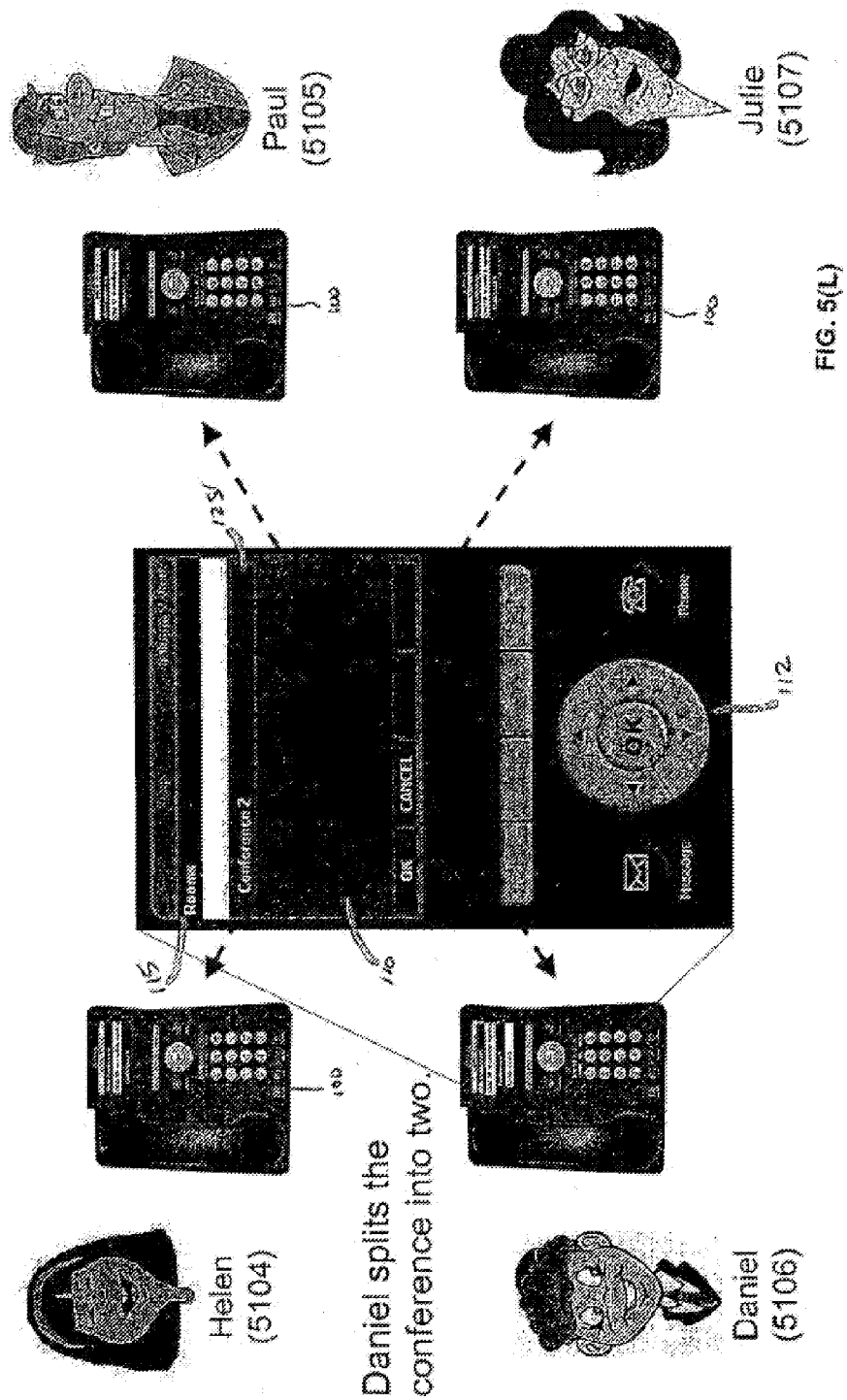

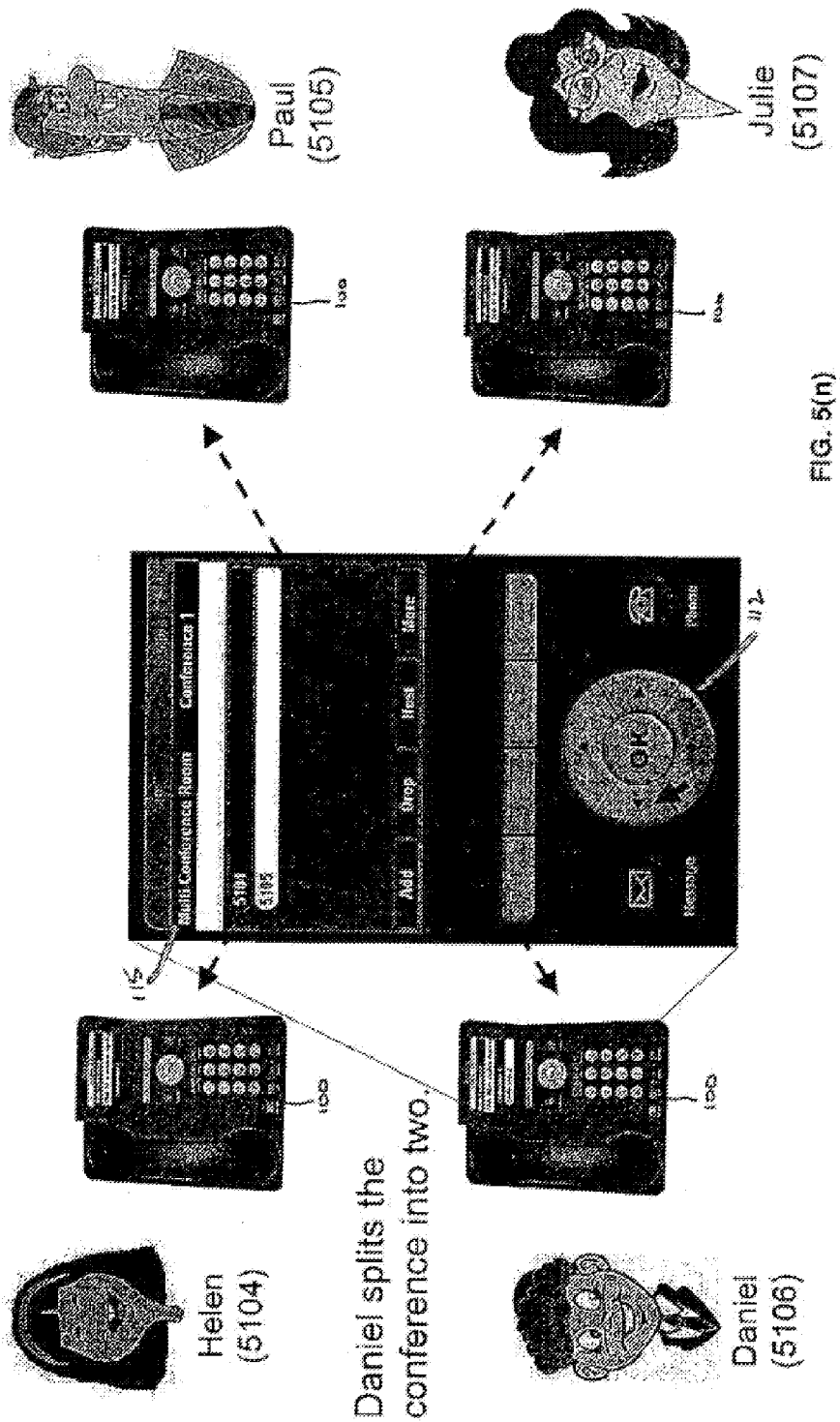

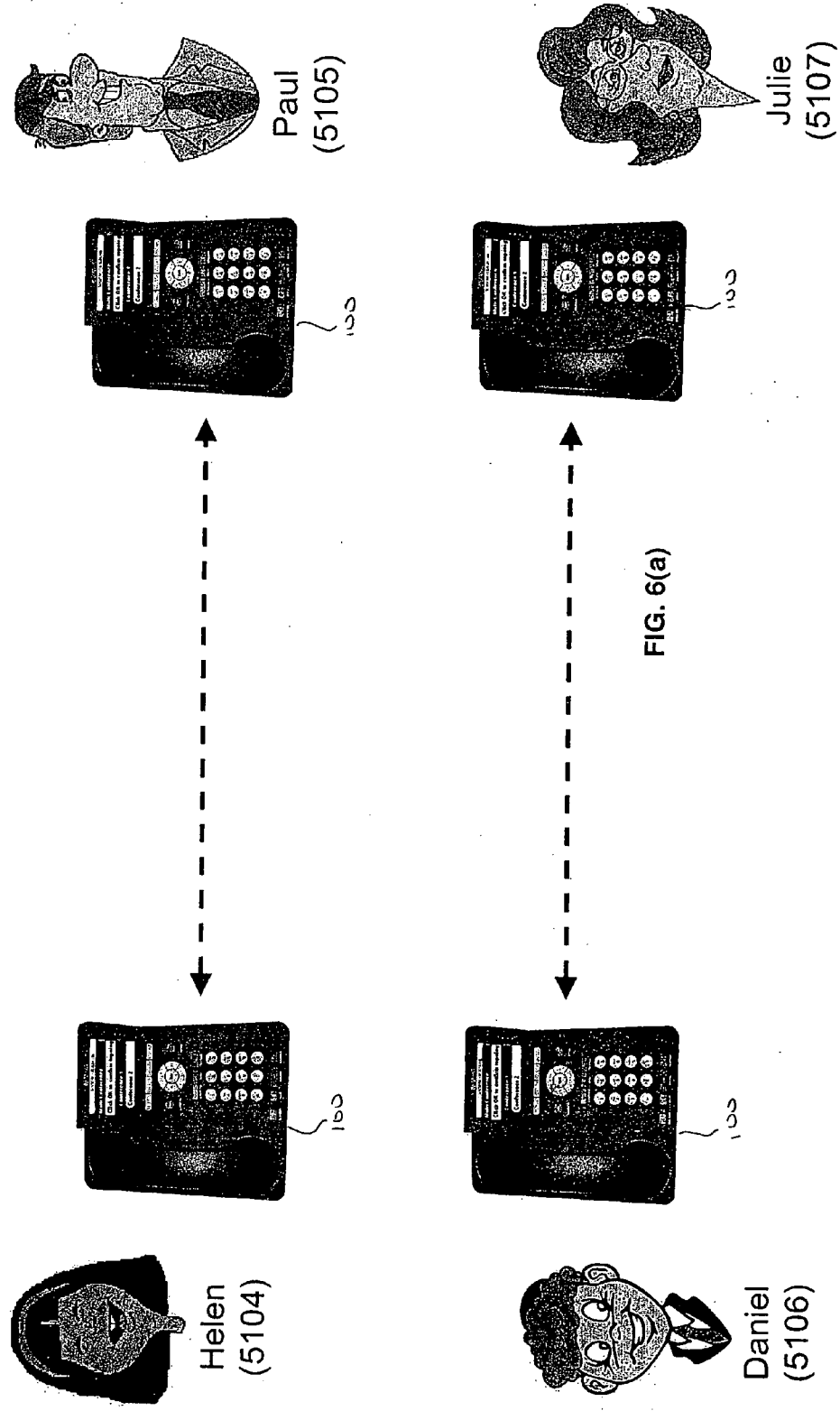

Multi-Conference Scenarios: Move

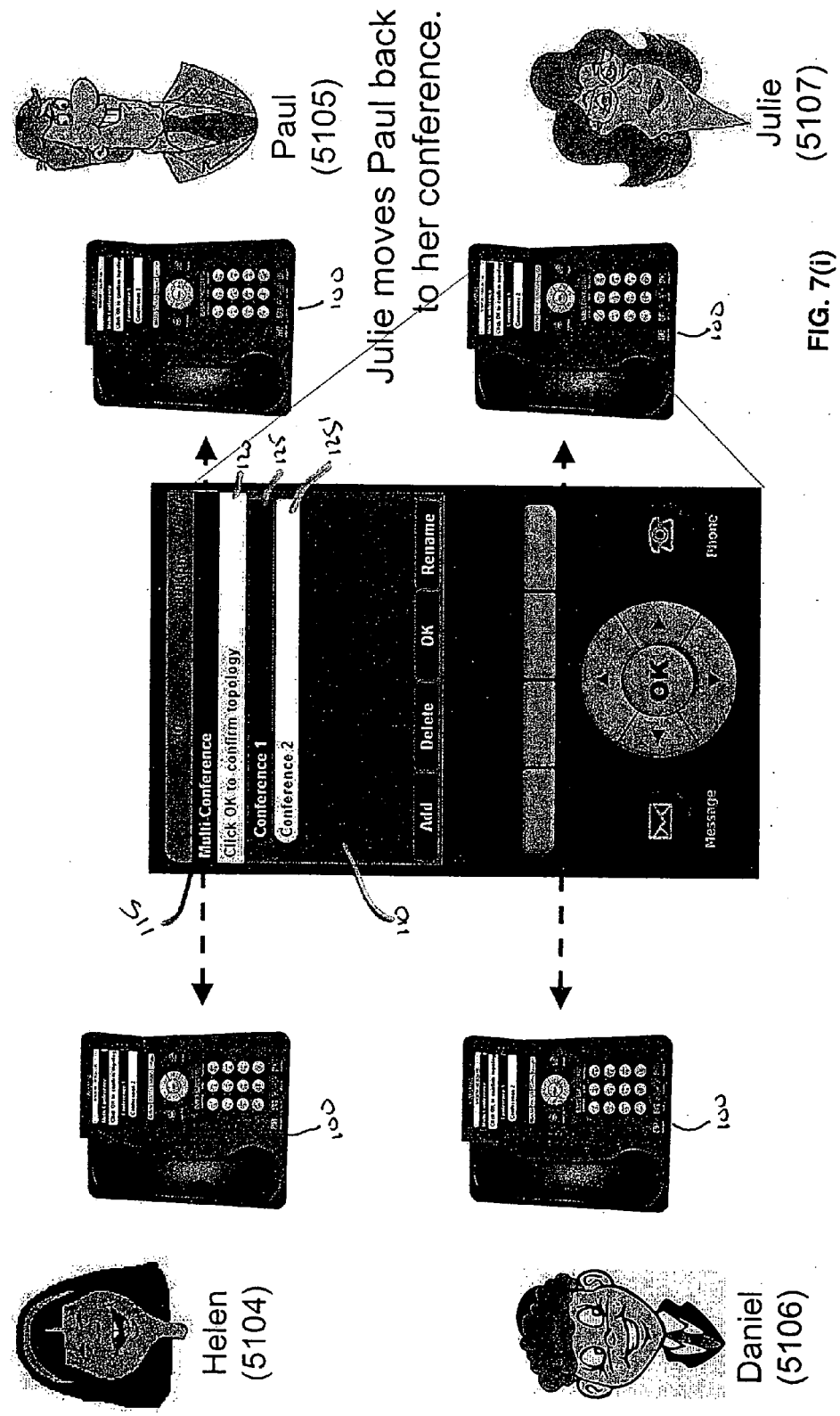

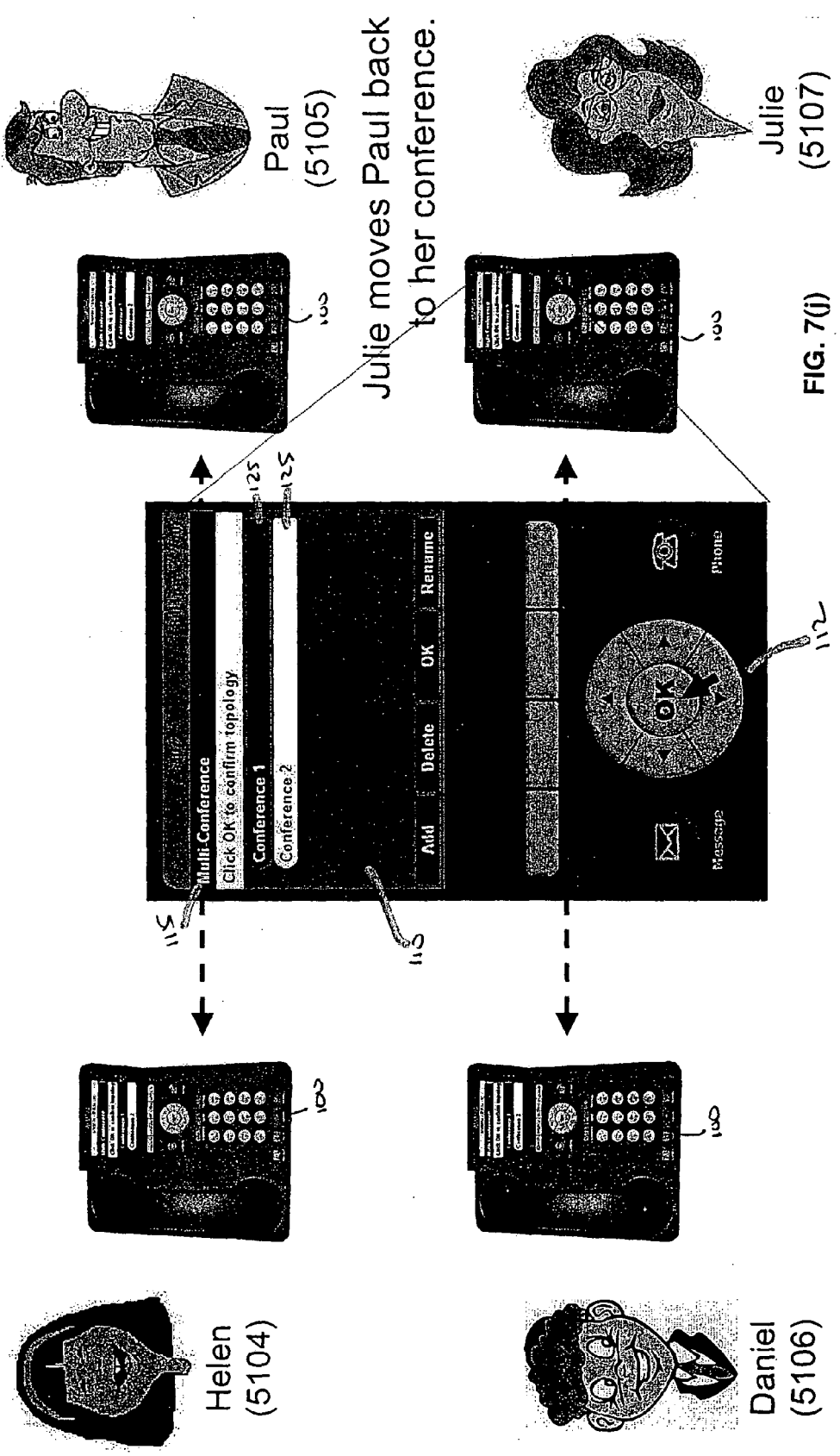

TELECOMMUNICATIONS ENDPOINT FOR MANAGING MULTI-CONFERENCING

BACKGROUND OF THE INVENTION

1. Field of the Invention

The present invention generally relates to the field of teleconferencing and, more particularly, to an apparatus or endpoint device for permitting conference call participants to simultaneously manage multiple conference calls.

2. Description of the Related Art

In a conventional teleconferencing system that utilizes a conference bridge, a group of people individually call the conference bridge assigned to the specific conference for a particular time slot and add themselves to the initial conference call. During the call, a specific participant can remove themselves from the conference bridge, and new participants are able to join the conference call that is currently in progress. When a new participant wishes to join the conference, the new participant will not be informed about who is currently at the bridge, i.e., the new participant will not be provided with the identity of the participants in the conference call. In addition, the conference call participants will not be provided with automatic updates with respect to who is currently participating in the ongoing conference call, i.e., who has joined or left the conference. The only notification that is currently provided is a nondescript audible alert.

If a participant wants to participate in a second conference call, the participant is required to "drop" from the first call and dial into the second conference call. Alternatively, the participant may switch to a second call via their phone (i.e., utilize the conventional call waiting feature) to access the second conference call, while remaining connected to the original conference. However, through all of the foregoing connection cycles, each call has a well-defined "life cycle", which involves a number of steps. First, the conference call is scheduled by a specific person, who then distributes the dial-in information to others who wish to participate in the conference call. Second, conference call participants call and add themselves to the conference bridge to participate in the conference call, and then add themselves to the conference call using the dial-in information provided in the distributed dial-in information. Next, the user places the call. Finally, participants in the conference call drop from the call or the allotted time for the call expires. In any event, the end of the conference call does eventually occur. In such a scenario, it is not possible to spontaneously extend the duration of the conference or to split up and create a sidebar conference between a subset of participants without having reserved an additional conference bridge prior to attempting to establish the sidebar conference or without needing to call the bridge operator for assistance with setting up the additional conference calls.

In other conventional systems, a caller is able to conference with several people by using his or her calling device as a local conference bridge. However, the number of participants in such a system is typically limited to no more than approximately six participants, where each participant must be added to the conference one after the other. In addition, the conference call itself is still "anchored" to a single, controlling calling device, i.e., the device being used as the bridge. In either case, the conference bridge paradigm is rigidly constrained to a situation in which people dial into the conference and from which people are "dropped" from the conference.

There are no known products that provide features and the ability to control conference calls that overcome the foregoing limitations of the above-described conventional systems. Accordingly, there is a need for an apparatus that provides the capability to simultaneously manage multiple conference calls from the endpoint, move participants in the conference calls from one conference call to another and subdivide or join multiple conference calls together.

SUMMARY OF THE INVENTION

An apparatus or endpoint device is disclosed for providing the capability to simultaneously manage multiple conference calls, move participants in the conference calls from one conference call to another and subdivide or join multiple conference calls together. In particular, the proposed apparatus or endpoint device provides a multi-conferencing capability that allows one or more teleconferencing participants to manage multiple teleconferences simultaneously. Here, each participant in the teleconference call manages their respective teleconference through their apparatus or endpoint device at their specific location by using it to adjust the teleconferencing topology, i.e., who should form what part of each specific teleconference call.

A participant seeking to initiate a conference call does so at his or her endpoint device by selecting a conference call identifier, where the identifier identifies a conference call to be created. The initiating participant then selects the participants to be associated with the particular call and confirms the selection. Upon confirmation of the selection, the conference call among the selected participants is established. In the preferred embodiment, the endpoint device is a graphical user interface (GUI) that comprises a telecommunications endpoint device that enables multi-conferencing in a desktop environment.

The endpoint device in accordance with one embodiment of the present invention provides symmetric control, in that any participant has at least some control over how the creation and evolution of the conference calls progress. By providing each participant with the capability to control the creation and evolution of a conference call, each participant is permitted to move freely from one conference call to another. That is, each participant at his or her endpoint device has the ability to "shape" their conference calls to suit their changing needs during the calls. In other words, each participant may split, merge, add, and delete one or more conference calls that may be in progress. In addition, each participant may re-add, re-drop, and remove participants of conferences calls to suit the needs of each of the participants.

The multi-conferencing capability of the present invention permits the management of multiple conferences simultaneously, as well as the splitting and merging of conference calls. In addition, symmetric control at the various participating endpoints is provided, as well as a smooth transition of conference participants from one call to another.

Other objects and features of the present invention will become apparent from the following detailed description considered in conjunction with the accompanying drawings. It is to be understood, however, that the drawings are exemplary and designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 3(a) thru 3(j) are exemplary illustrations of the display area of the apparatus or endpoint device provided to the users pursuant to the extension or addition of an additional participant to the conference call;

FIG. 4(a) thru 4 is an exemplary illustration of the display area of the apparatus or endpoint device provided to the users during the extended conference call;

FIG. 6(a) is an exemplary illustration of the display area of the apparatus or endpoint device provided to the users when the conference call is split into multiple conference calls;

FIG. 7(a) thru 7(k) are exemplary illustrations of the display area of the apparatus or endpoint device provided to the users pursuant to moving the participant into a new conference call that is created by dividing an existing conference call;

DETAILED DESCRIPTION OF THE EXEMPLARY EMBODIMENTS

An apparatus or endpoint device is disclosed for providing the capability to simultaneously manage multiple conference calls, move participants in the conference calls from one conference call to another and subdivide or join multiple conference calls together. In particular, the proposed inventive apparatus or endpoint device provides a multi-conferencing capability that allows one or more teleconferencing participants to manage multiple teleconferences simultaneously. Here, each participant in the teleconference call manages their respective teleconference through their apparatus or endpoint device at their specific location by using it to adjust the teleconferencing topology, i.e., who should form what part of each specific teleconference call.

In contrast to the previously discussed conventional systems for providing teleconferencing, the multi-conferencing capability provided by the apparatus or endpoint device in accordance with the invention, departs from the rigid conference bridge paradigm associated with such conventional systems. Instead, the multi-conferencing provided by the apparatus or endpoint device enables conference call participants to manage multiple conferences simultaneously. A participant seeking to initiate a conference call does so at his or her endpoint device by selecting a conference call identifier, where the identifier identifies a conference call to be created. The initiating participant then selects the participants to be associated with the particular call and confirms the selection. Upon confirmation of the selection, the conference call among the selected participants is established. In the preferred embodiment, the endpoint device is a graphical user interface (GUI) that comprises a telecommunications endpoint device which allows multi-conferencing in a desktop environment. In an embodiment, the endpoint device is alphanumeric based and implemented in a Spark-based environment, which is implemented in a peer-to-peer environment to provide interactive communication with the endpoint device or GUI. In alternative embodiments, the endpoint device or GUI is icon based.

The endpoint device of the present invention provides symmetric control, in that any participant has at least some control over how the creation and evolution of the conference calls progress. By providing each participant with the capability to control the creation and evolution of a conference call, each participant is permitted to move freely from one conference call to another. That is, each participant at his or her endpoint device has the ability to "shape" their conference calls to suit their changing needs during the calls. In other words, each participant may split, merge, add, and delete one or more conference calls that may be in progress. In addition, each participant may re-add, re-drop, and remove participants of conferences calls to suit the needs of each of the participants.

Figure 1:
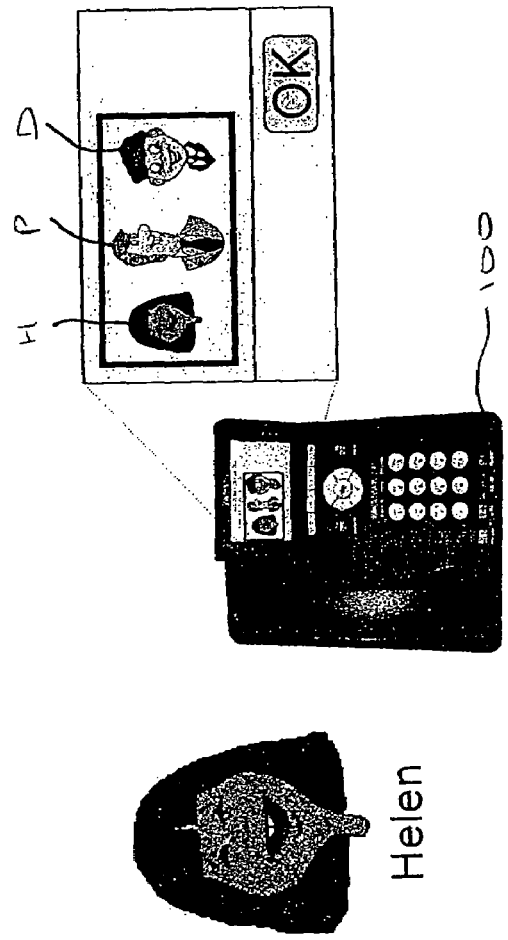
FIG. 1 is an exemplary graphical diagram illustrating the implementation of the apparatus or endpoint device in accordance with an embodiment of the invention pursuant to creating a simultaneous management of multiple conference calls.

FIG. 1 is an exemplary graphical diagram illustrating implementation of the apparatus or endpoint device in accordance with an embodiment of the invention. In accordance with the exemplary embodiment, a conference call is established among a team of employees of a company. Such a conference call can be established in the manner disclosed in co-pending U.S. application Ser. No. 11/904,716, titled Multi-Conferencing Capability, filed Sep. 28, 2007, the contents of which are incorporated herein in its entirety.

With reference to FIG. 1, a first participant H at a first endpoint seeks to create a first conference call that involves a second participant P and a third participant D to discuss a new product, for example. Using her apparatus or endpoint device 100, which shows potential participants P and D, participant H selects the first conference call and participants P and D, and creates the call. In one embodiment, the apparatus or endpoint device comprises a Graphical User Interface (GUI).

Figure 1A:
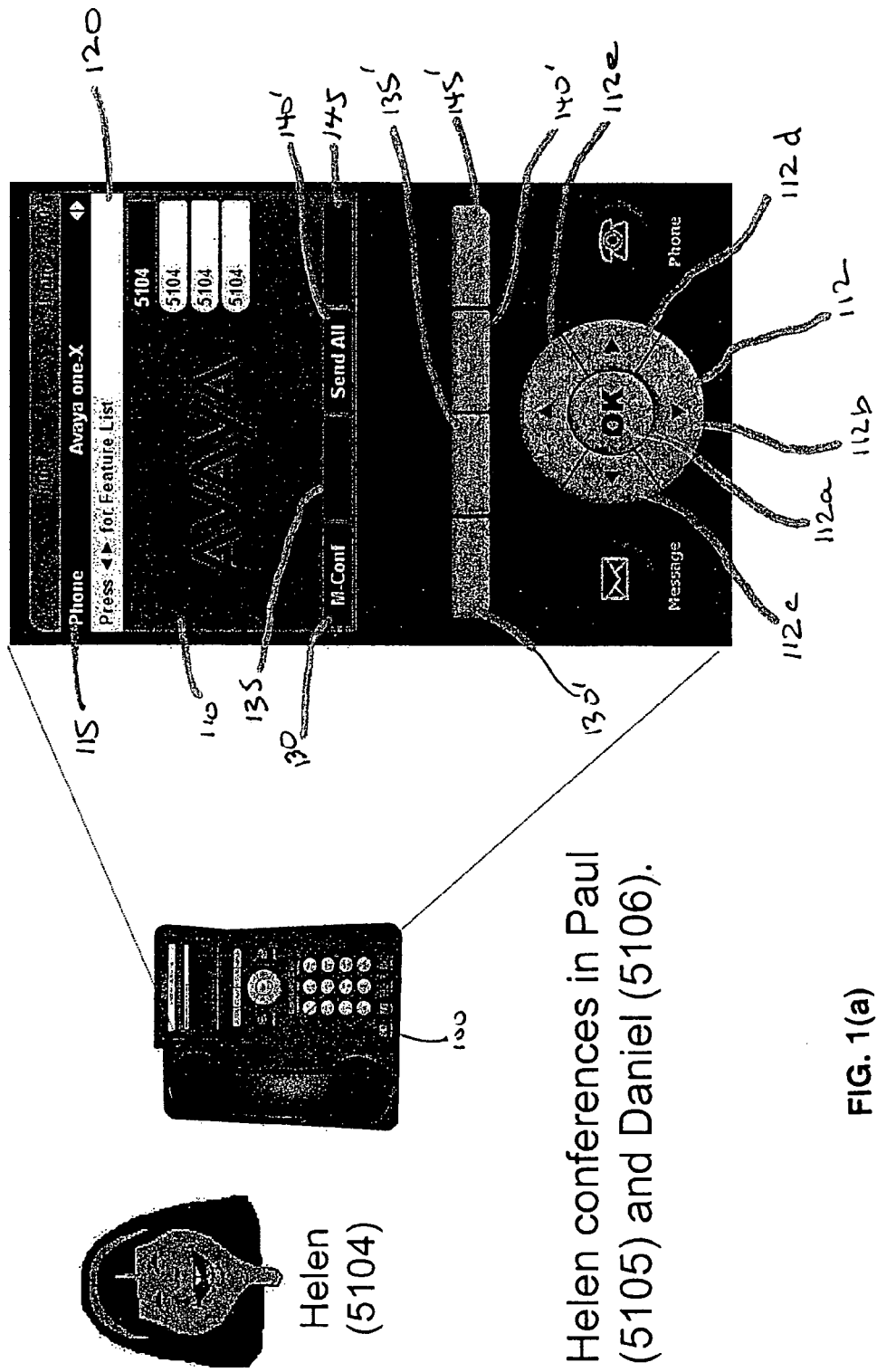
FIGS. 1(a) thru 1(r) are exemplary illustrations of the display area of the apparatus or endpoint device provided to a user for creating the multiple conference calls.

As shown in FIG. 1(a), the display 110 of the apparatus or endpoint device changes to provide an indication that the creation of a conference call is possible. The user or participant H begins establishment of the conference call by using a first input section that comprises a thumb-dial mechanism 112, or the like. In the illustrated configuration, the thumb-dial mechanism 112 comprises a central button 112a that permits a user to access selectable functions that are displayed on the display 110 of the apparatus or endpoint device 100.

A group of buttons 112b, 112c, 112d, 112e is also provided in the thumb-dial mechanism 112 for permitting navigation between the indicated available functions, such as first function indicator 115 and a second function indicator 120 of the display.

With additional reference to FIG. 1(a), the first function indicator 115 and the second function indicator 120 are shown on display 110 of the apparatus or endpoint 100. Located at the lower section of the display are the selection areas, such as M-Conf 130 and Send All 140 that indicate the functions that may be currently selected. In the present configuration of the display 110, each of these functions are activated when the user engages any one of the keys 130' or 145', respectively. There is no selectable function associated with selection areas 135 and 145. Consequently, these selection areas are blank. It should be appreciated that the selectable functions will vary based on the indication in each selection area 130, 135, 140, 145 shown in the lower section of the display 110 of the endpoint device 100. Each of the selectable functions are thus activated or selected when participant H engages any one of key 130', key 135', key 140' or key 145', respectively.

Figure 1B:
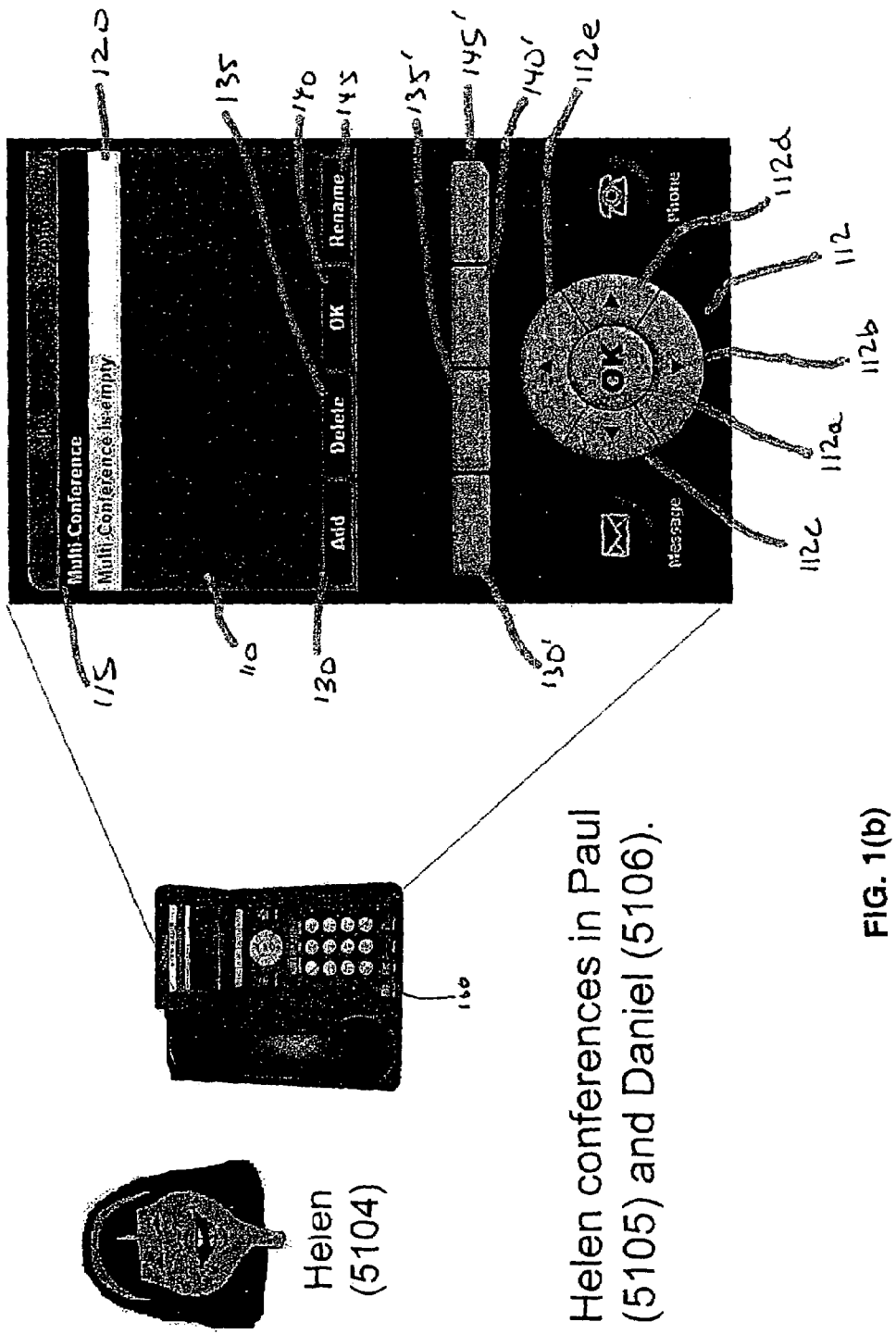

Upon first participant H using the thumb-dial mechanism 112 to select the selection area M-Conf 130, the display 110 of the apparatus or endpoint device 100 changes or becomes updated, as shown in FIG. 1(b). Here, the first function indicator 115 and the second function indicator 120 respectively indicate that a multi-conference may be established and that the multi-conference is empty or there are no participants selected for the conference. In addition, the selection area 130, 135, 140, 145 shown in the lower section of the display 110 of the endpoint device 100 indicates the functions Add 130, Delete 135, OK 140 and Rename 145. Each of these function are activated when participant H engages any one of key 130', key 135', key 140' or key 145', respectively.

Figure 1C:
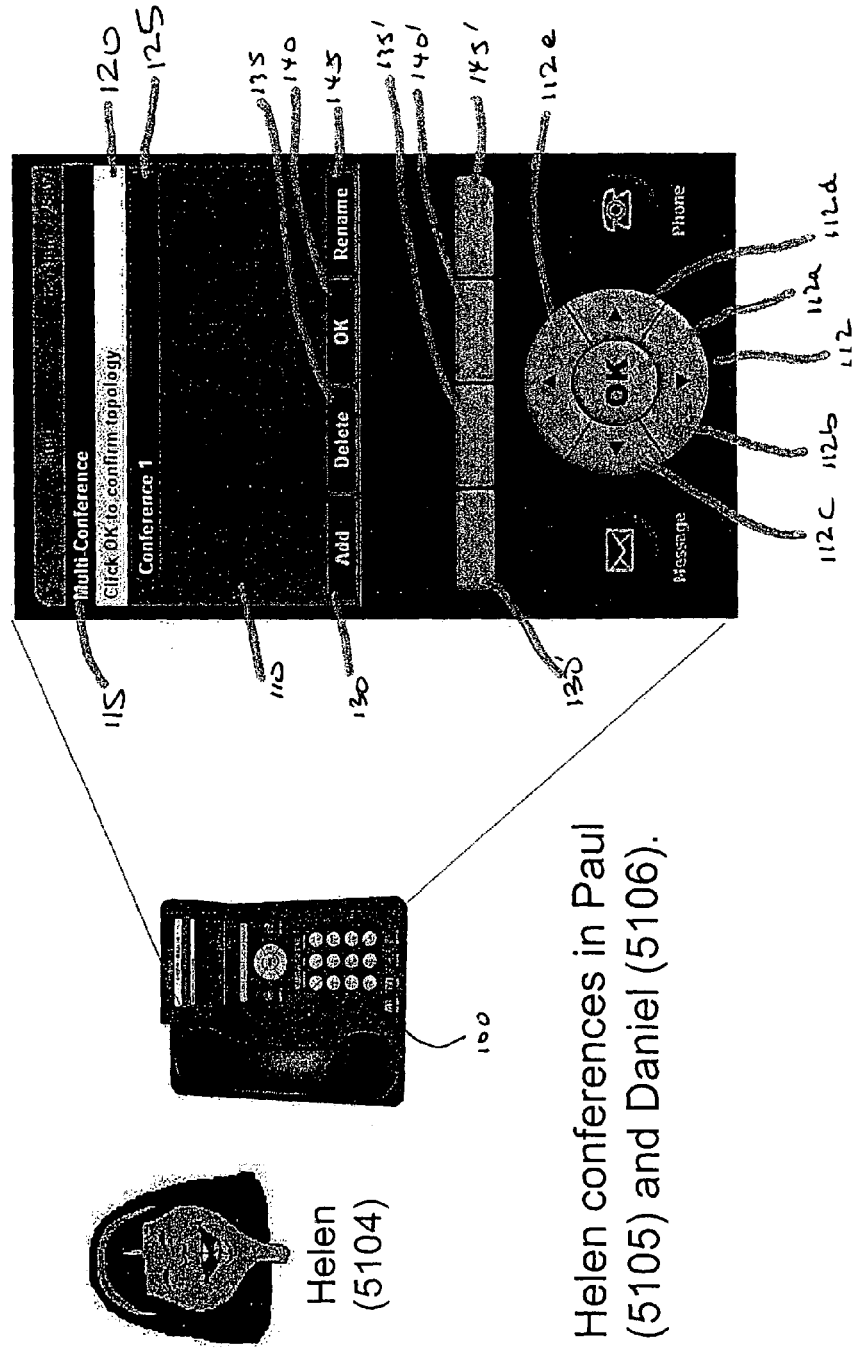

After participant H uses the thumb-dial mechanism 112 to indicate the desire to add a potential participant to the conference call, the display 110 of the apparatus or endpoint device 100 changes or becomes updated, as shown in FIG. 1(c). Here, the first conference is indicated by the Conference 1 section 125 of the display. In addition, the first function indicator 115 and the second function indicator 120 indicate that a multi-conference may be established and that the user should confirm the conference topology, respectively.

Figure 1D:
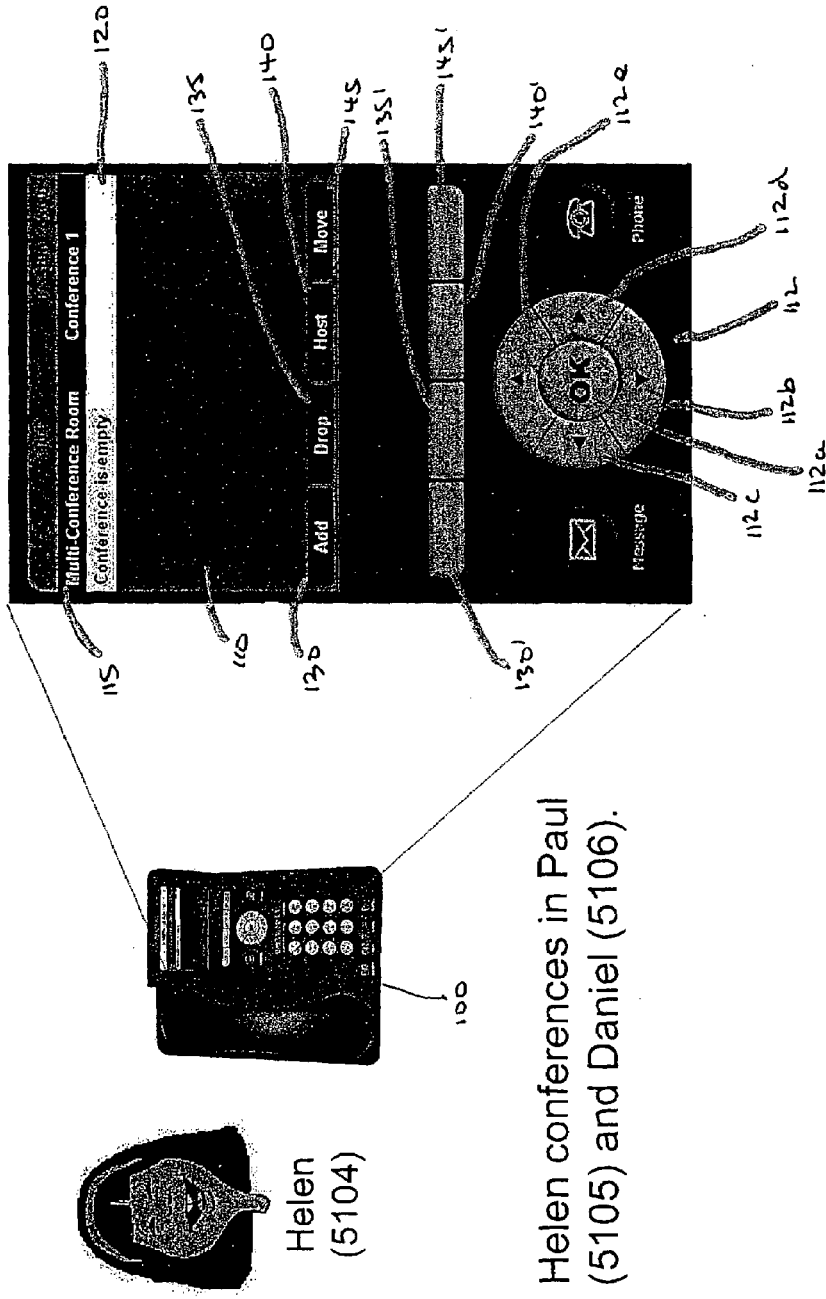

After participant H uses the thumb-dial mechanism 112 to confirm the conference call topology, the display 110 of the apparatus or endpoint device 100 changes or becomes updated, as shown in FIG. 1(d). Here, the first conference is indicated by the Conference 1 section 125 of the display. In addition, the first function indicator 115 and the second function indicator 120 indicate that a multi-conference is established and that the conference is empty, respectively.

Figure 1E:
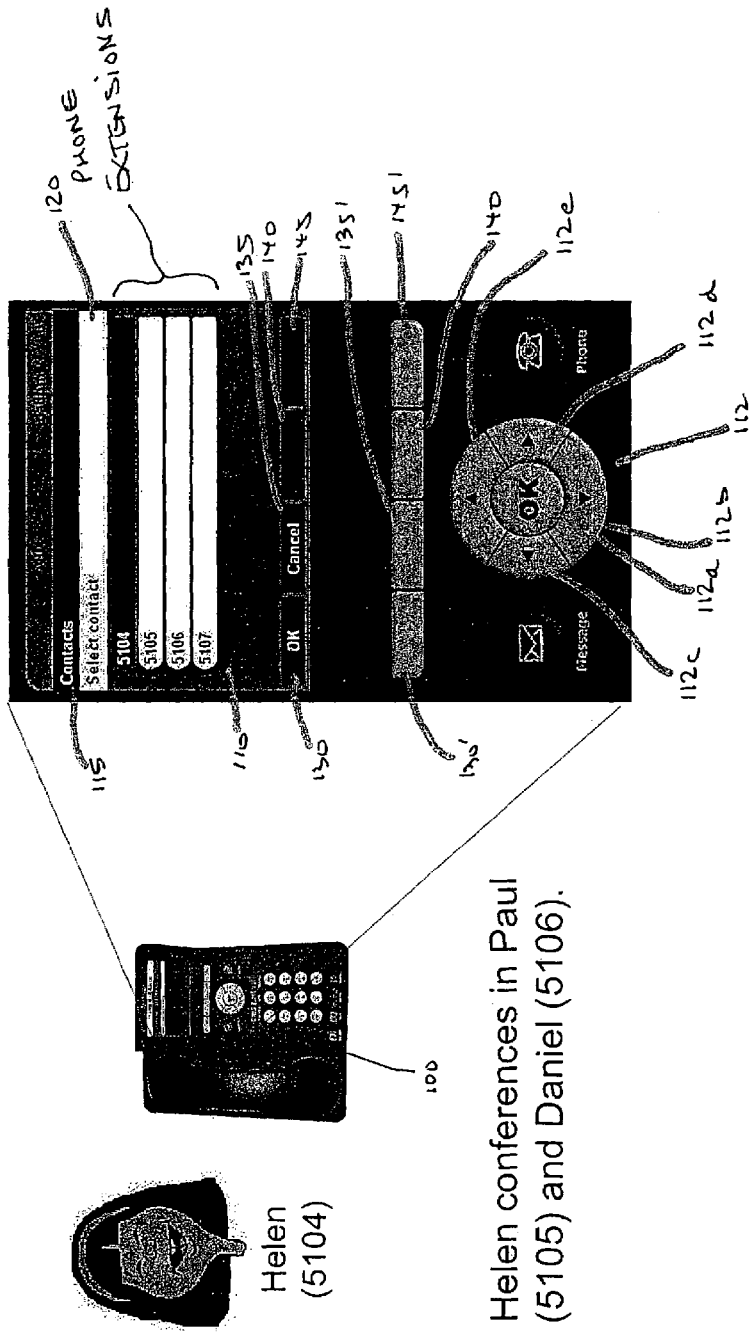
Figure 1F:
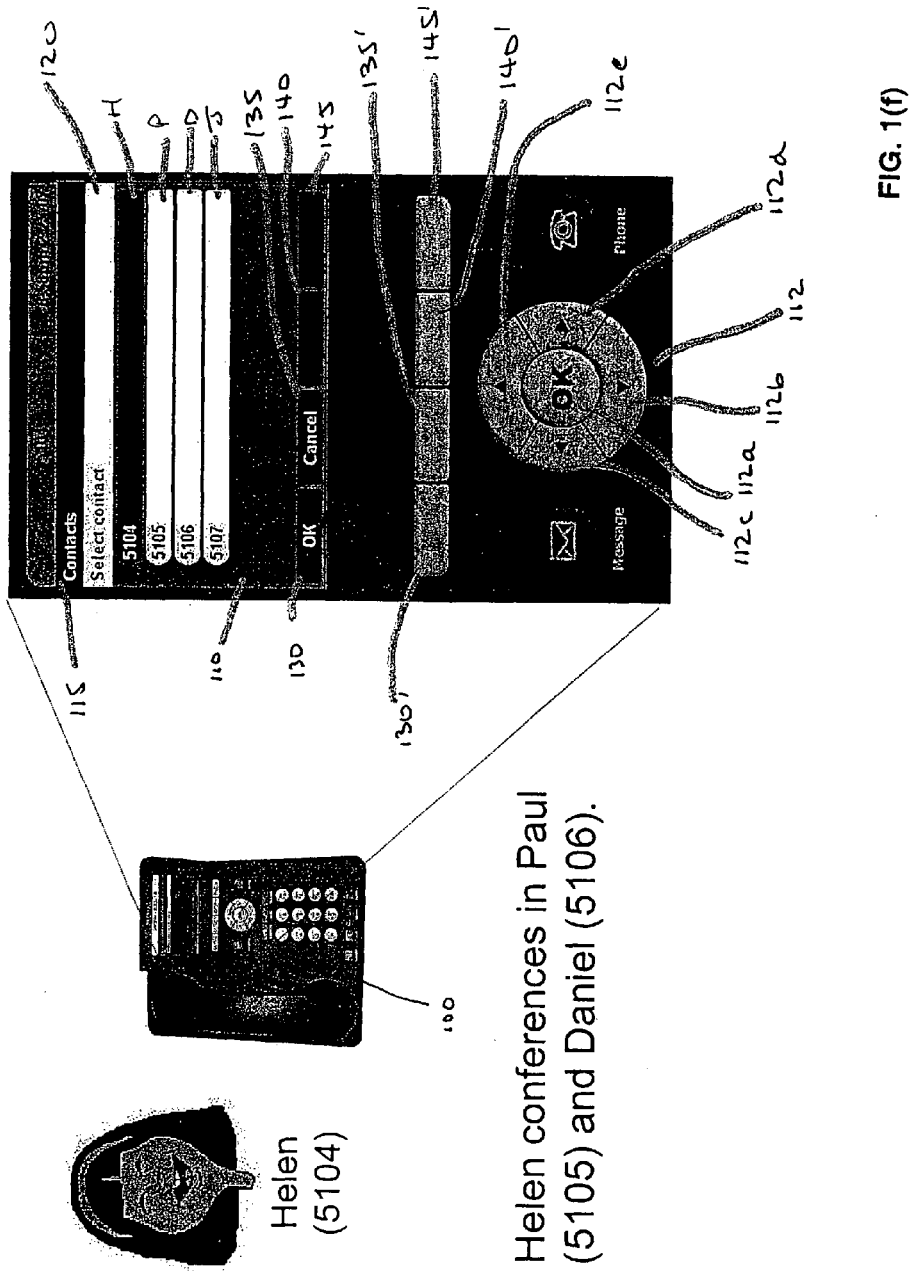
Figure 1G:
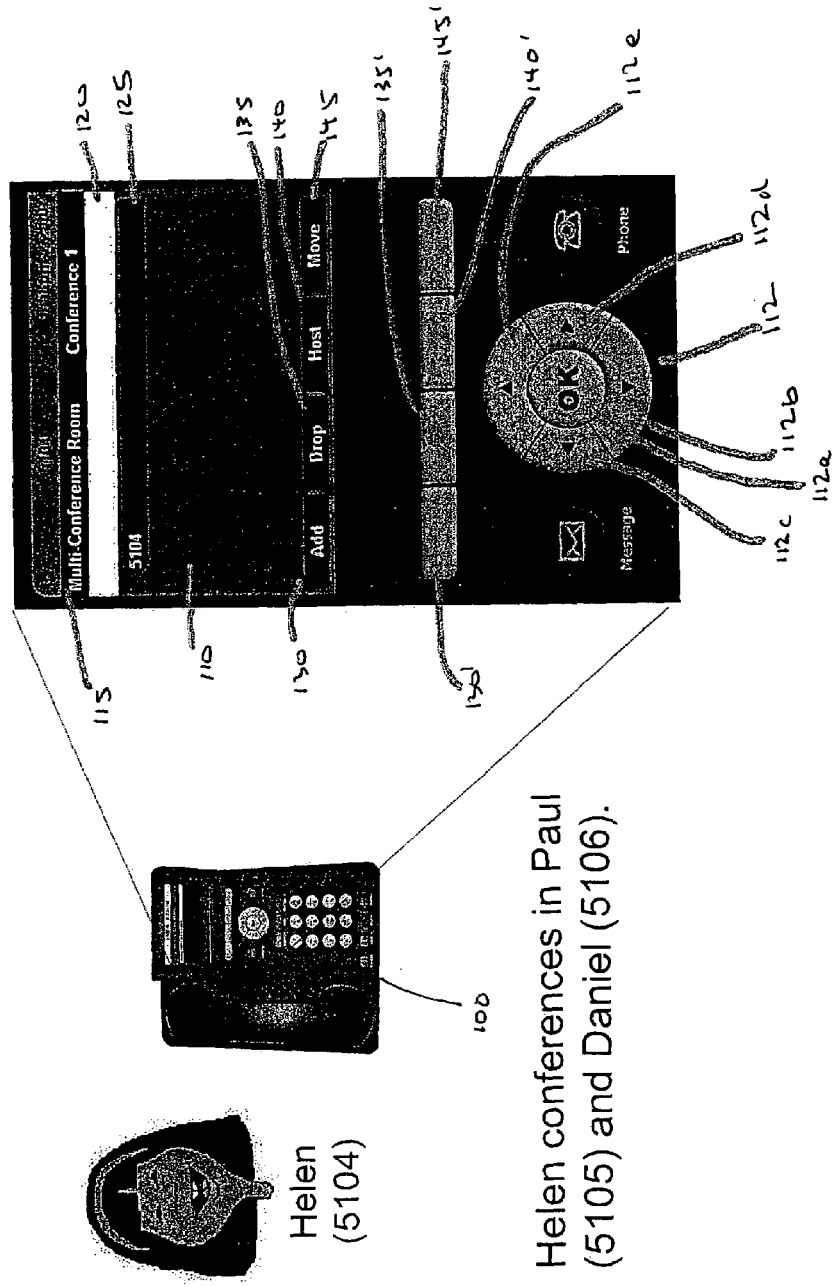
Figure 1H:
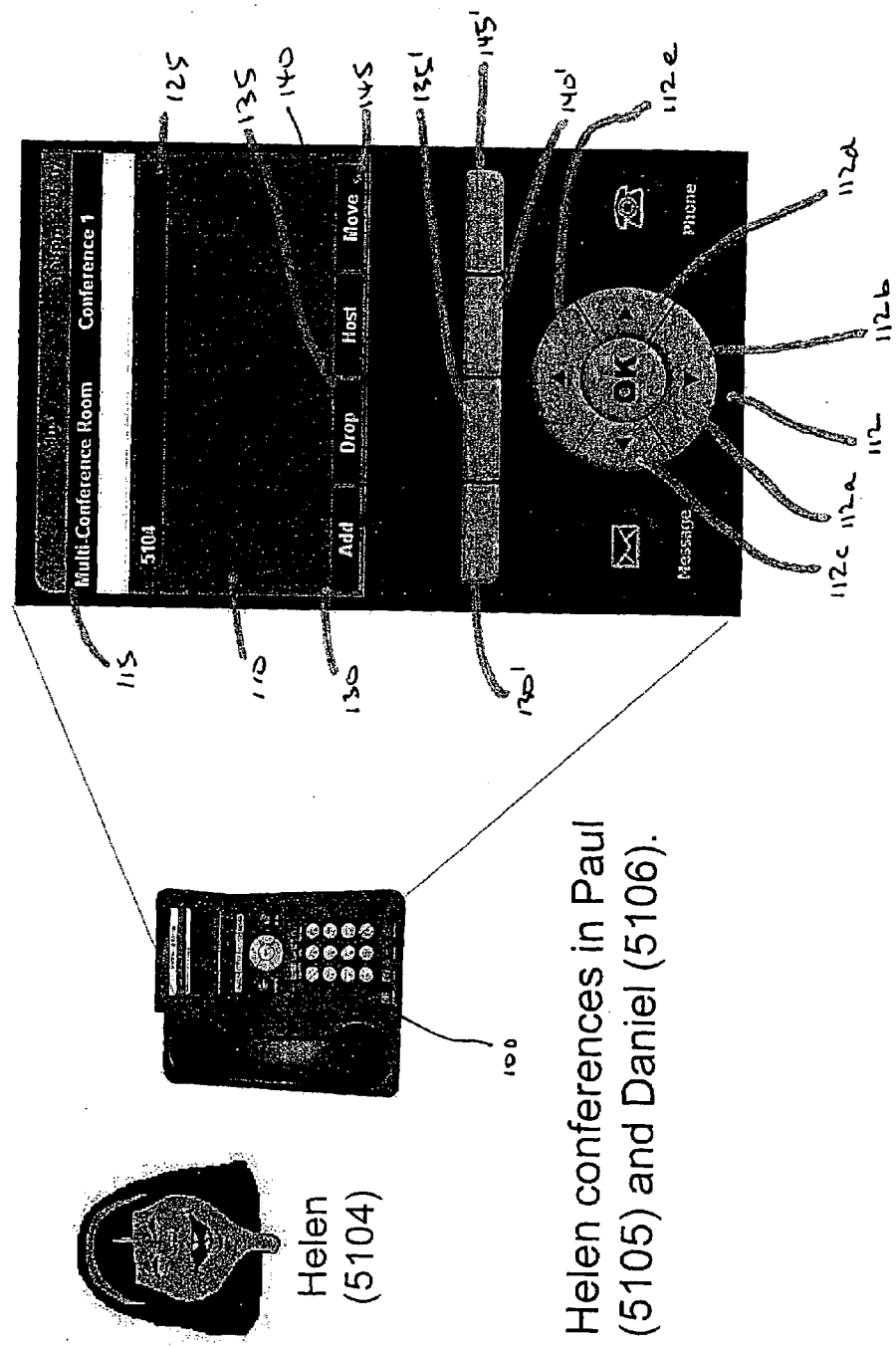
Figure 1I:
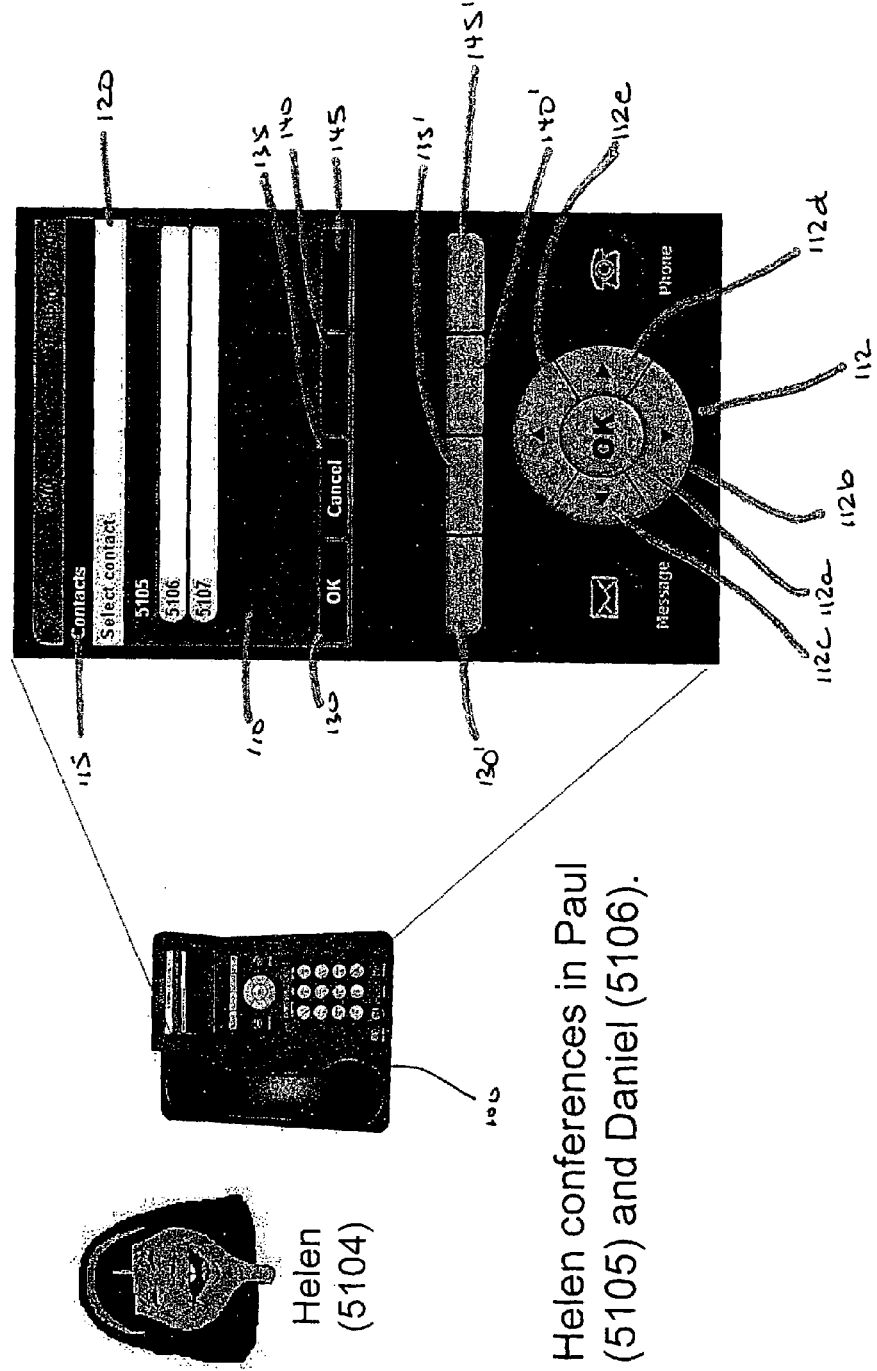
Figure 1J:
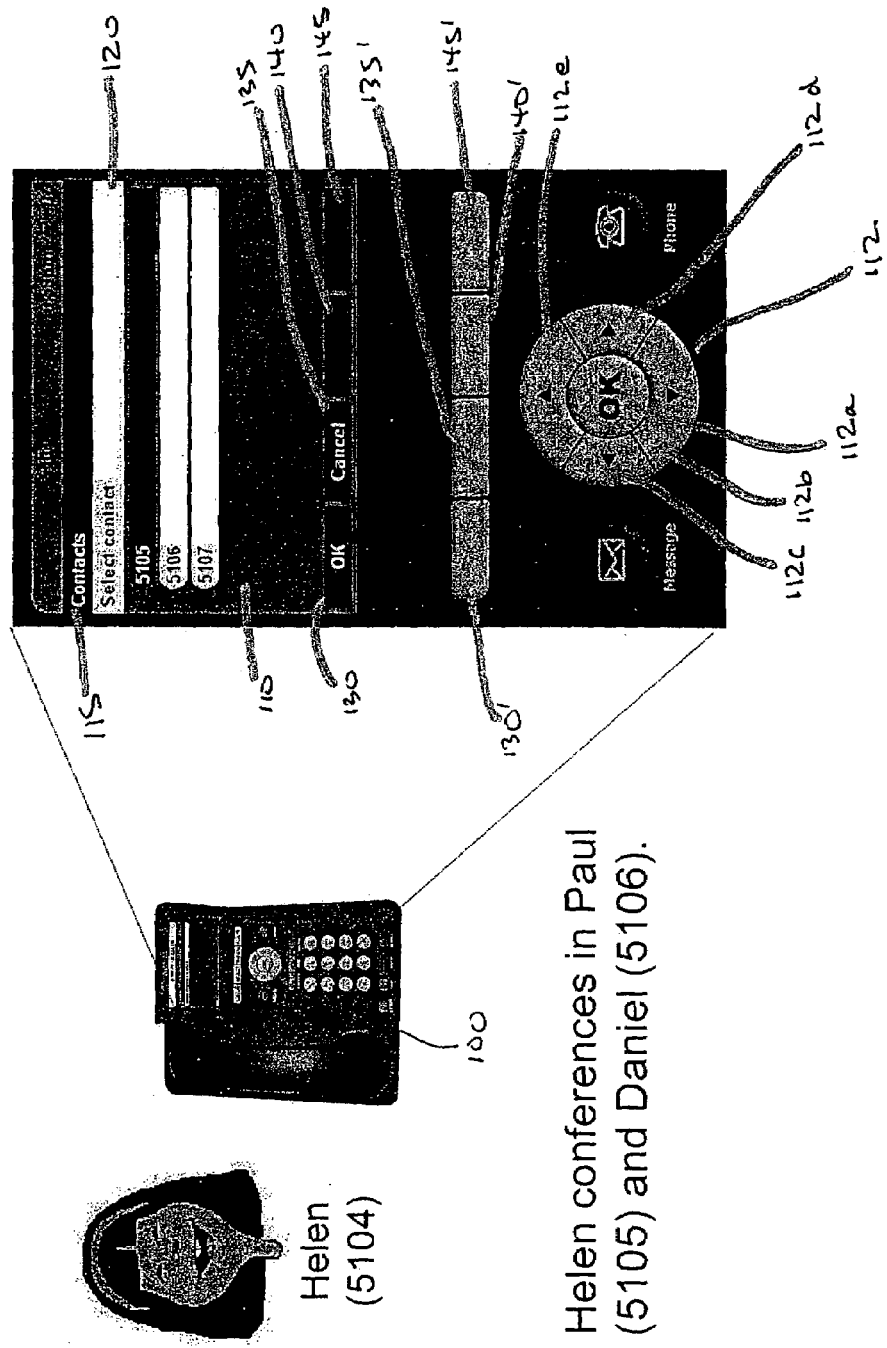
Figure 1K:
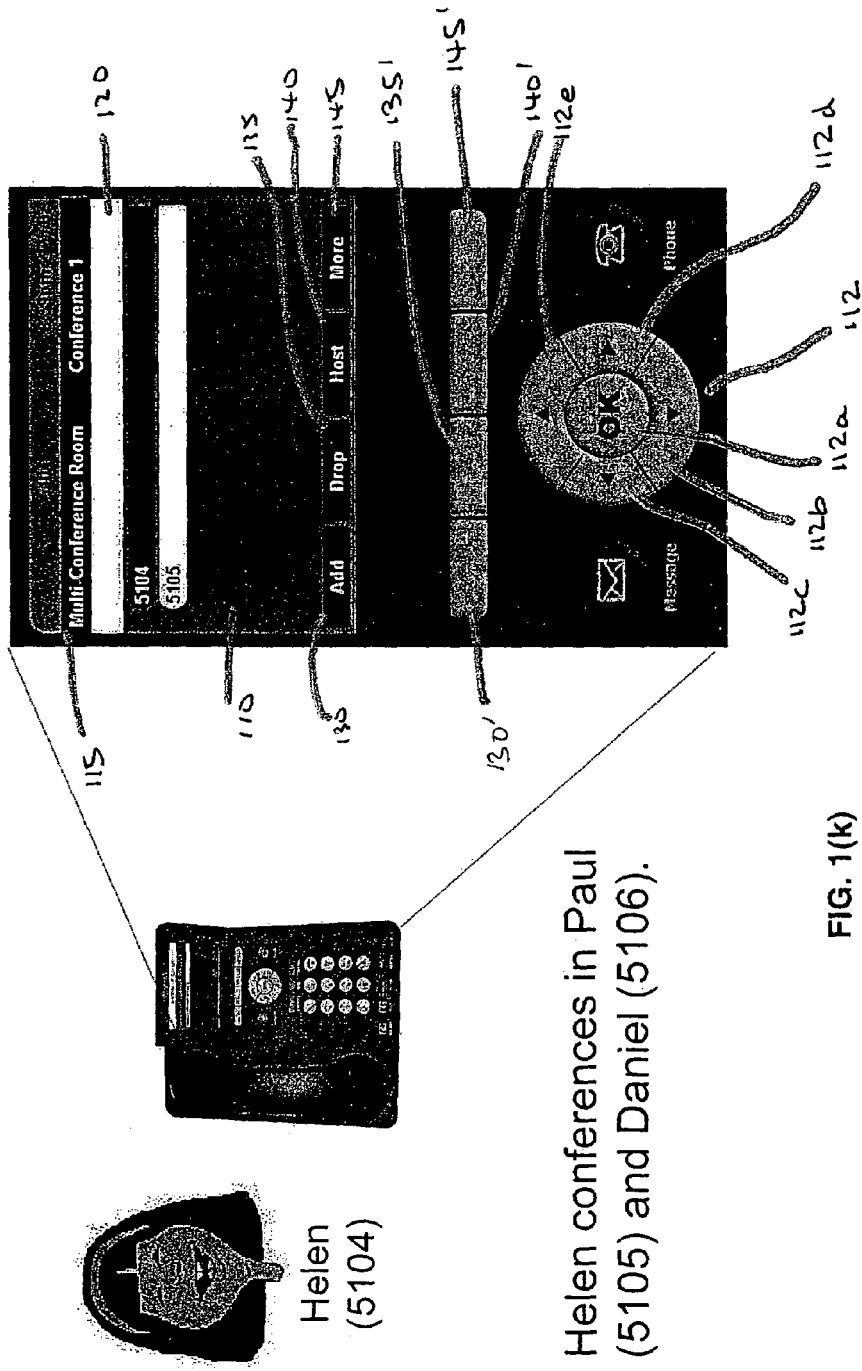
Figure 1L:
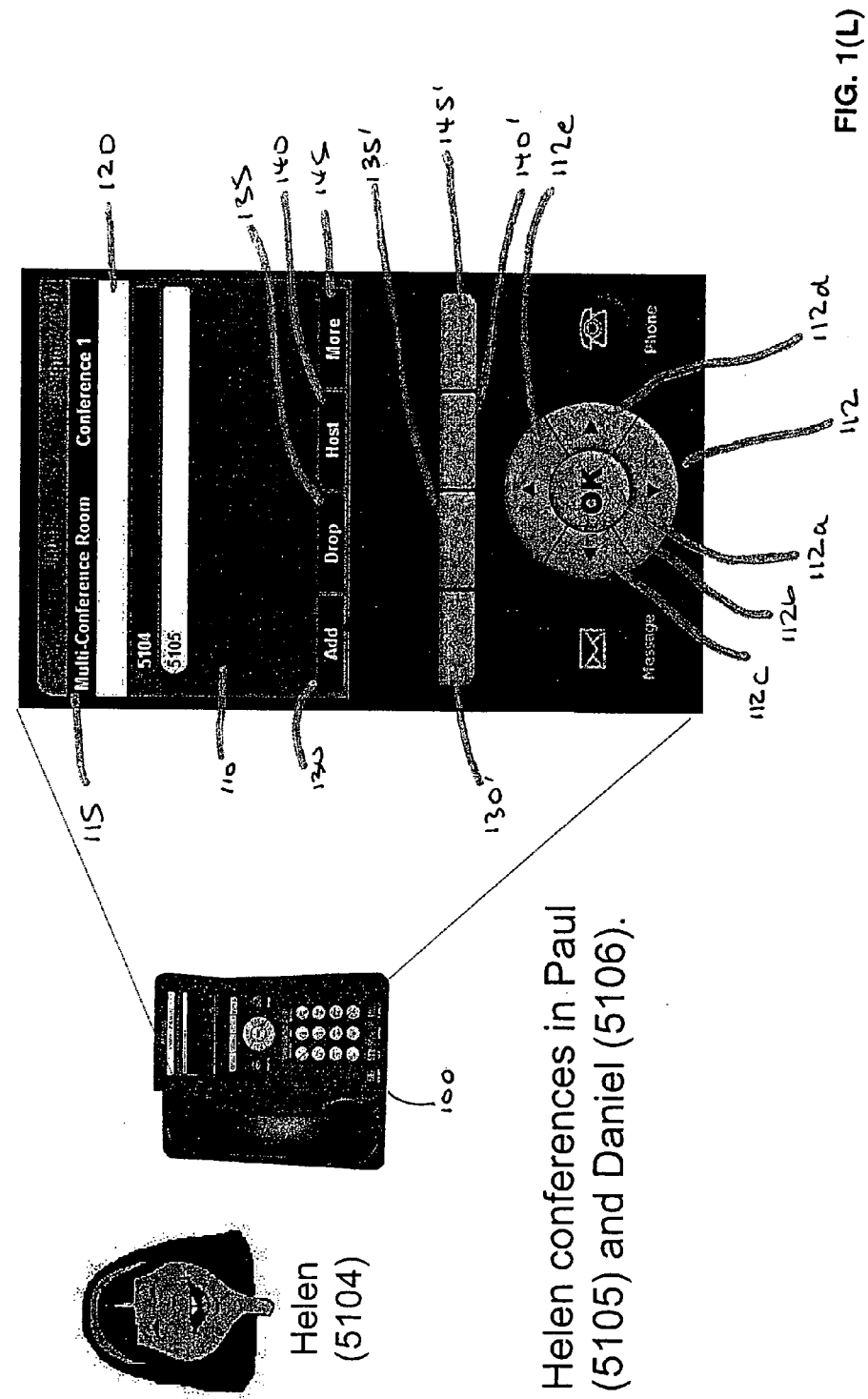
Figure 1M:
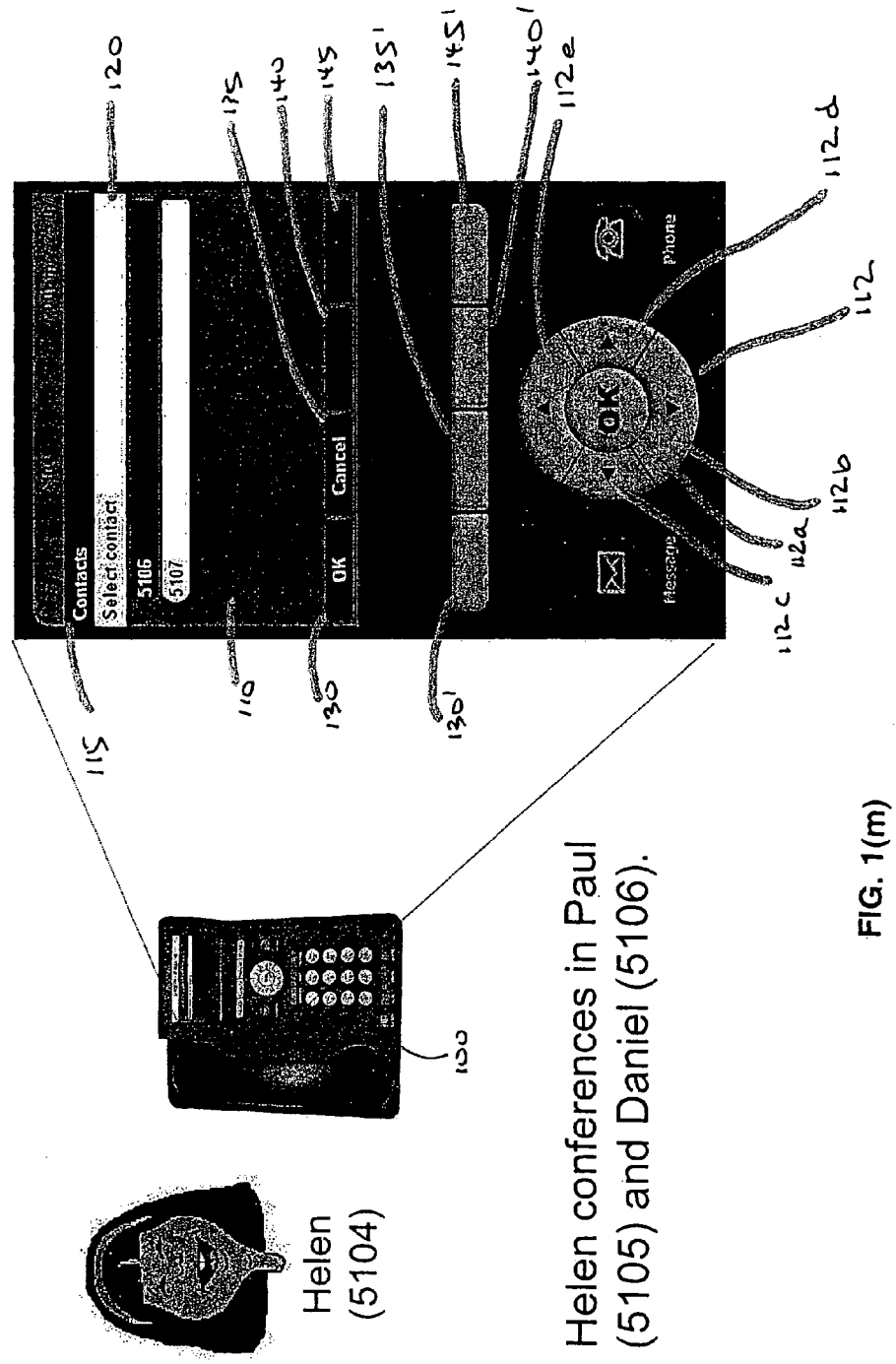
Figure 1N:
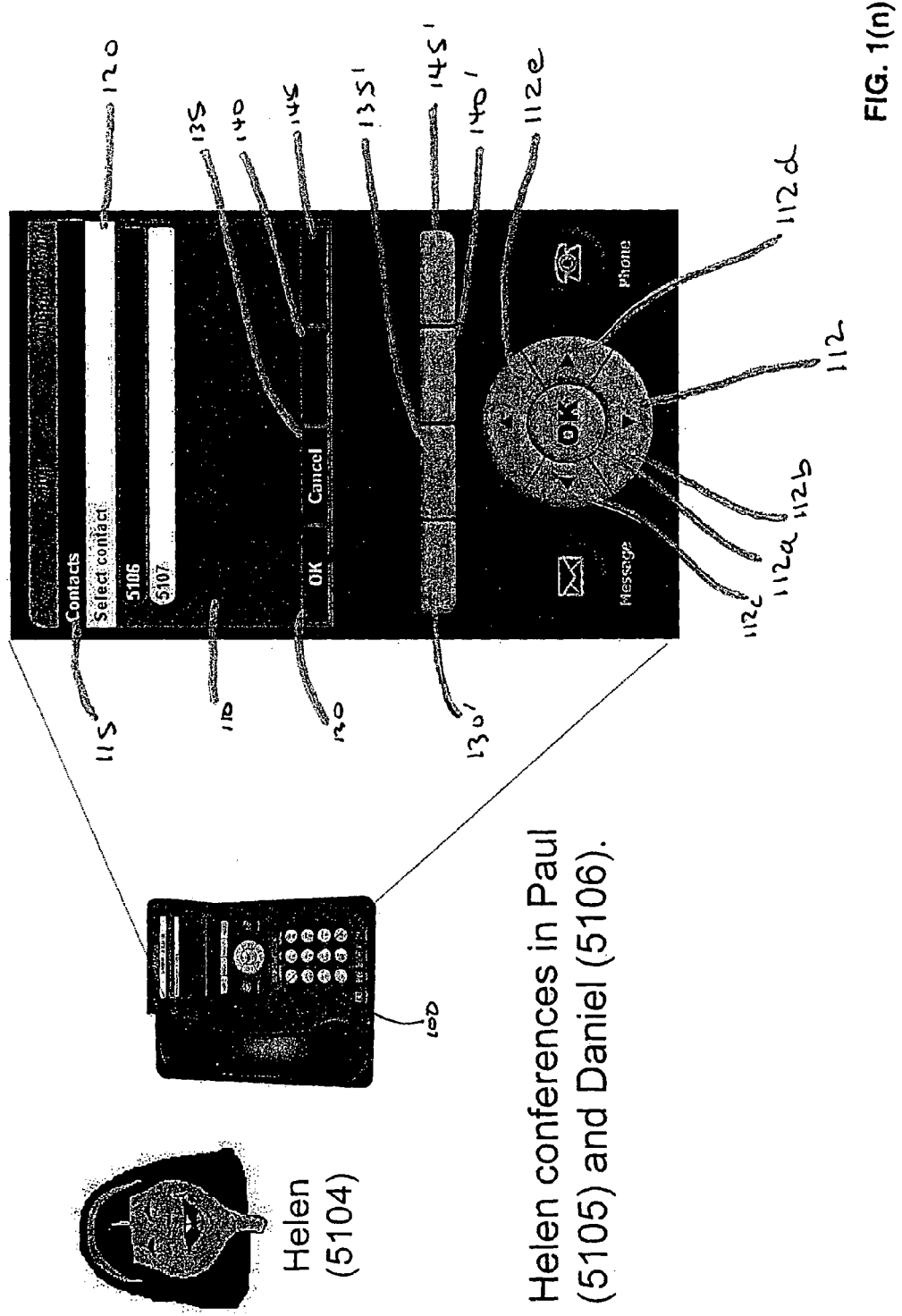
Figure 1O:
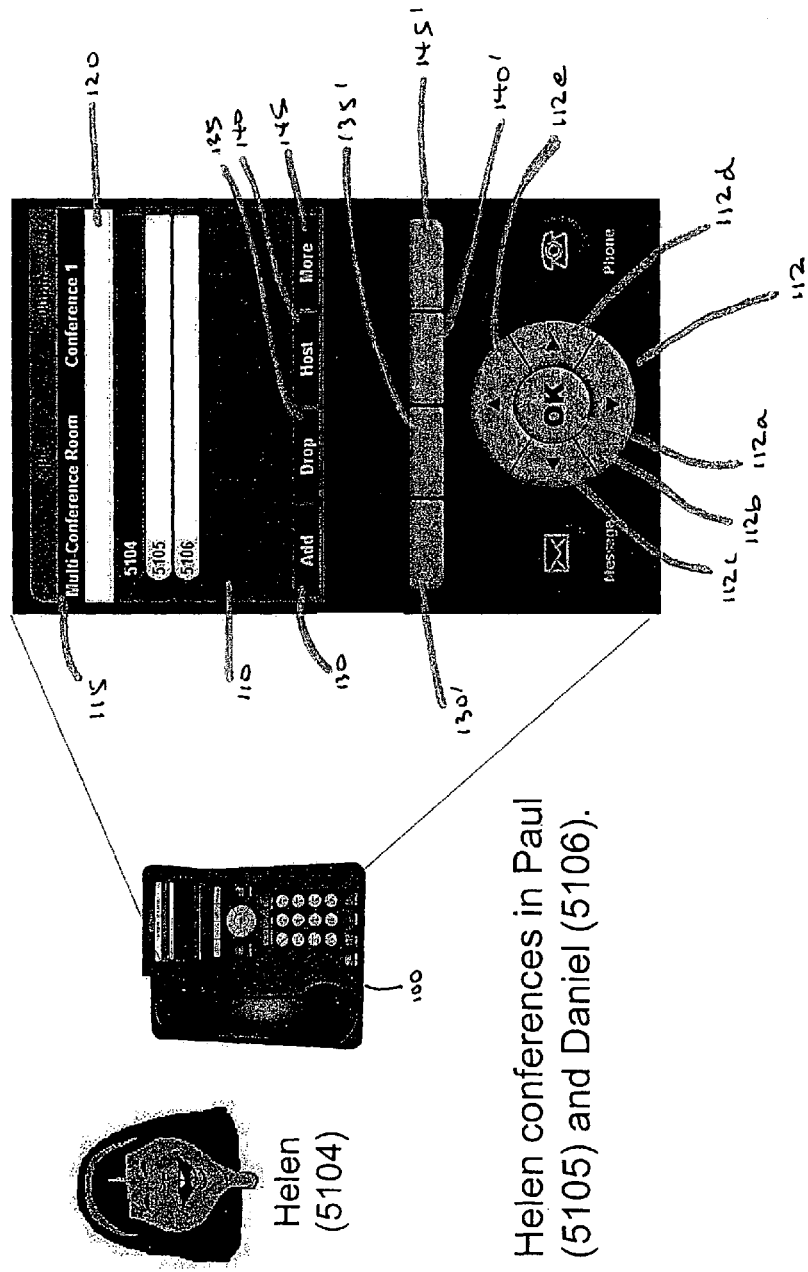
Figure 1P:
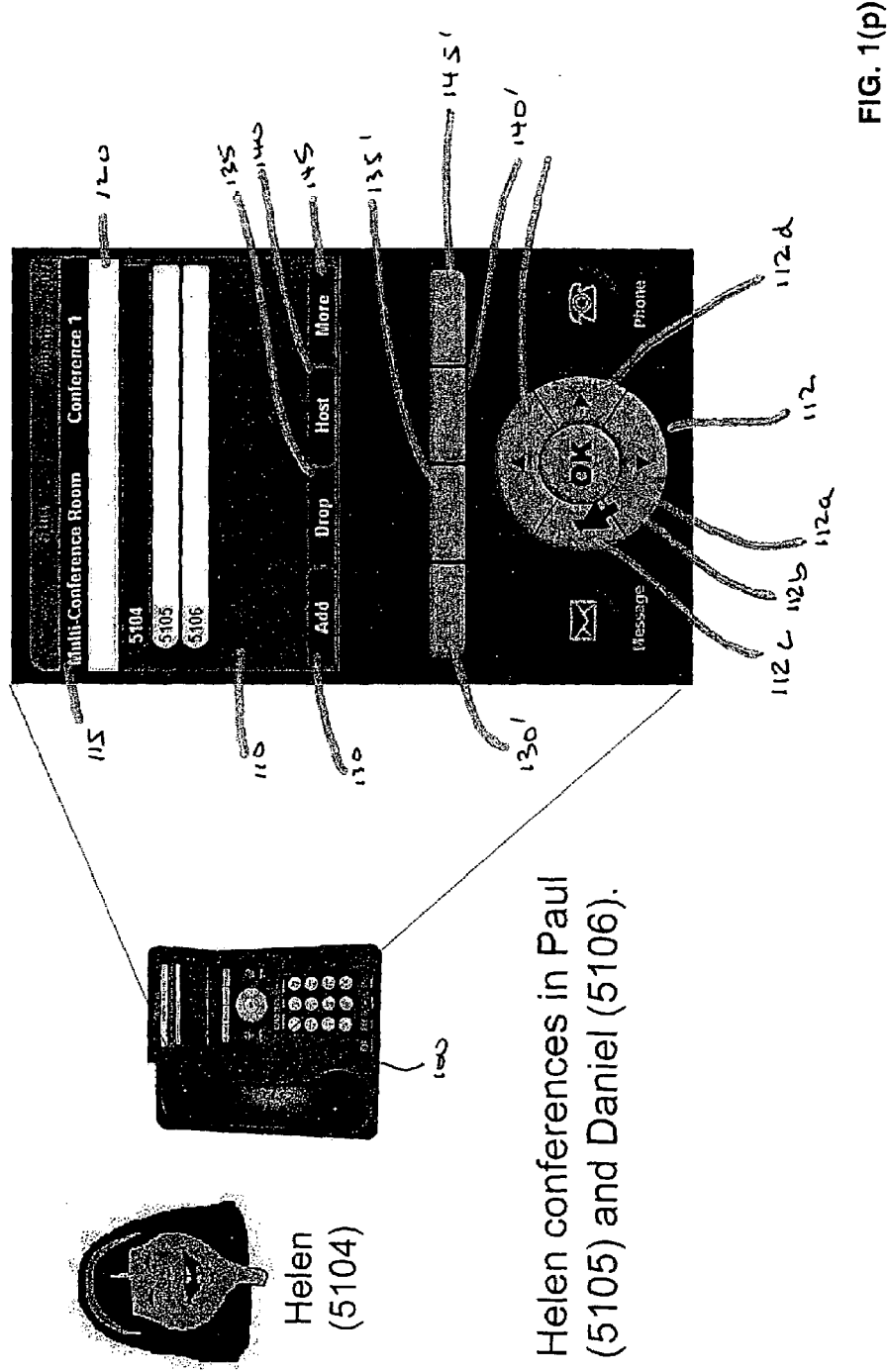
Figure 1Q:
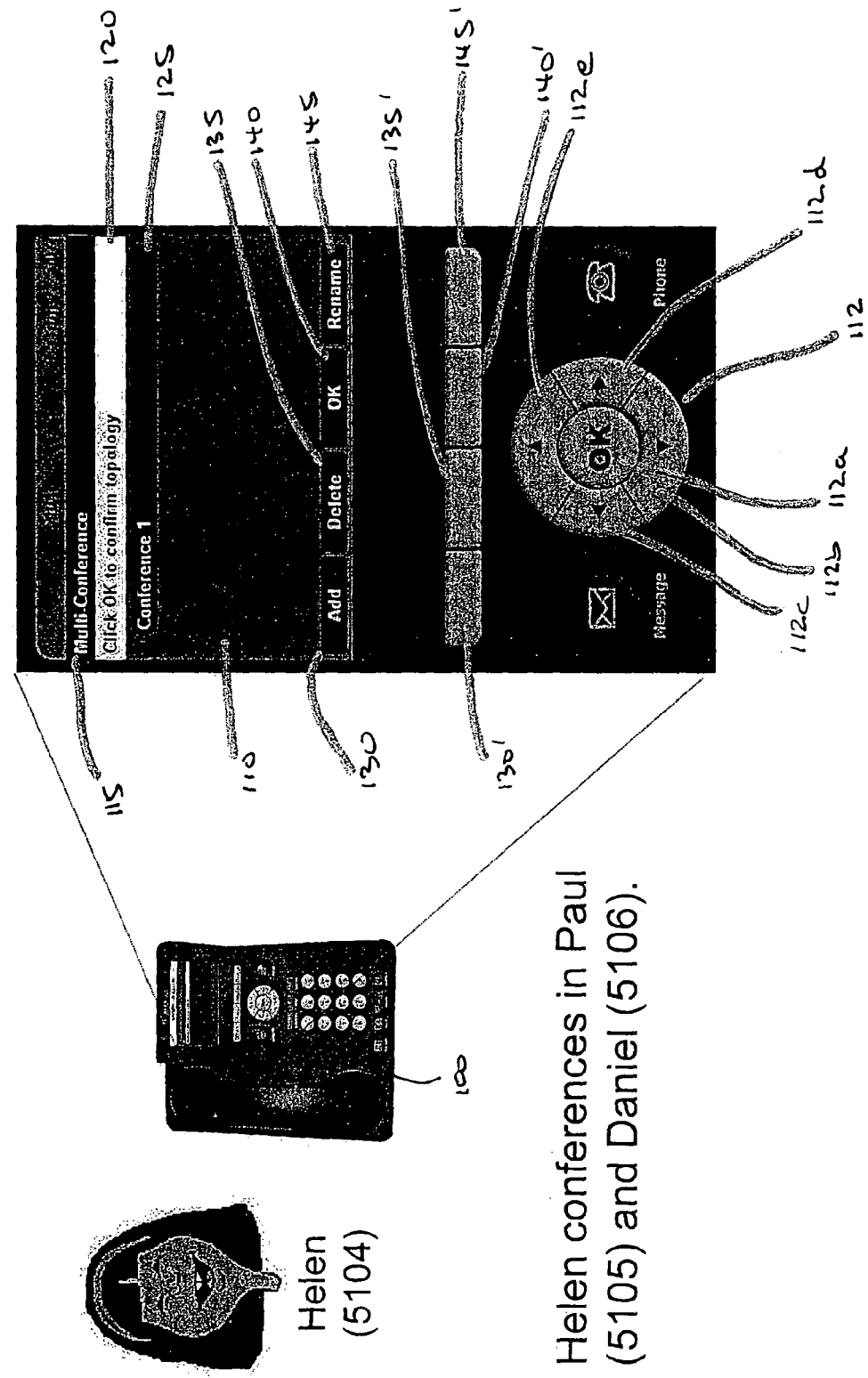
Figure 1R:
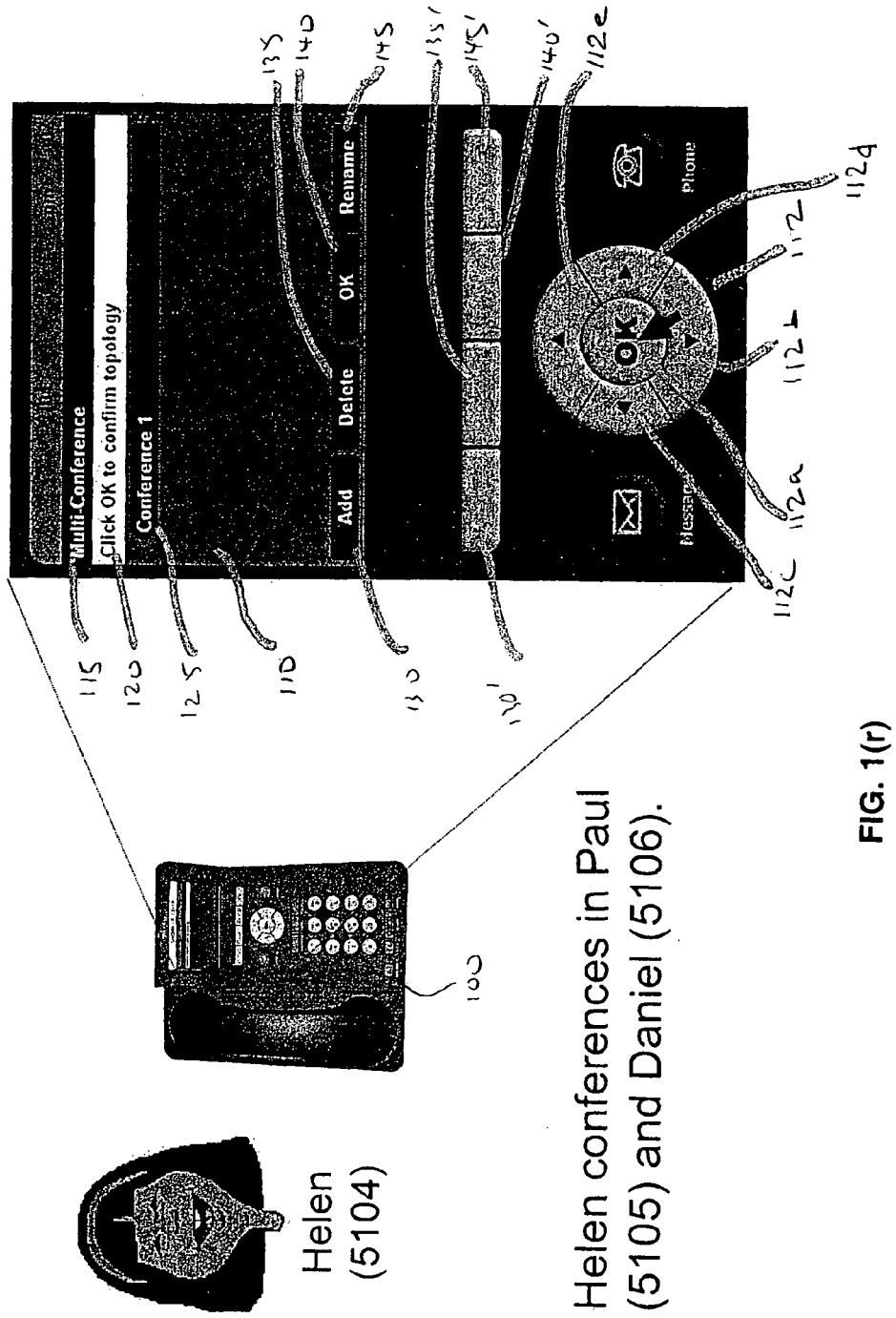

Next, participant H indicates the desire to add another participant by using either keys 130' thru 145' or the thumb-dial mechanism 112 to add and/or select another participant, where the display 110 of the apparatus or endpoint device 100 changes or becomes updated, as shown in FIG. 1(e). Here, the first function indicator 115 and the second function indicator 120 indicate that a list of contacts is available and that a contact from the list of contacts may be selected, respectively. In addition, the phone extensions of the contacts, such as 5104 (H), 5105 (P), 5106 (D) and 5107 (J), are shown on the display. It should be readily apparent that the thumb-dial mechanism 112 may be used to navigate and select each user associated with a particular phone extension from among the list presented on the display 110 of the apparatus or endpoint device 100. Moreover, it should be readily appreciated that the number of phone contacts could readily be more or less than what is currently shown.

Participant H then selects herself for addition to the conference, selects participants P and D, and confirms the desire to include each participant in the conference call, in accordance with the sequence illustrated by FIGS. 1(f) thru 1(r), respectively. Naturally, it will be appreciated that the navigation and conformation is achieved when any combination of key 130', key 135', key 140' or key 145', as well as the thumb-dial mechanism 112 are used.

Figure 2:
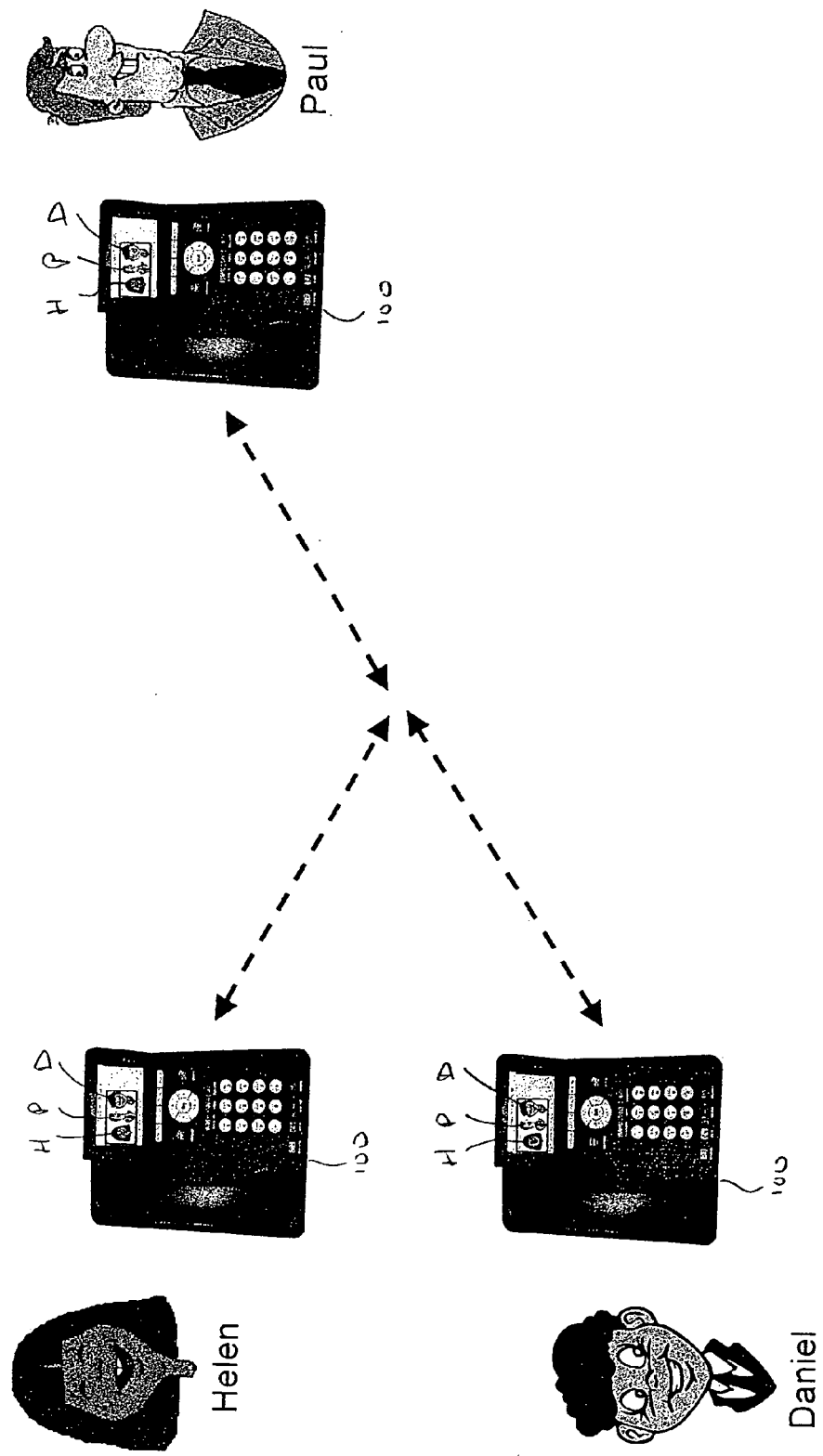
FIG. 2 is an exemplary graphical illustration of a conference call between multiple users of the apparatus or endpoint device of the invention.
Figure 2A:
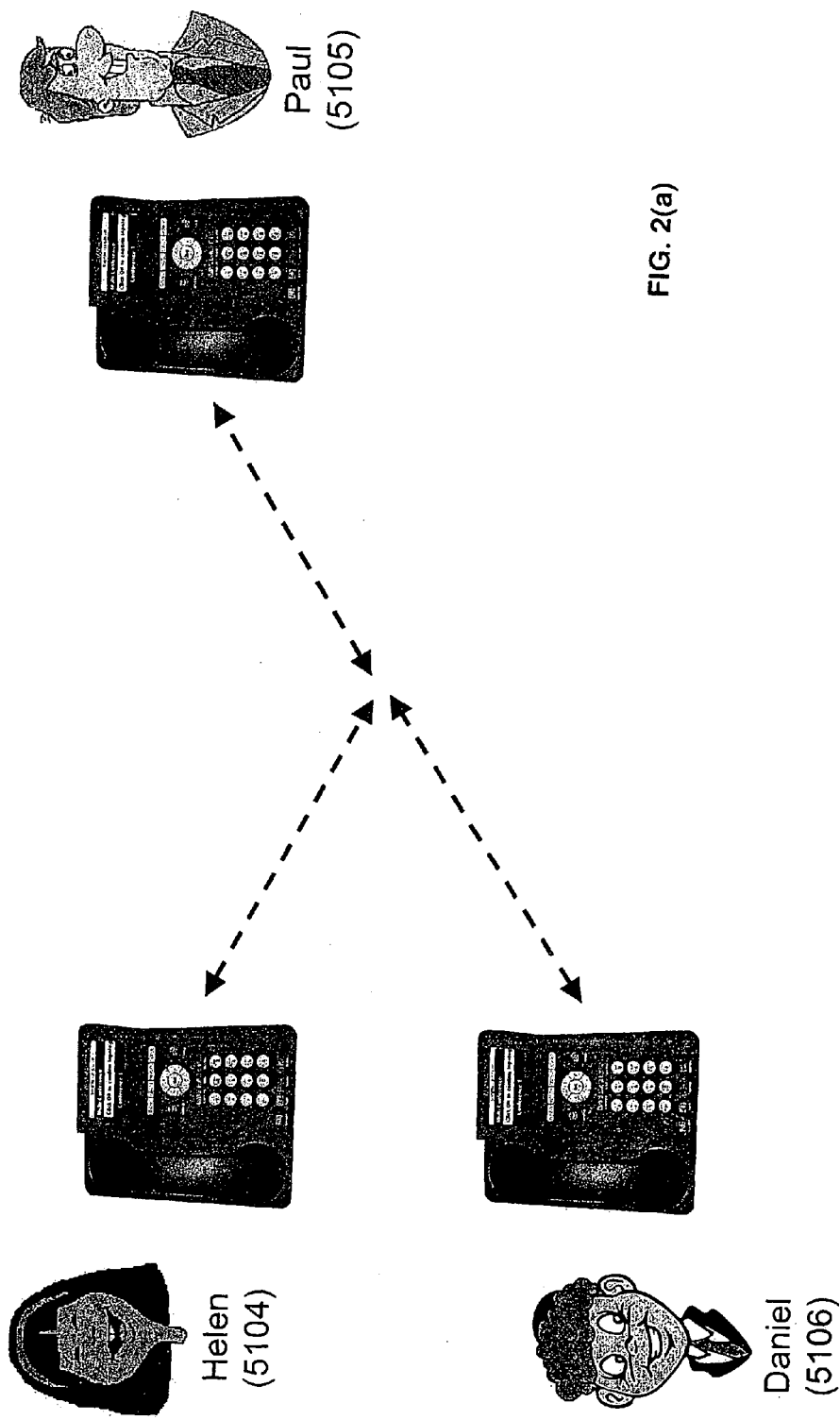
FIG. 2(a) is an exemplary illustration of the display area of the apparatus or endpoint device provided to the users pursuant to creation of the conference call.

As shown in FIG. 2, upon set up of the conference call, all participants in the conference call are displayed on the apparatus or endpoint device 100 at each respective user's location. As a result, all of the participants are able to see who is currently participating in the conference on their respective apparatus or endpoint device 100. Naturally, it will be appreciated that H, P and D converse during the teleconference, where the exemplary screen shown in FIG. 2(a) is made available to the participants on their respective endpoint device to permit each user to select desired call conferencing options.

Figure 3:
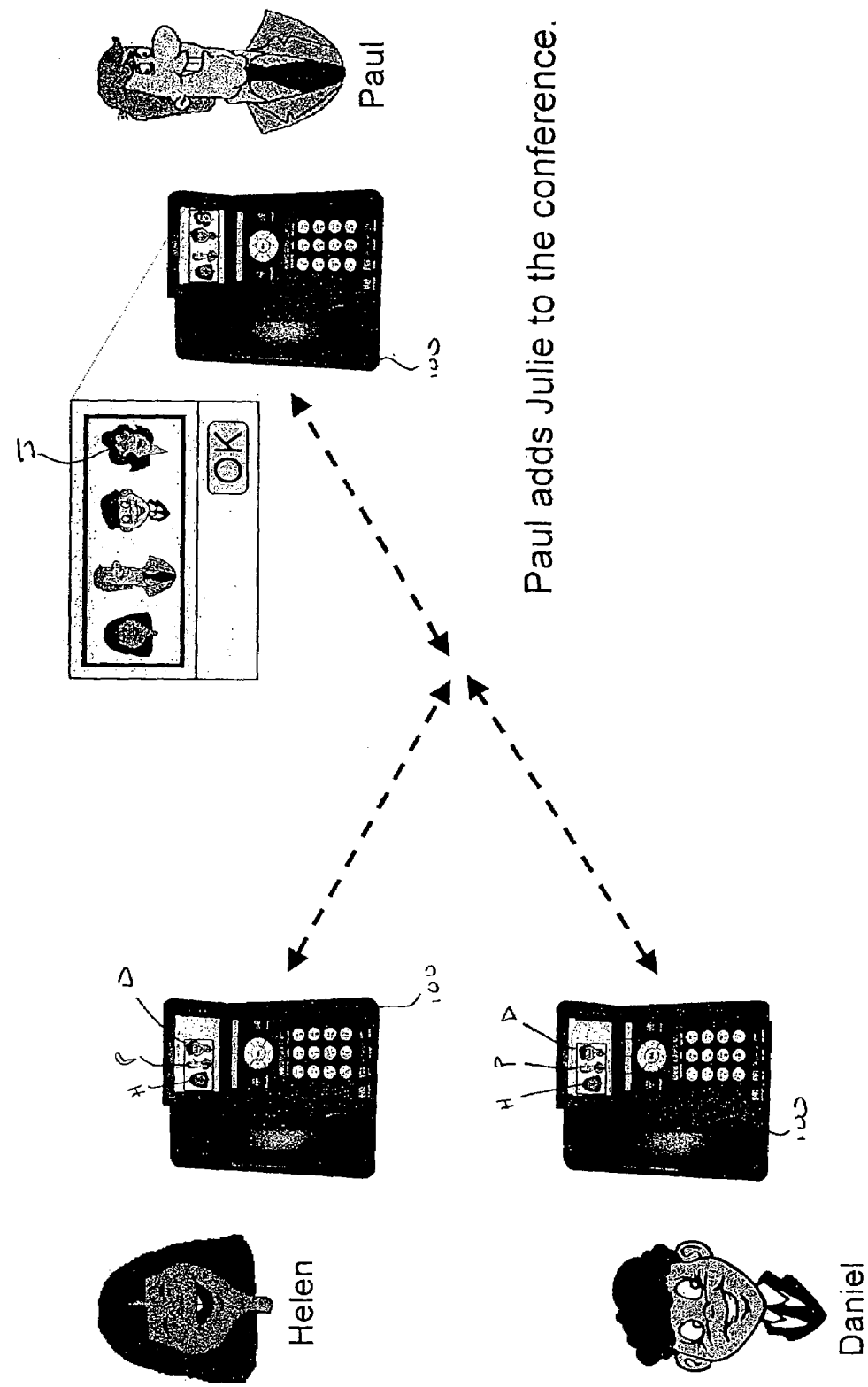
FIG. 3 is an exemplary graphical illustration of the extension or addition of an additional participant to the conference call.
Figure 3B:
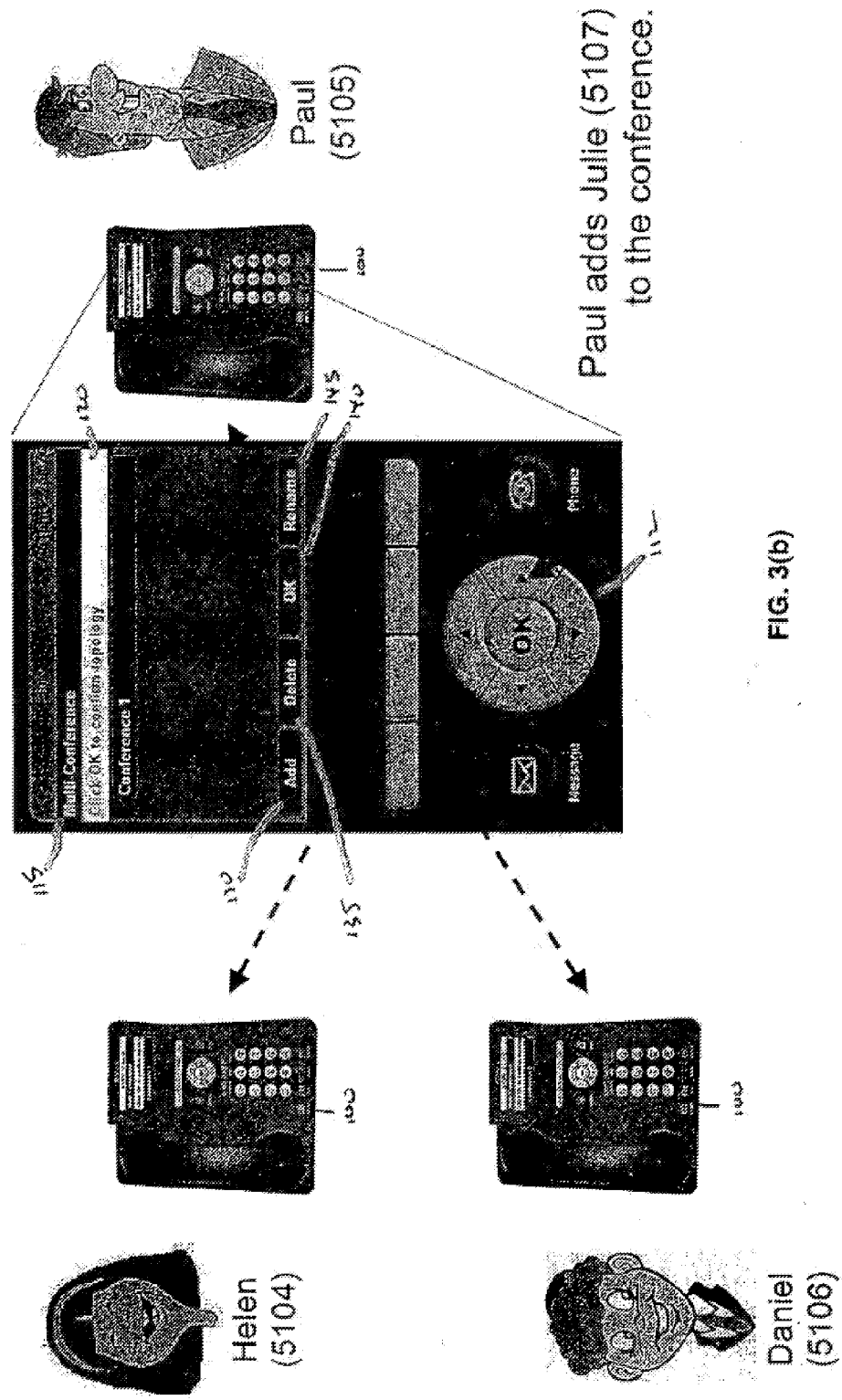
Figure 3C:
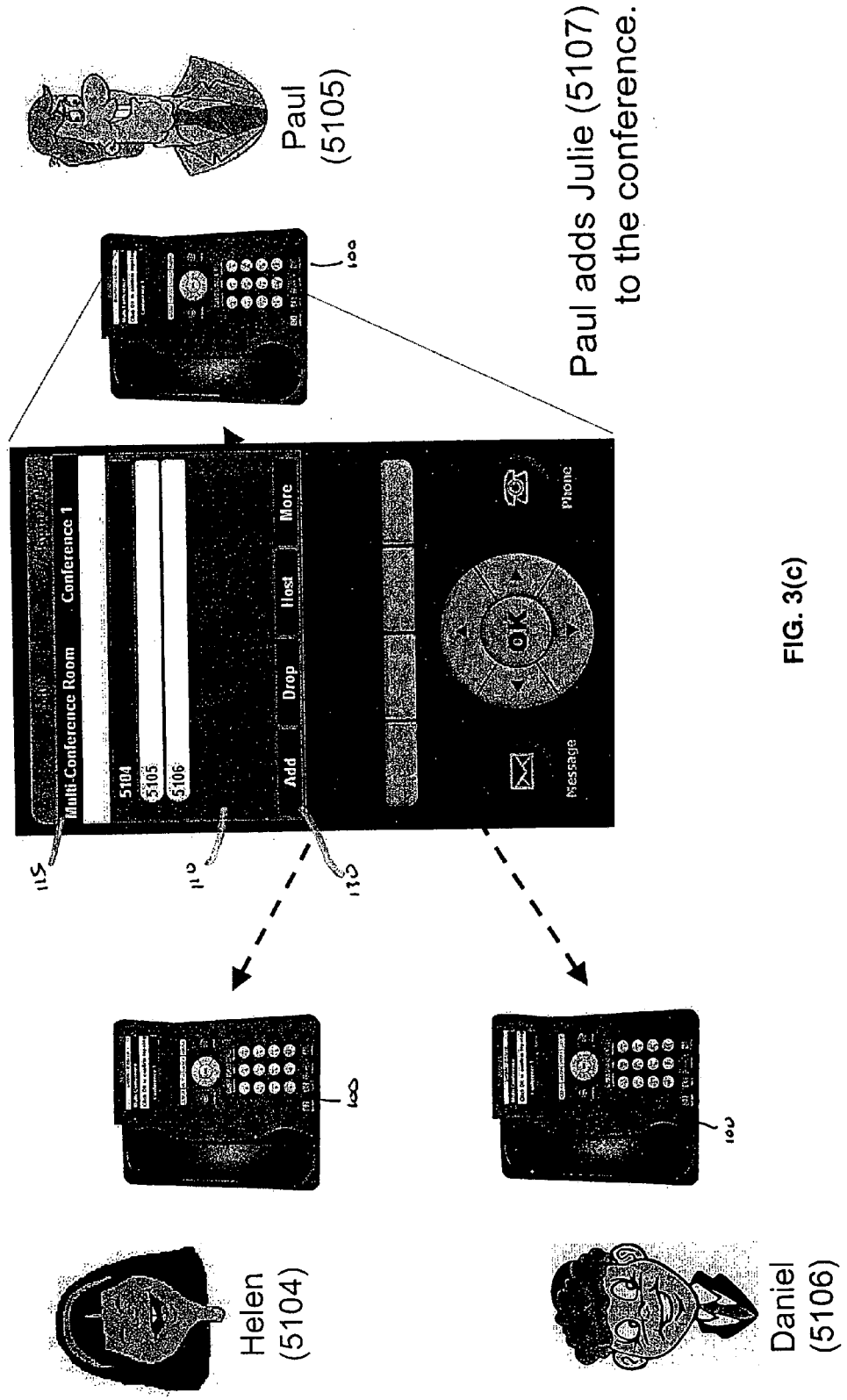
Figure 3D:
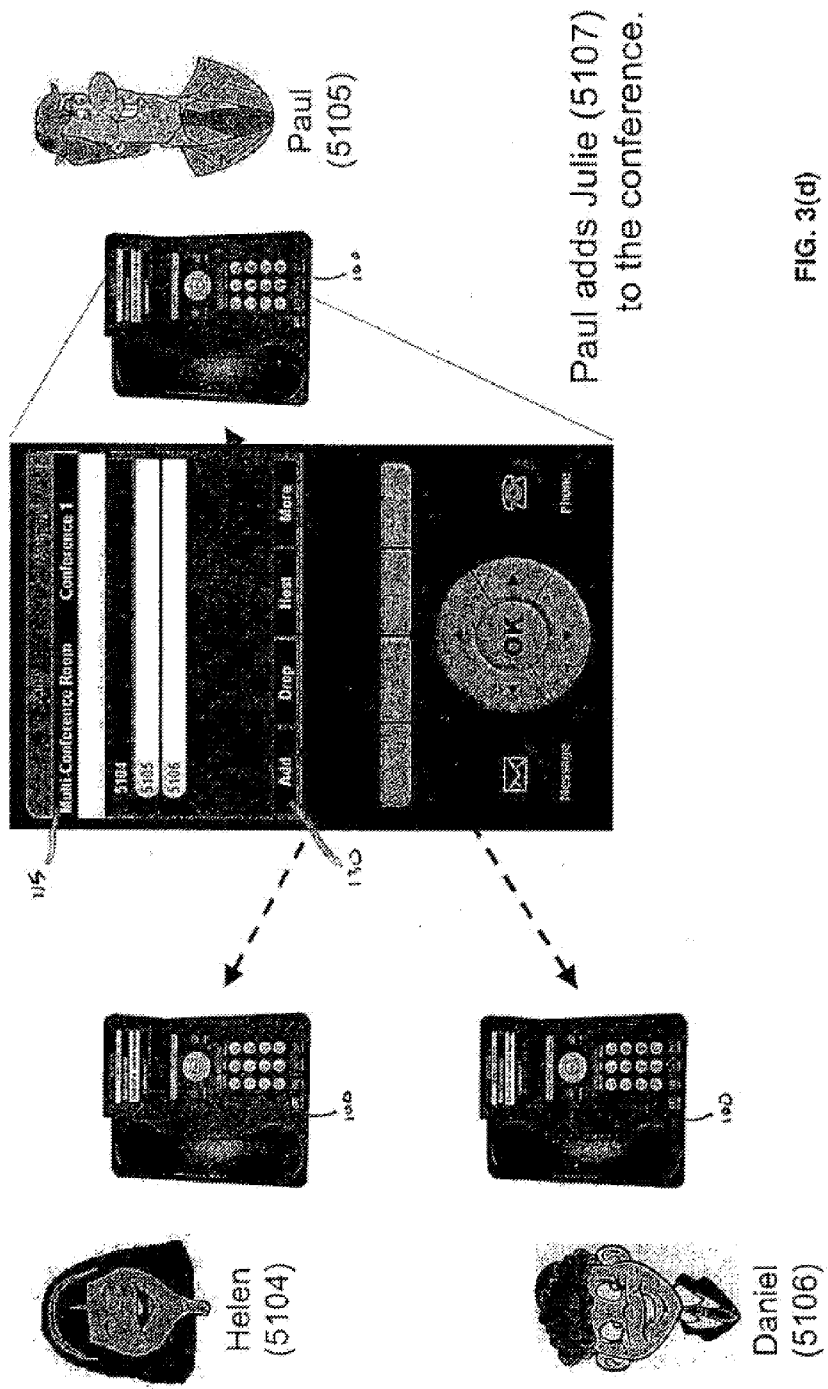
Figure 3E:
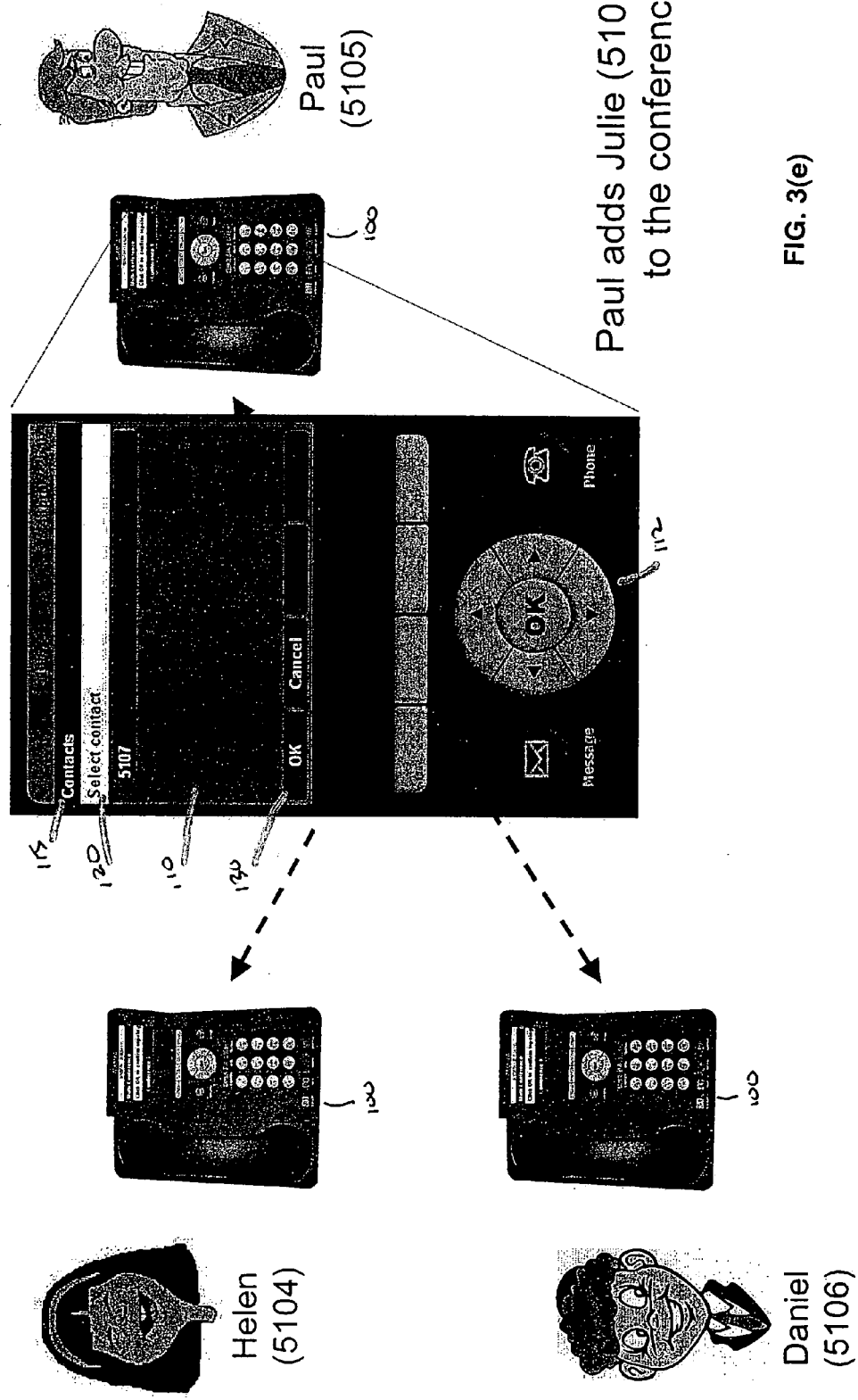
Figure 3F:
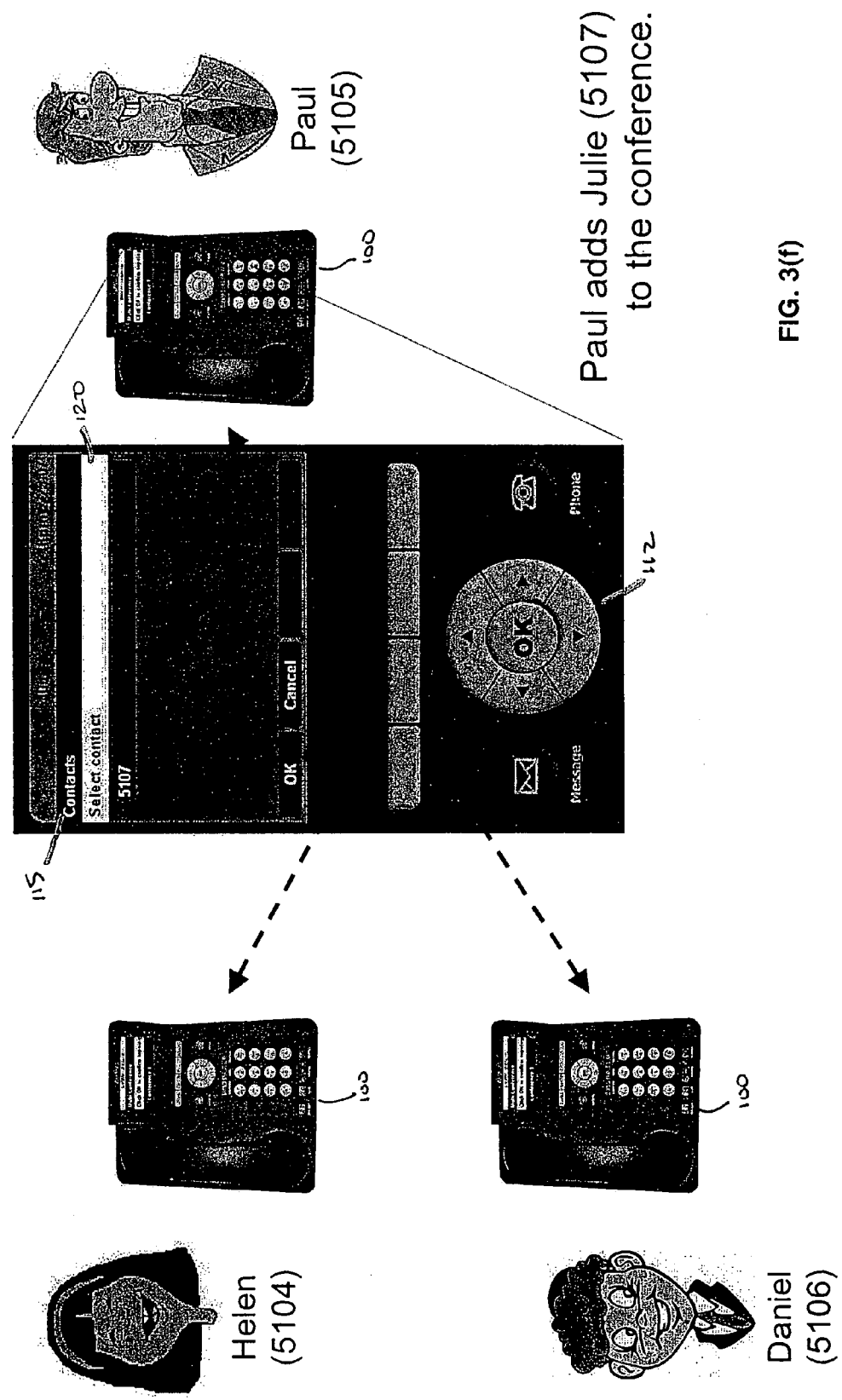
Figure 3G:
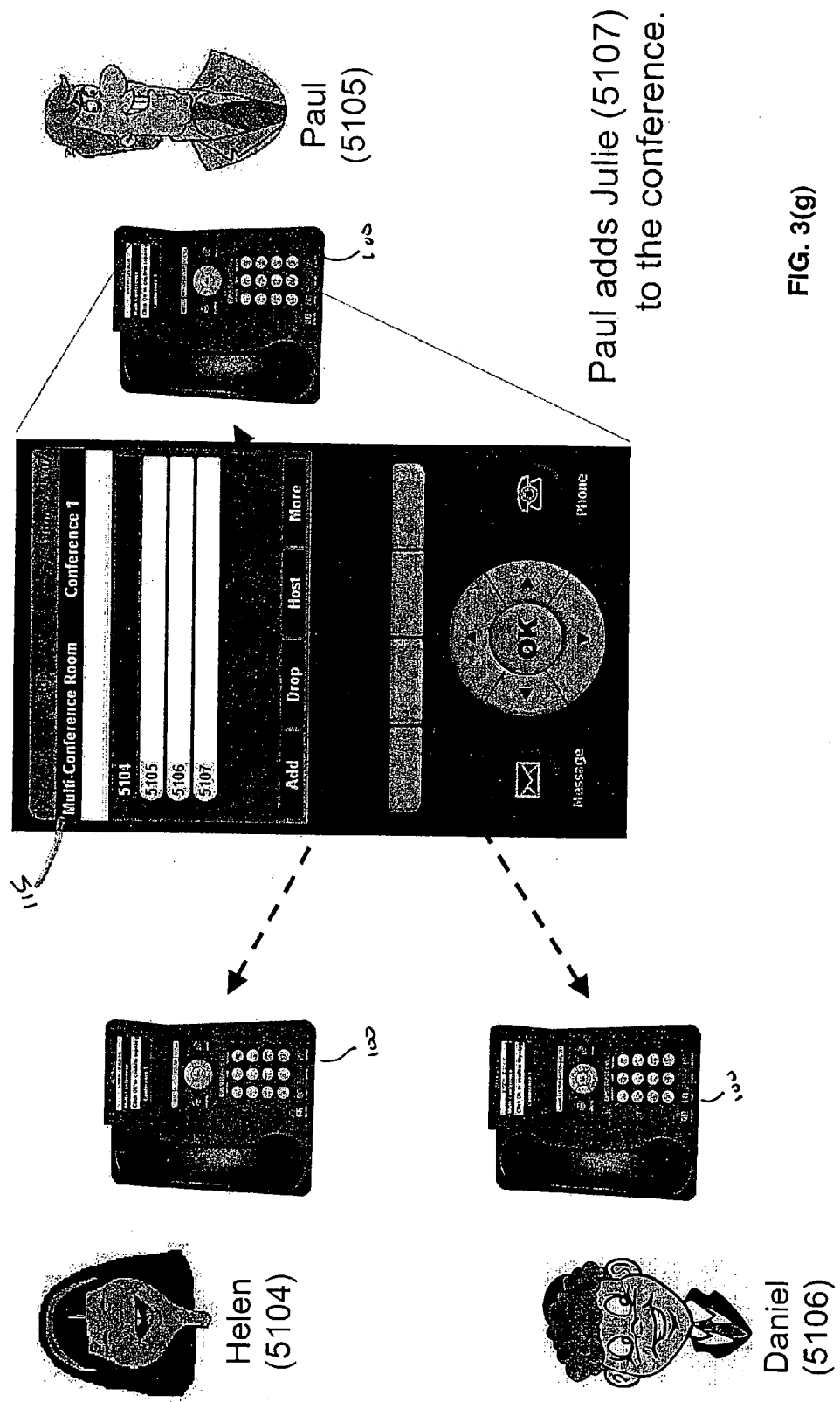
Figure 3H:
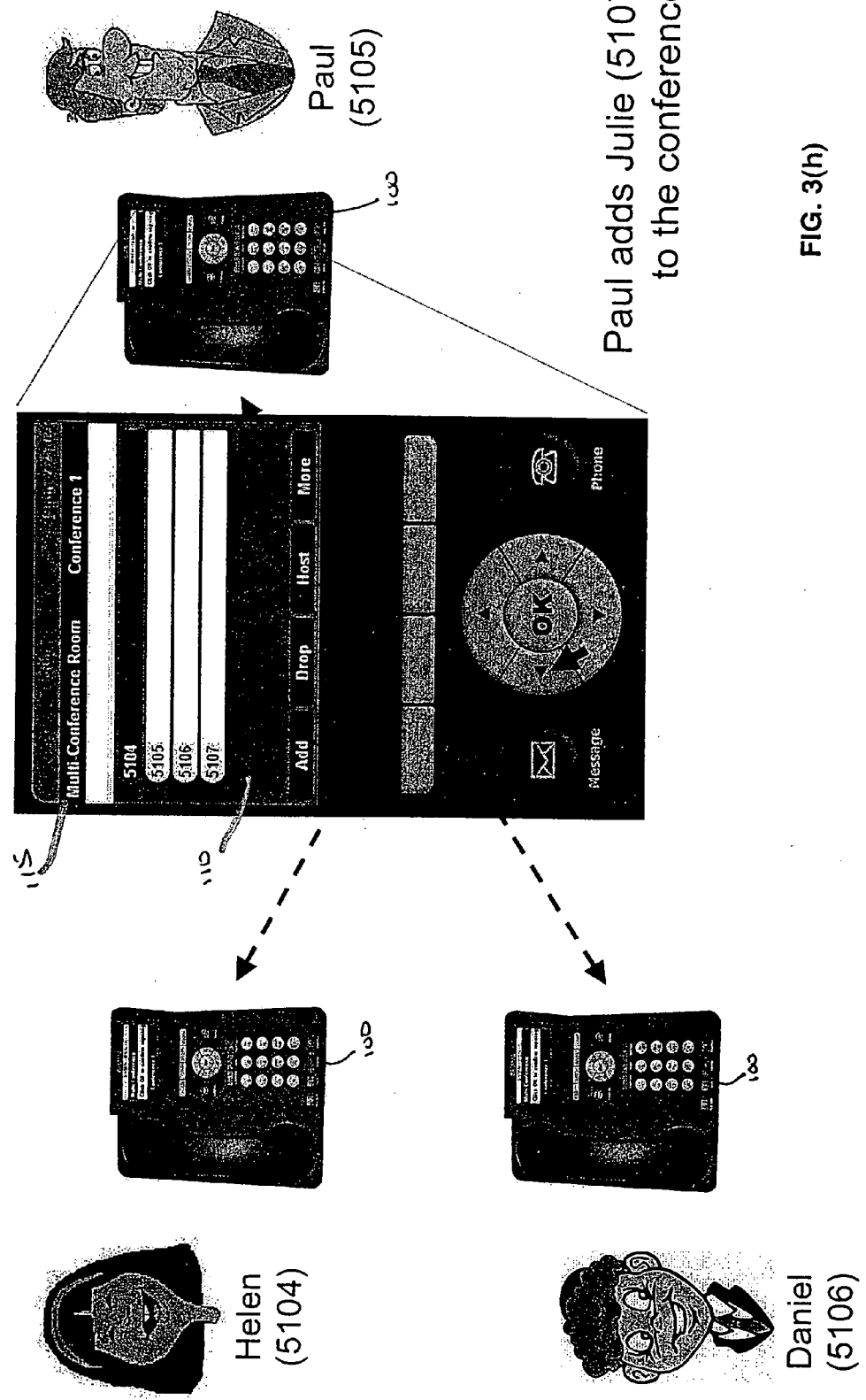
Figure 3I:
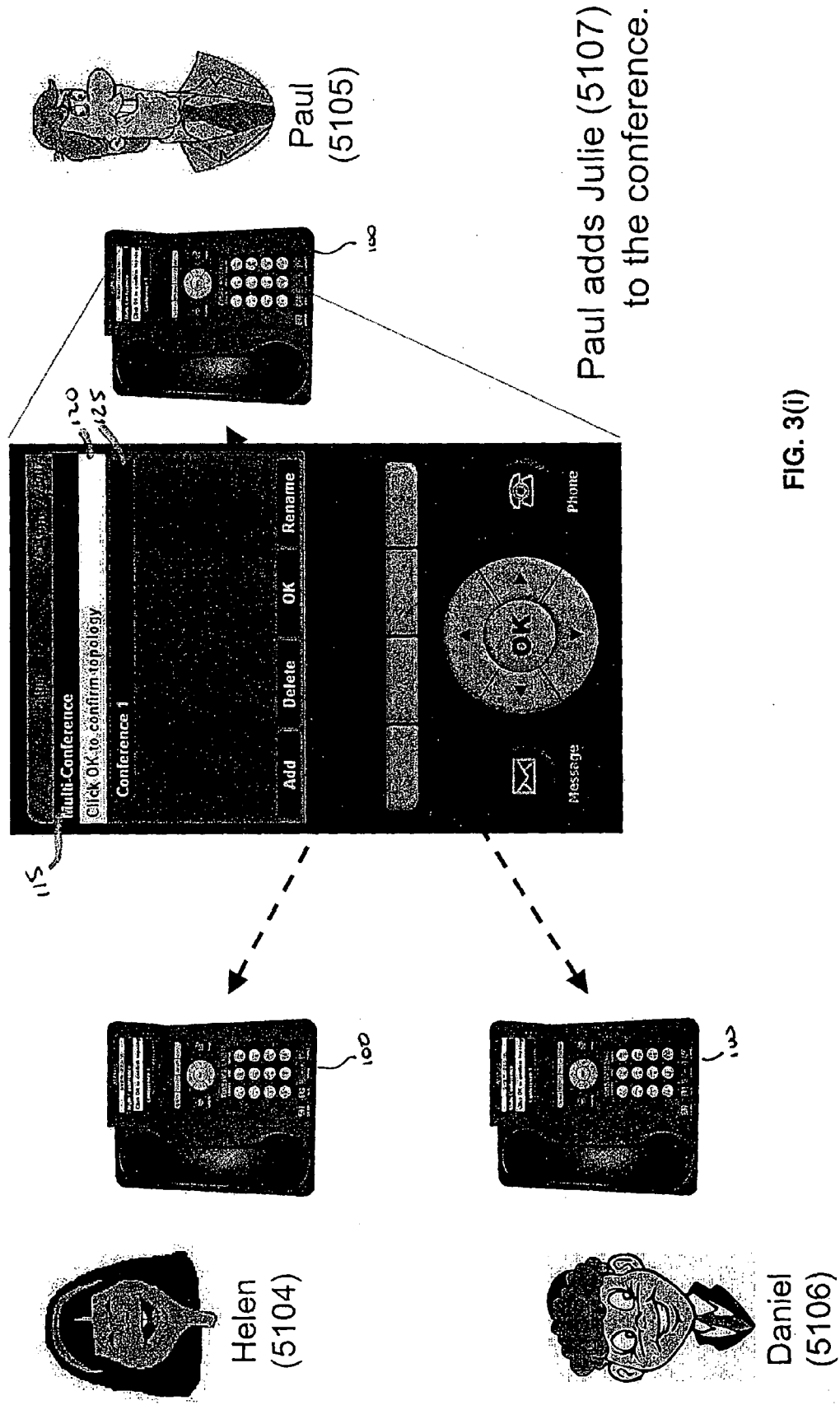
Figure 3J:
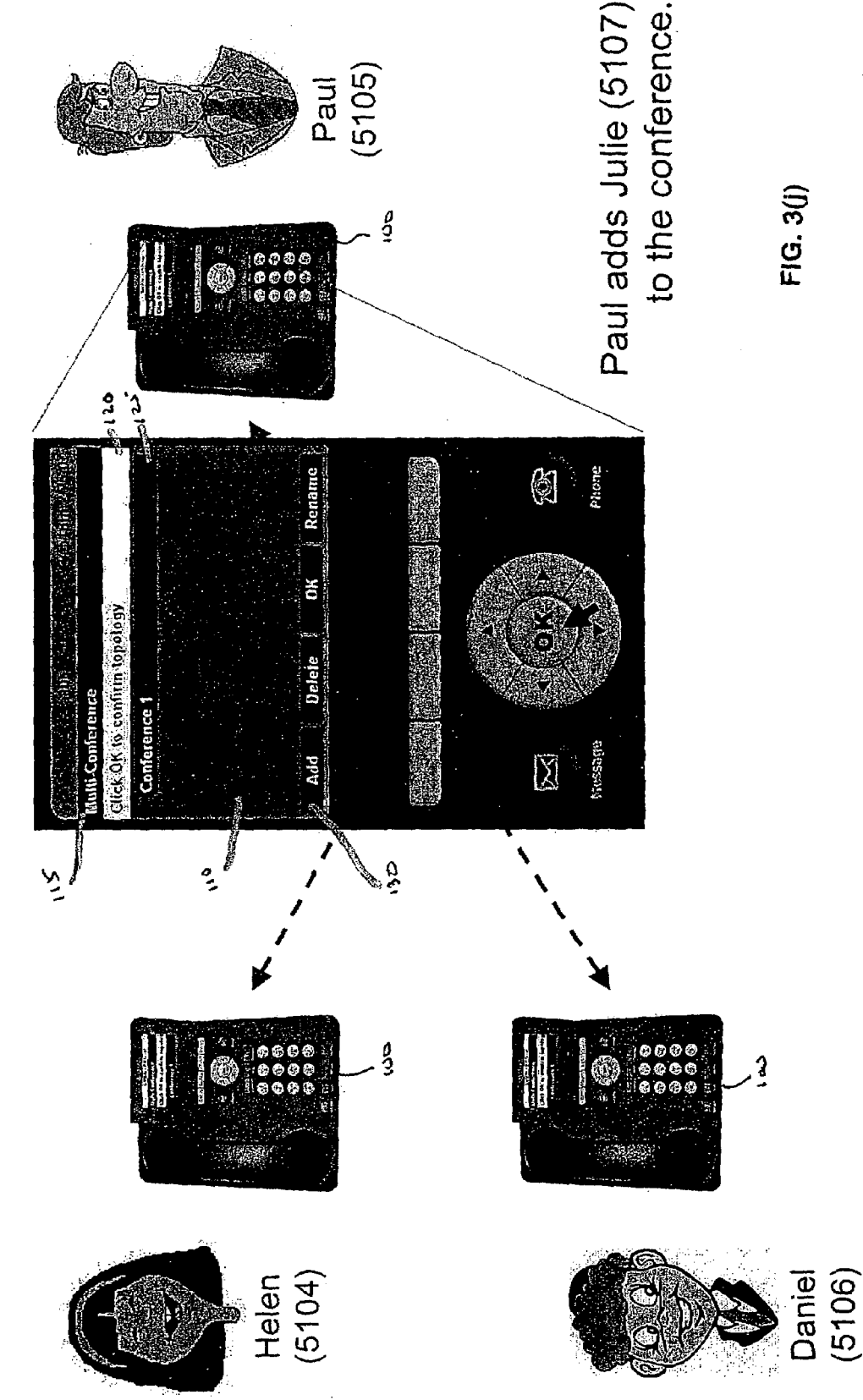

In accordance with the exemplary embodiment, a decision is made during the conference call to add an additional participant J to the conference call, as shown in FIG. 3. Here, participant P can then add a fourth participant J to the first conference call from his endpoint, in accordance with the sequence illustrated by FIGS. 3(a) thru 3(j), respectively. One reason for P being the participant to add participant J to the conference call is based on convenience, such as because participant J is located in the contact list of participant P. FIG. 3(a) is an exemplary illustration of the display area of the apparatus or endpoint device provided to the users pursuant to the extension or addition of an additional participant to the conference call. The addition of a participant or extension of the conference call occurs when participant P, for example, engages the key 130' to activate the add function indicated by the selection area 130 of the display 110.

Figure 4:
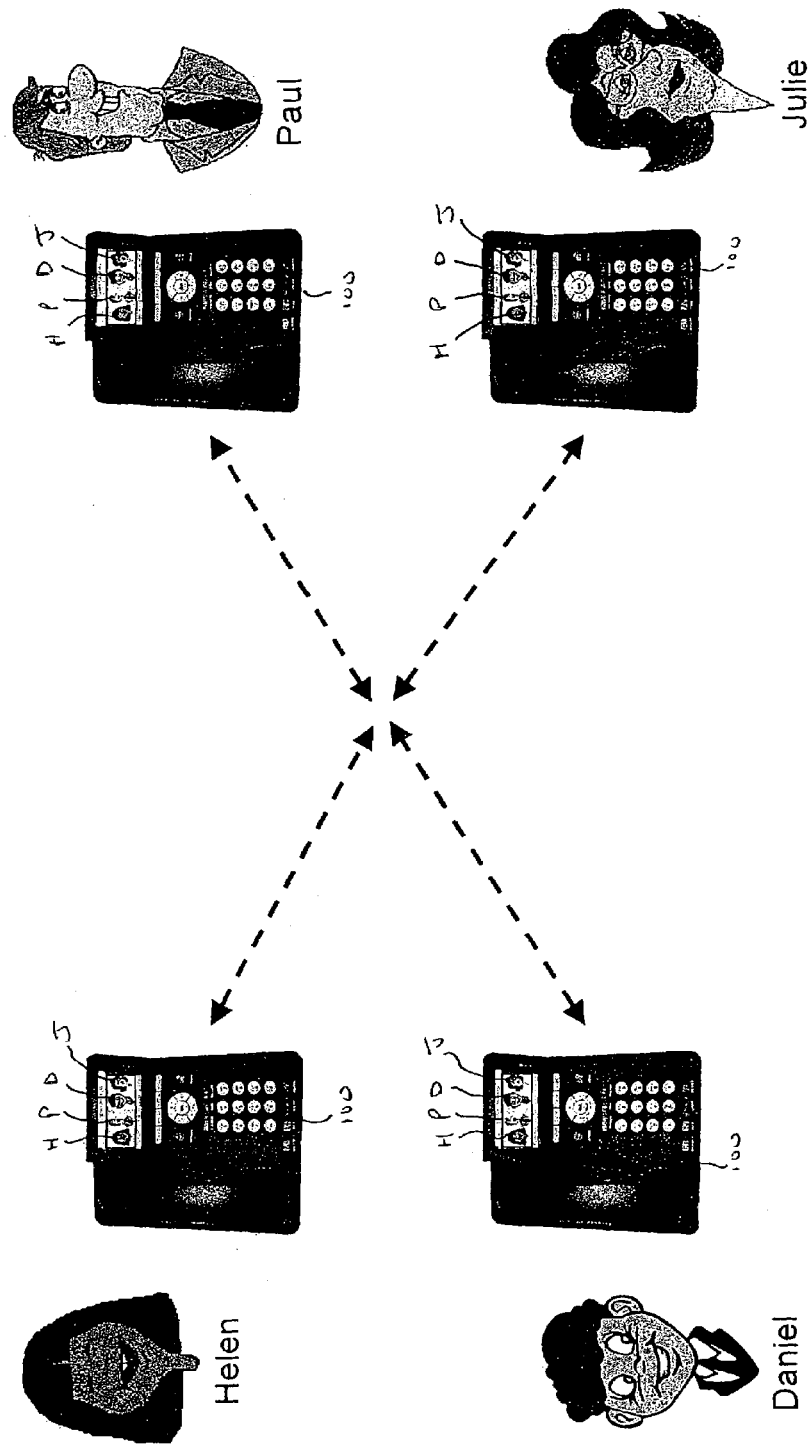
FIG. 4 is an exemplary graphical illustration of the apparatus or endpoint device in the extended conference call.

Upon addition of participant J to the conference call, the apparatus or endpoint device of participant H and participant D become updated to show that participant J is an additional participant in the conference call, as shown in FIG. 4, where the available functions can be displayed in the display on the apparatus or endpoint device 100 of each of the conference call participants as shown in FIG. 4(a). It should be readily understood that participant H could just as easily be the person to initiate the addition of participants to the conference call.

Figure 5:
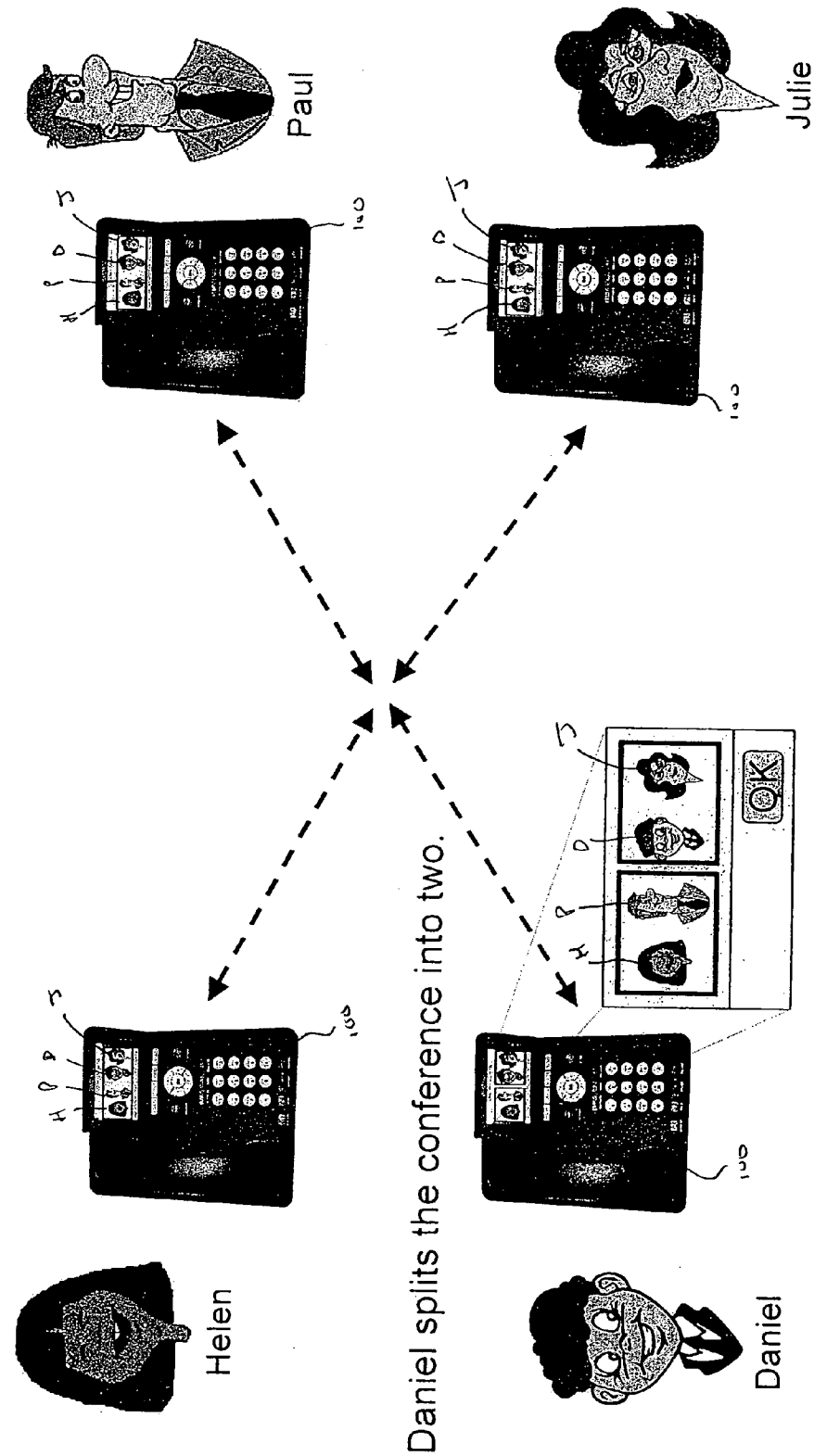
FIG. 5 is an exemplary graphical illustration of the generation of a split of the conference call into multiple conference calls.
Figure 5A:
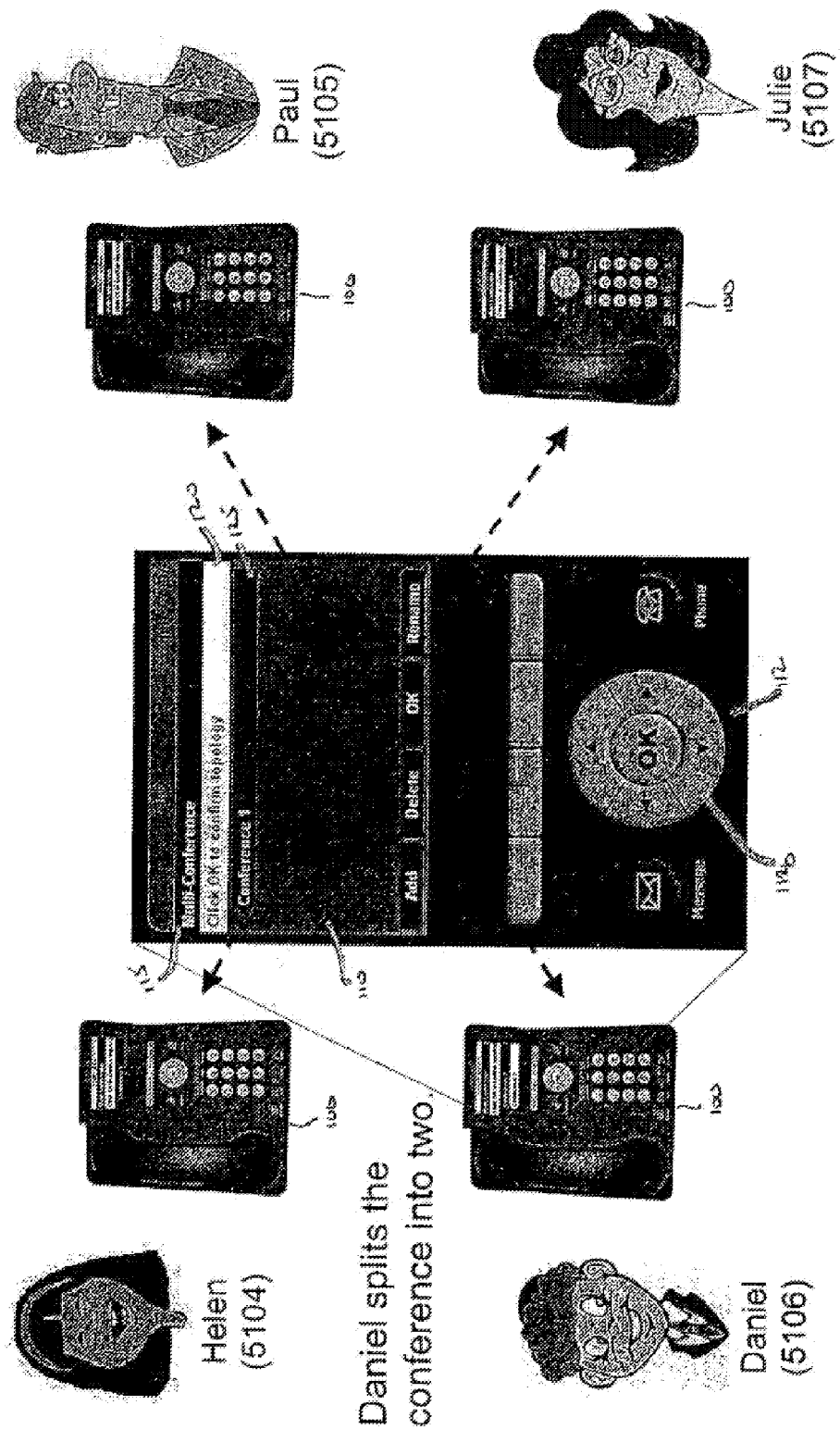
FIGS. 5(a) thru 5(p) are exemplary illustrations of the display area of the apparatus or endpoint device provided to the users pursuant to the split of the conference call into multiple conference calls.
Figure 5B:
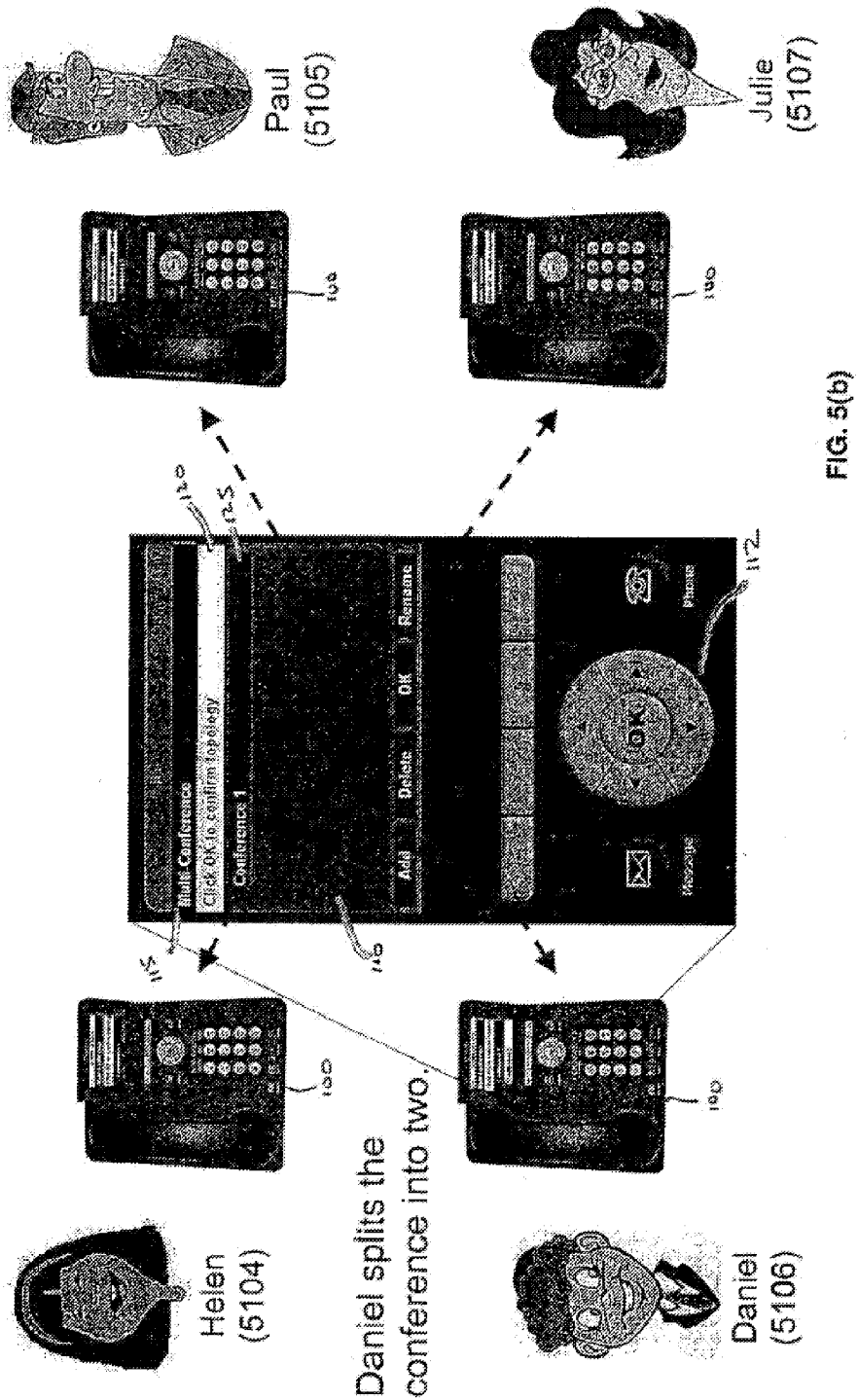
Figure 5C:
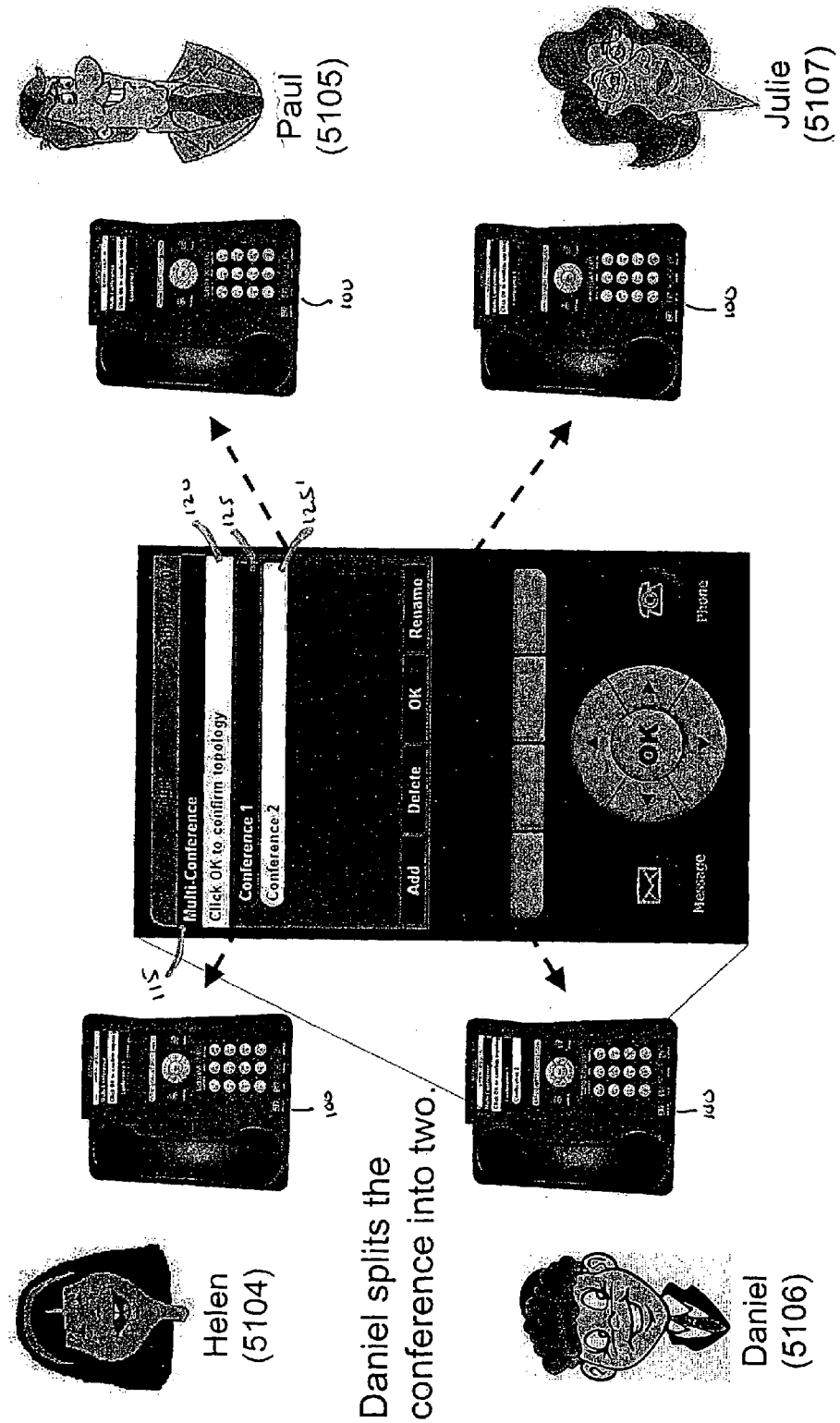
Figure 5D:
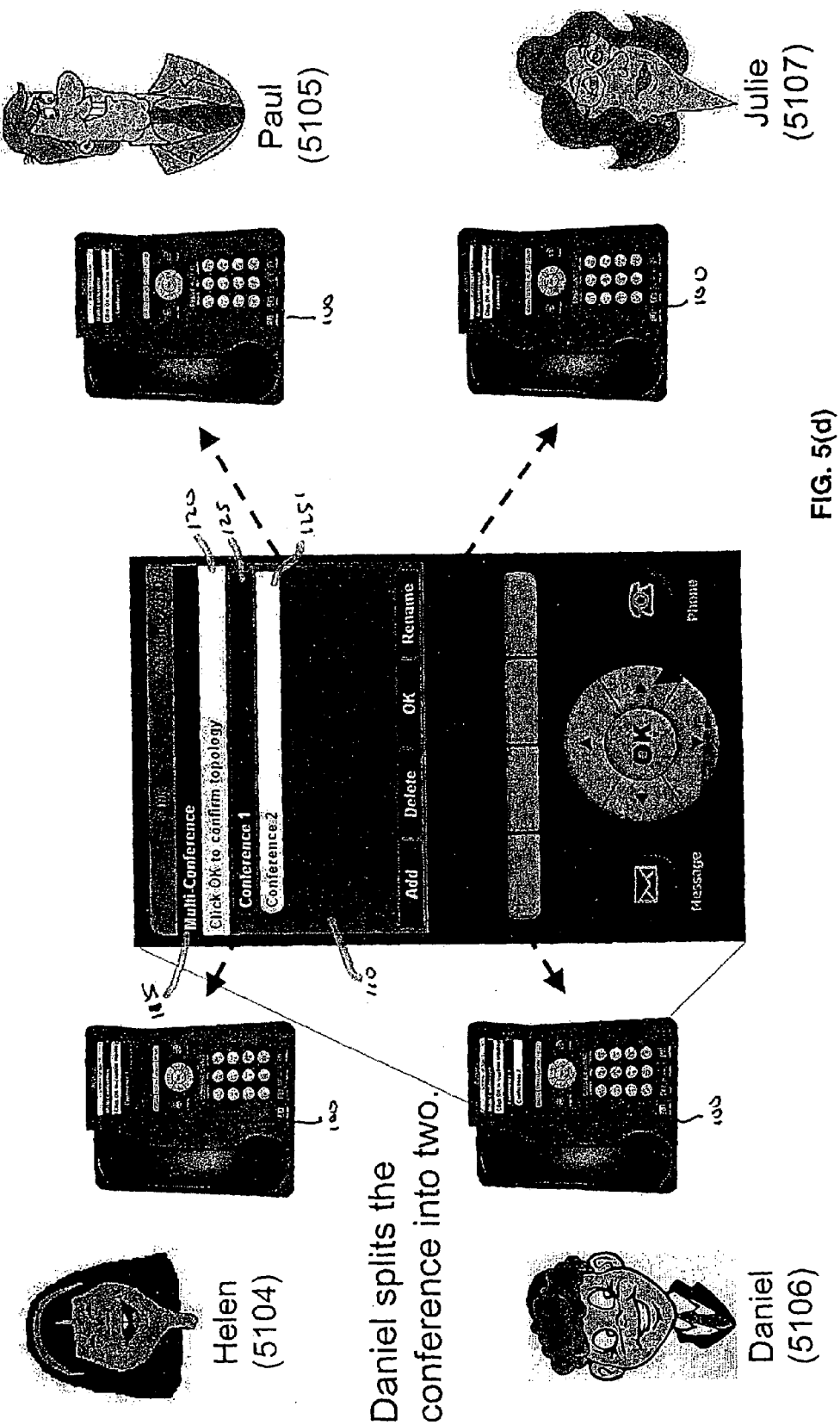
Figure 5E:
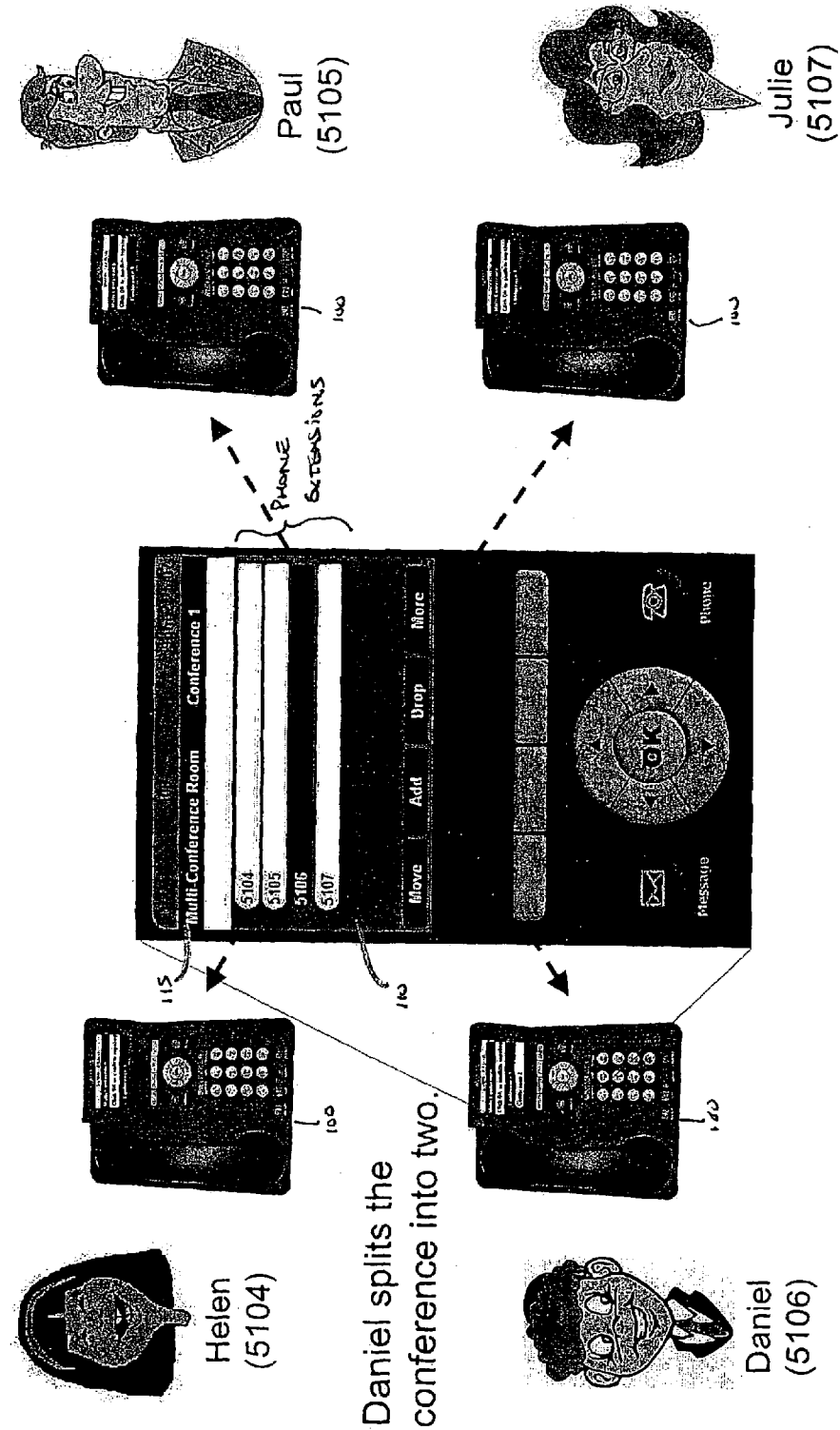
Figure 5F:
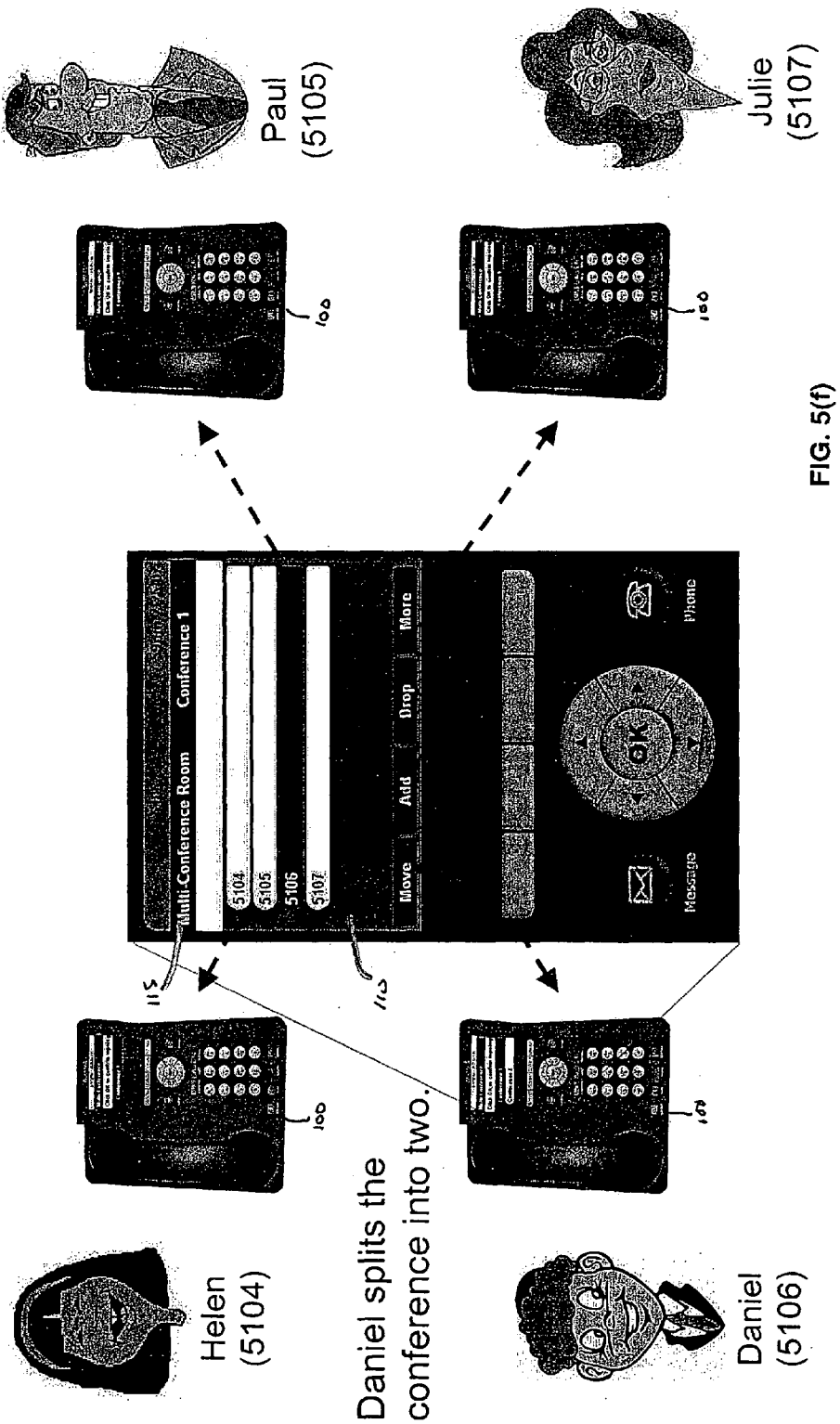
Figure 5G:
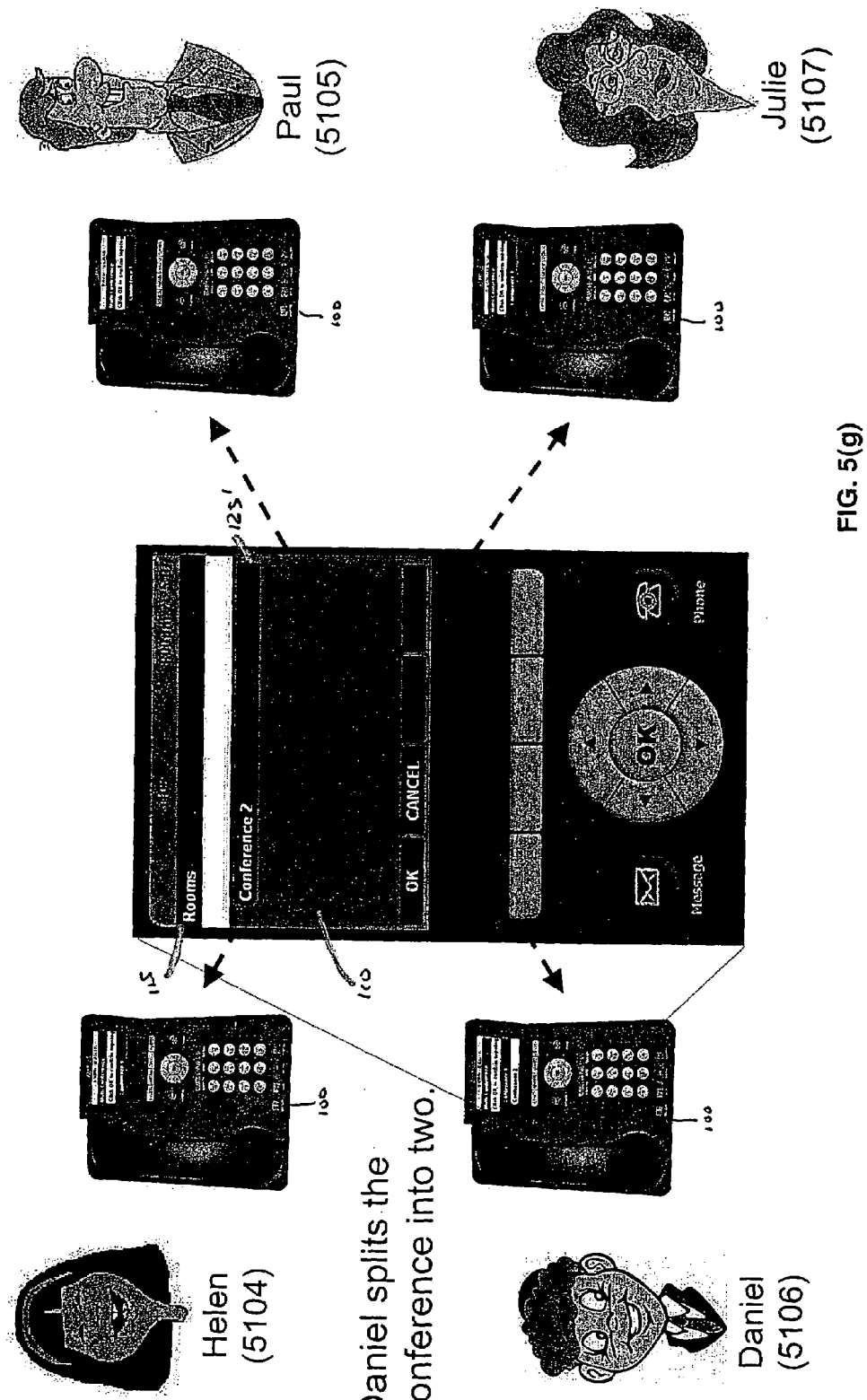
Figure 5H:
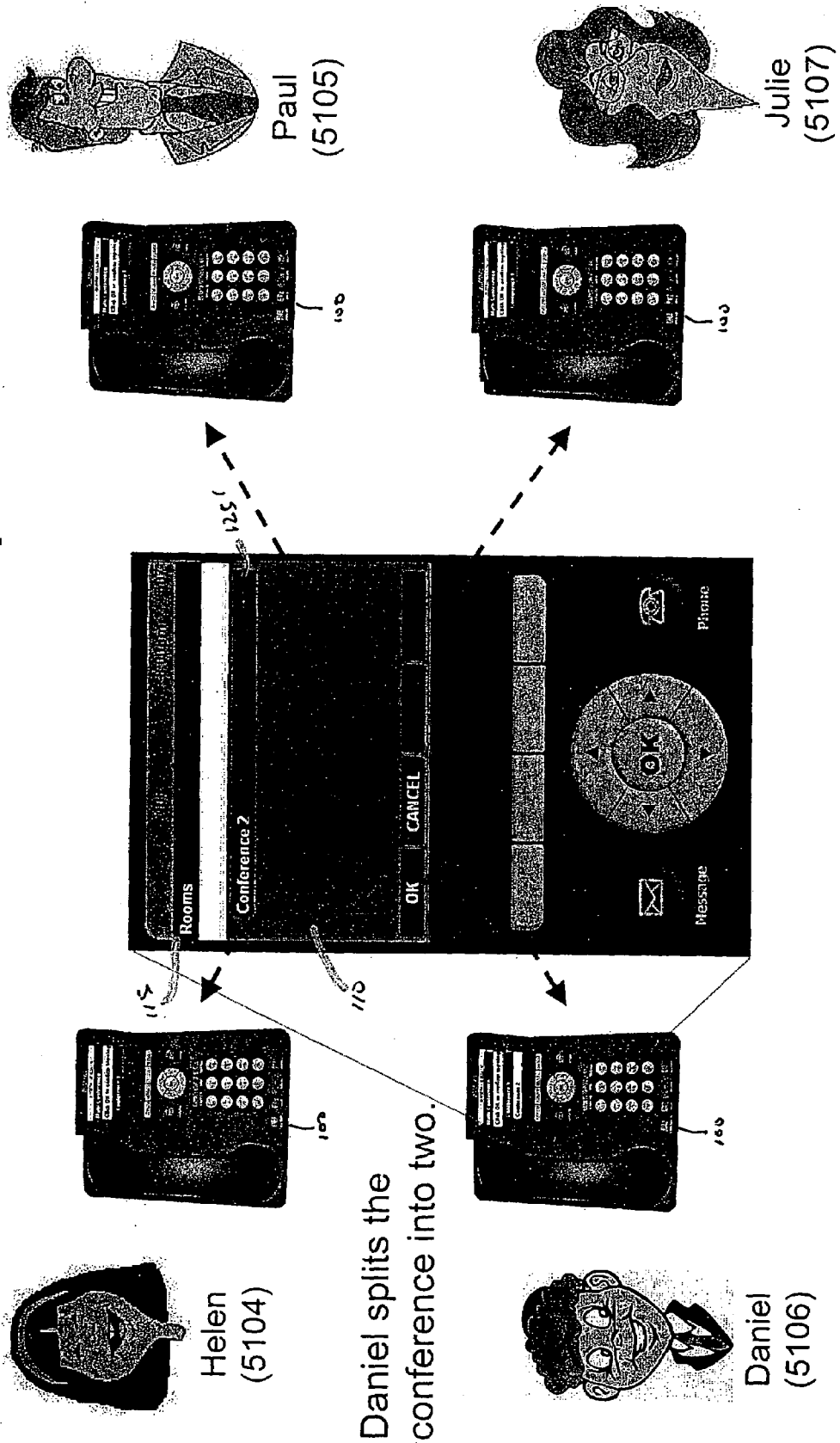
Figure 5J:
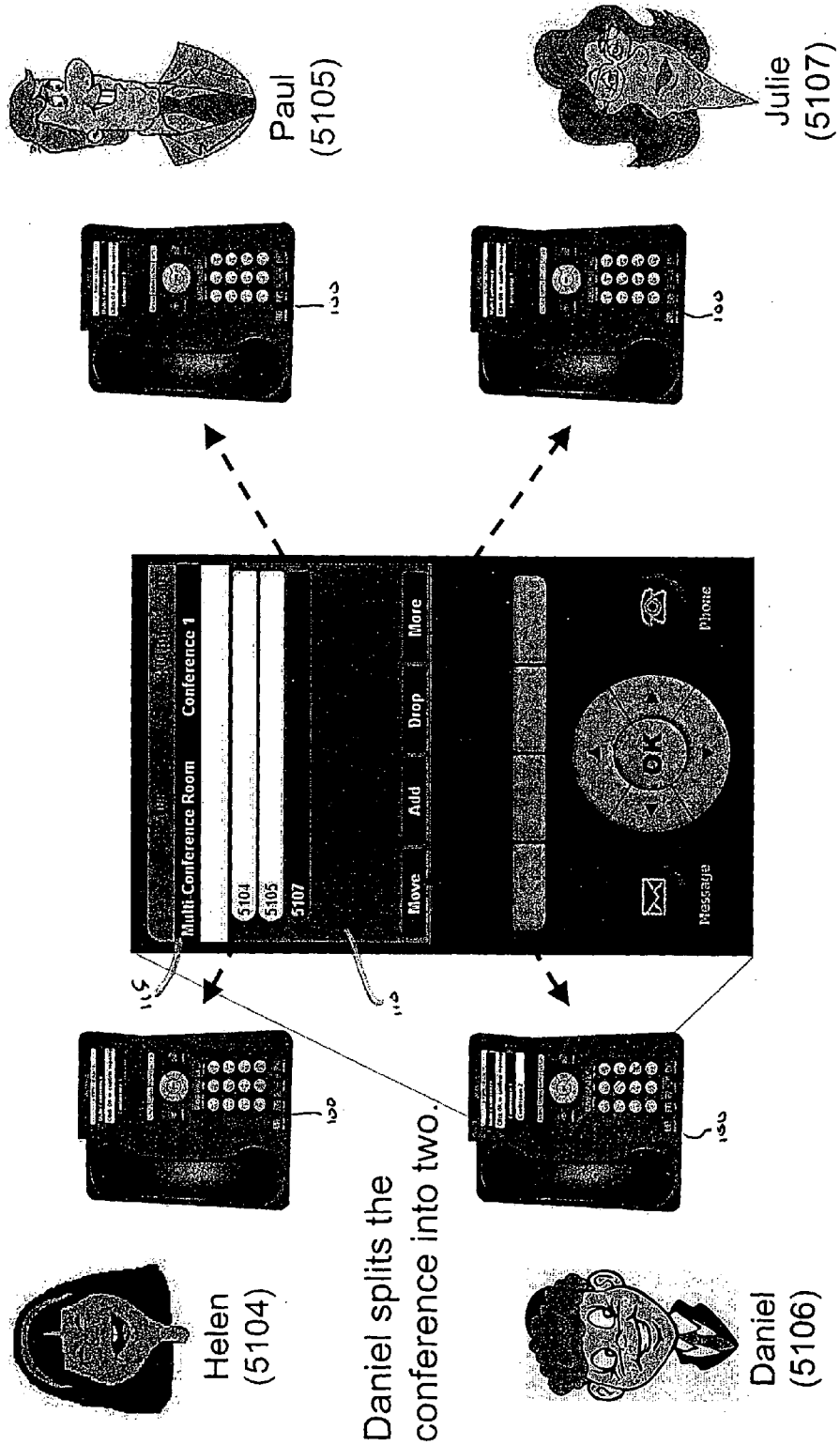
Figure 5K:
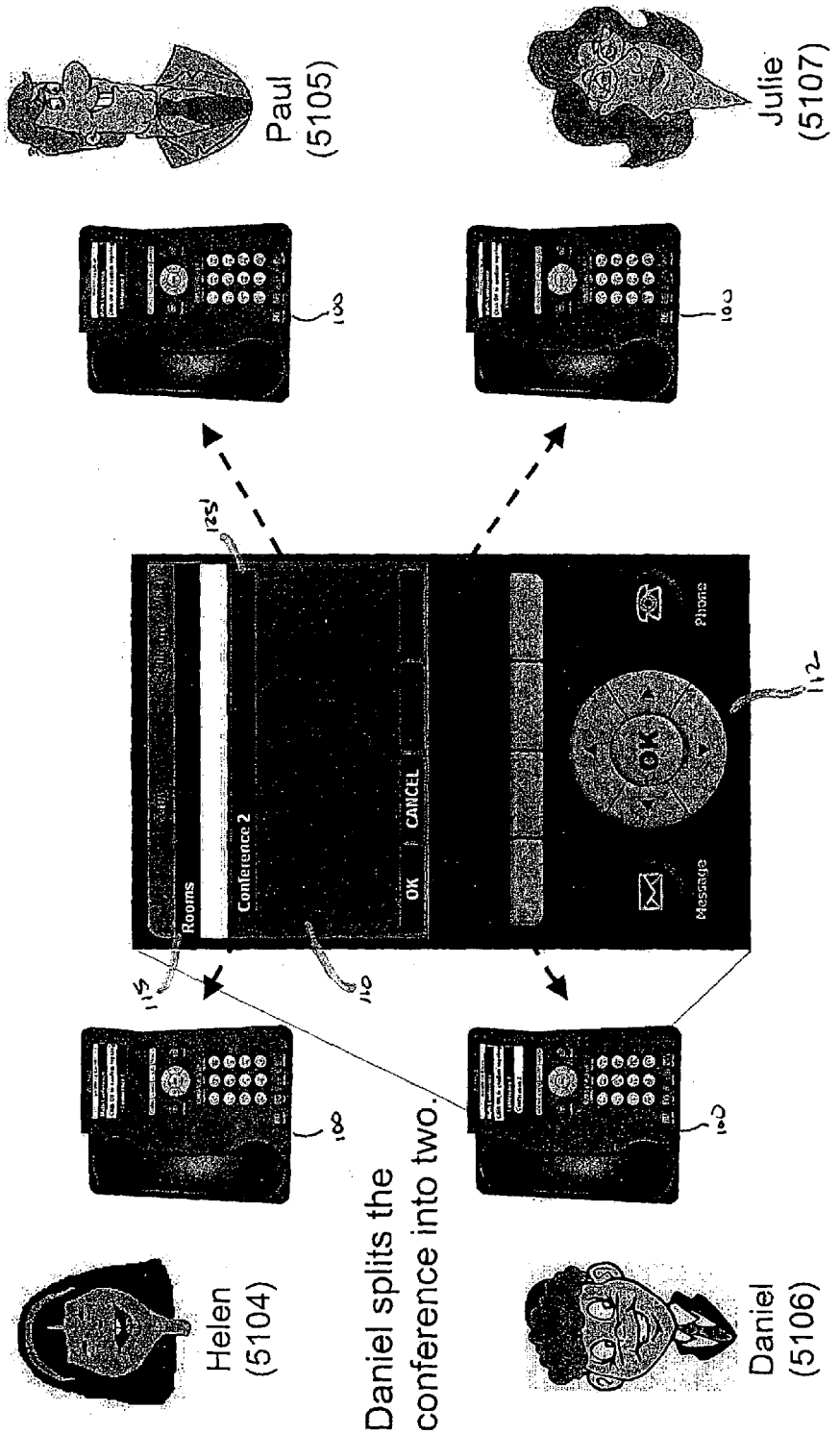
Figure 5M:
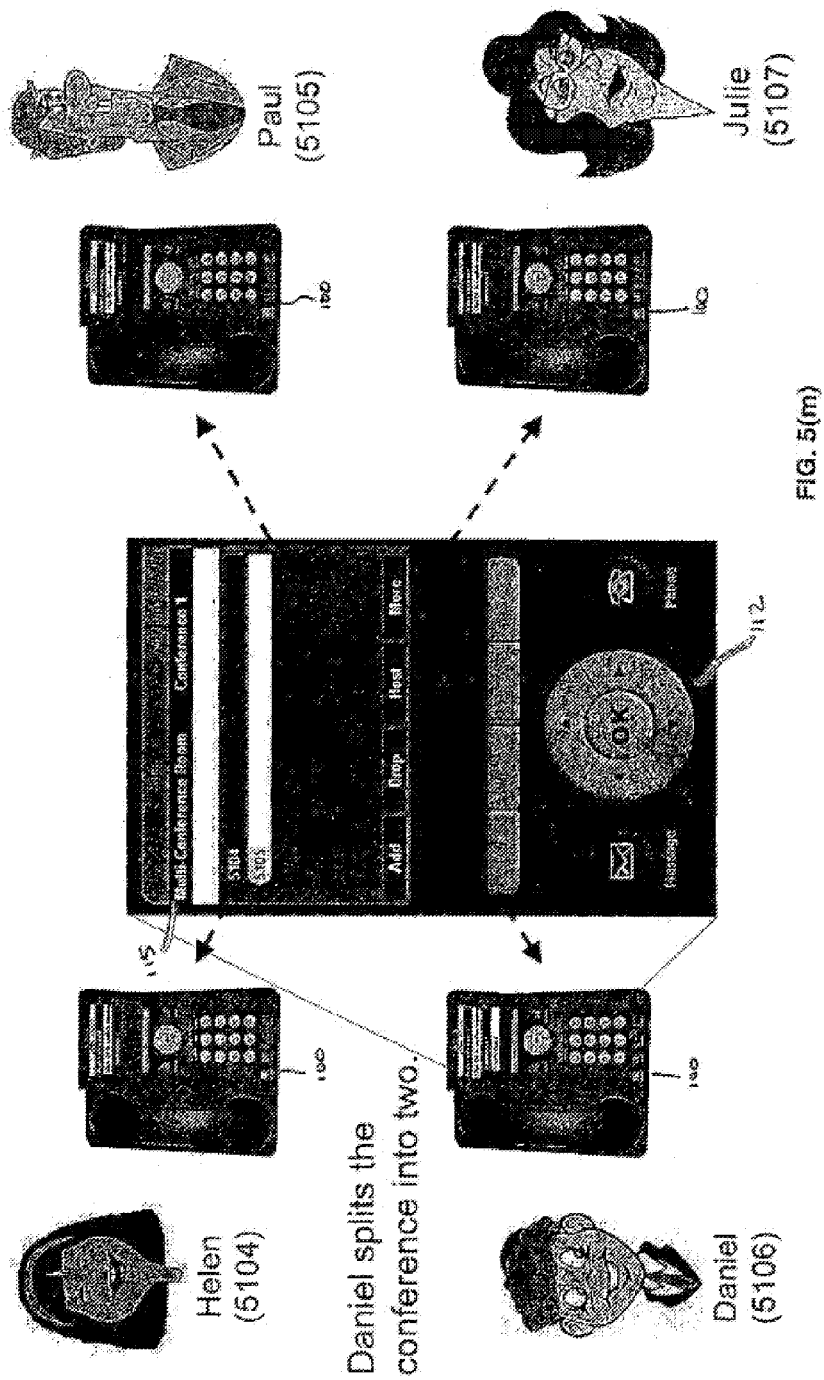
Figure 5O:
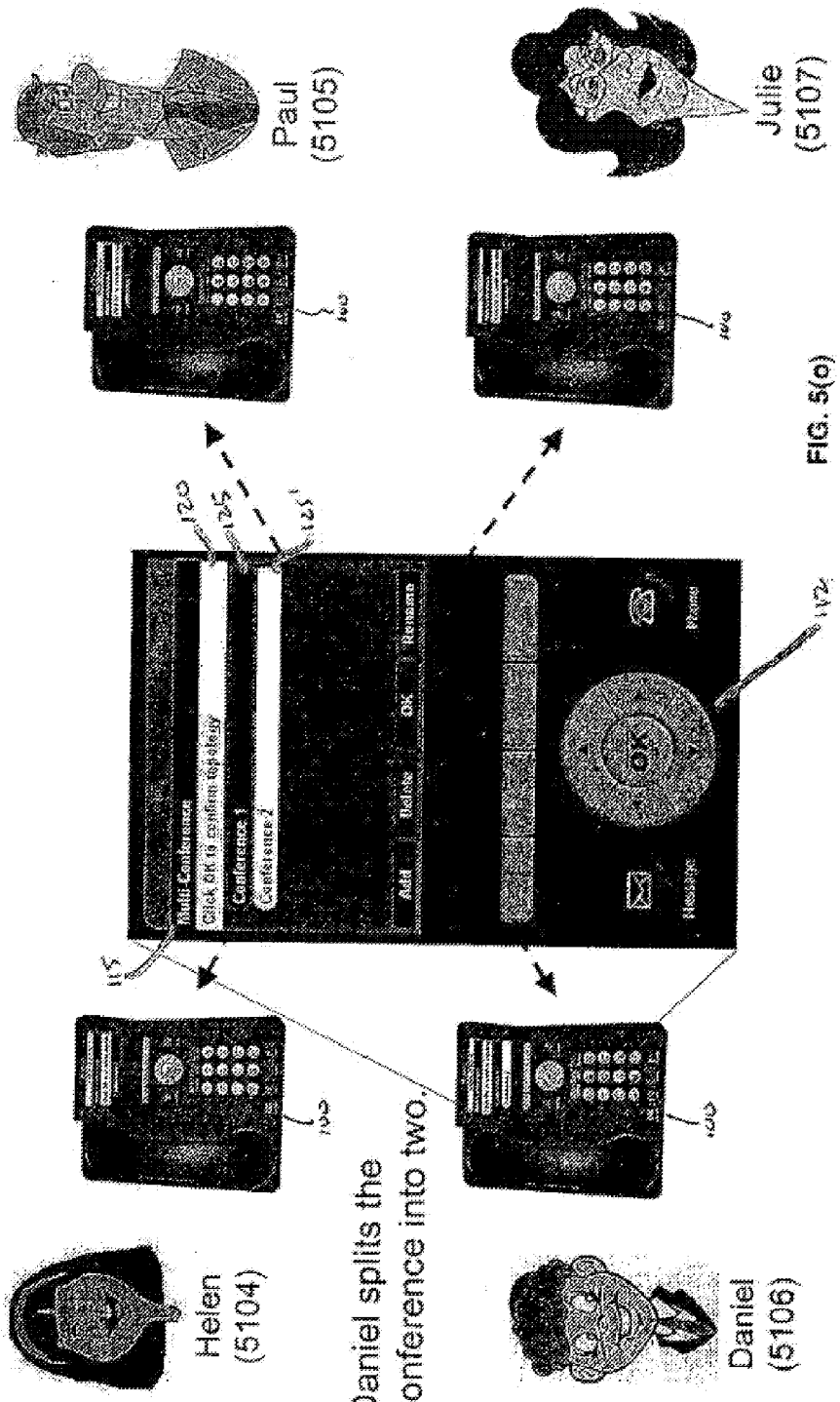
Figure 5P:
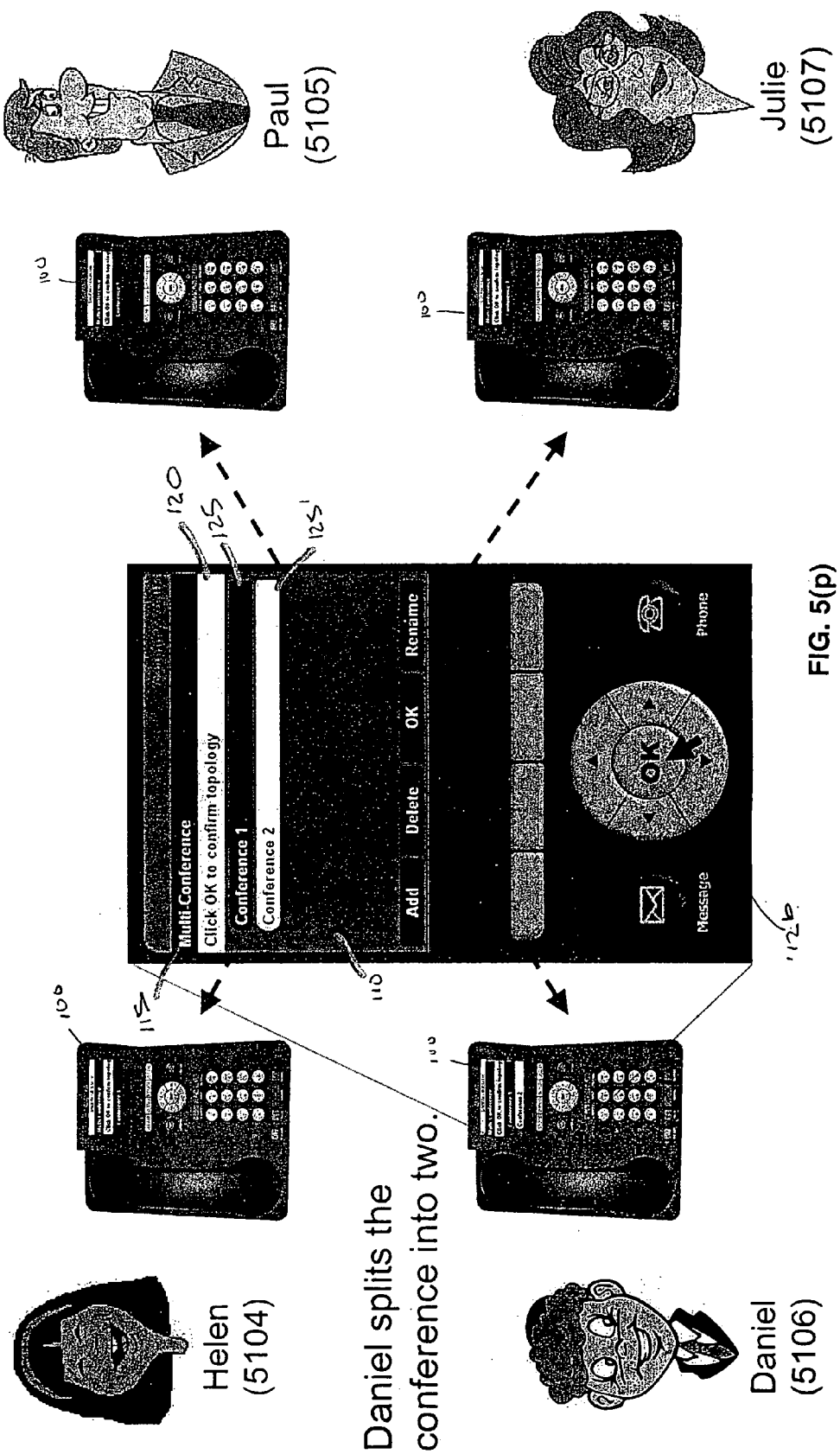

During the conference call, participant D can split the first conference call into a pair of calls by using his endpoint device 100 when he wishes to conduct a "sidebar" conversation with participant J, as shown in FIG. 5. Here, the endpoint device 100 at the location of participant D shows that participants H and P are grouped together and that participants D and J are grouped together to indicate that a split of the first conference call between the participants has occurred, in accordance with the sequence illustrated by FIGS. 5(a) thru 5(p). In particular, FIG. 5(p) is an exemplary illustration of the display area of the apparatus or endpoint device provided to the users pursuant to the split of the conference call into multiple conference calls. Here, the screen of the apparatus or endpoint device of user D illustrates that another Conference section, i.e., Conference 2 section 125' can be selected. It should readily be appreciated that the selection of the specific conference occurs through use of the thumb-dial mechanism 112 in a conventional manner with respect to operation of the thumb-dial mechanism itself.

Figure 6:
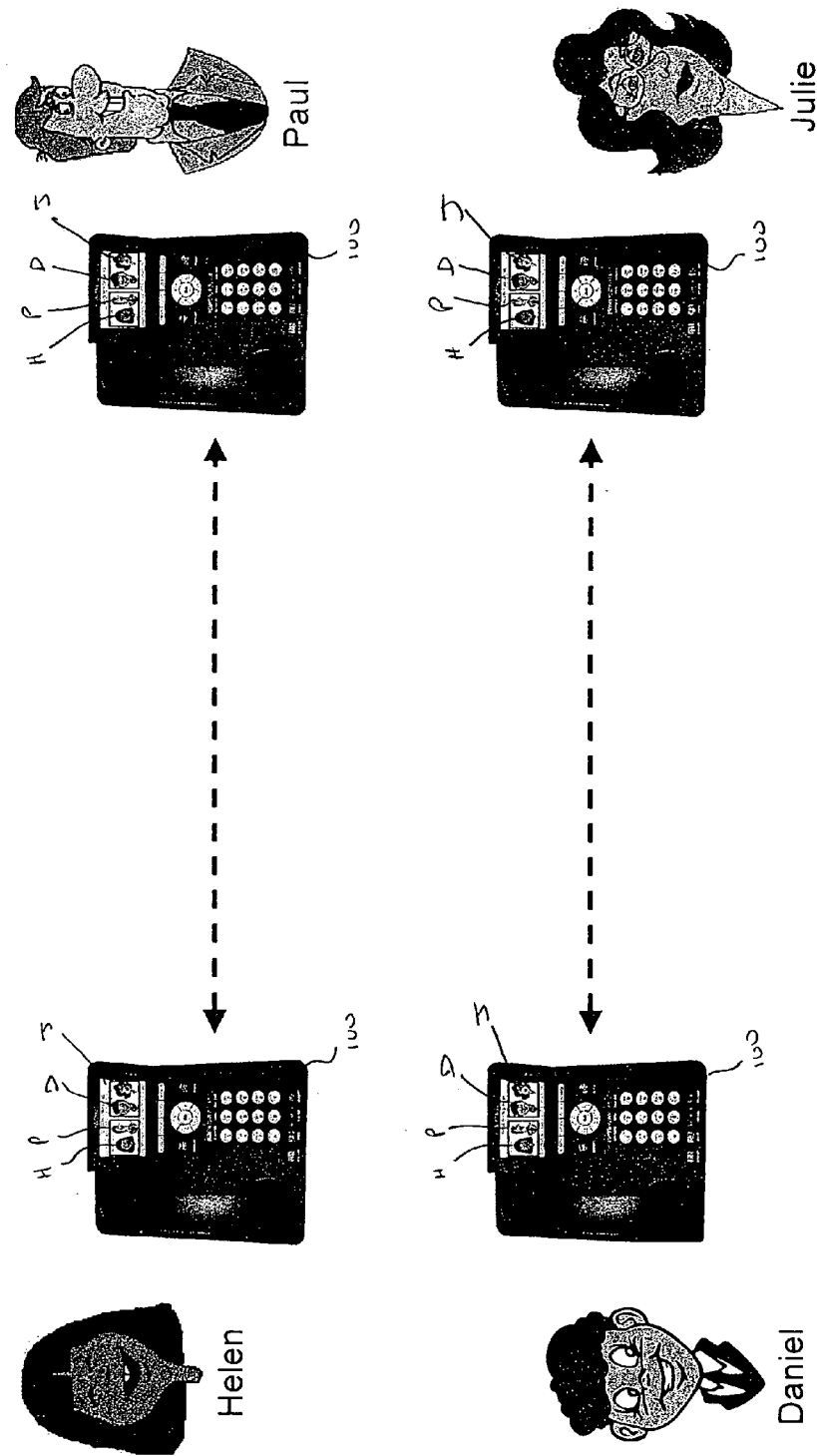
FIG. 6 is a graphical illustration of multiple conference calls in accordance with an embodiment of the invention.

As shown in FIG. 6, the split of the conference call entails a first call involving participant H and participant P and a second call involving participant D and participant J. In addition, the apparatus or endpoint device 100 of all four participants will show the two conference calls with corresponding participants, where the available functions can be displayed in the display on the apparatus or endpoint device 100 of each of the conference call participants as shown in FIG. 6(a).

Figure 7:
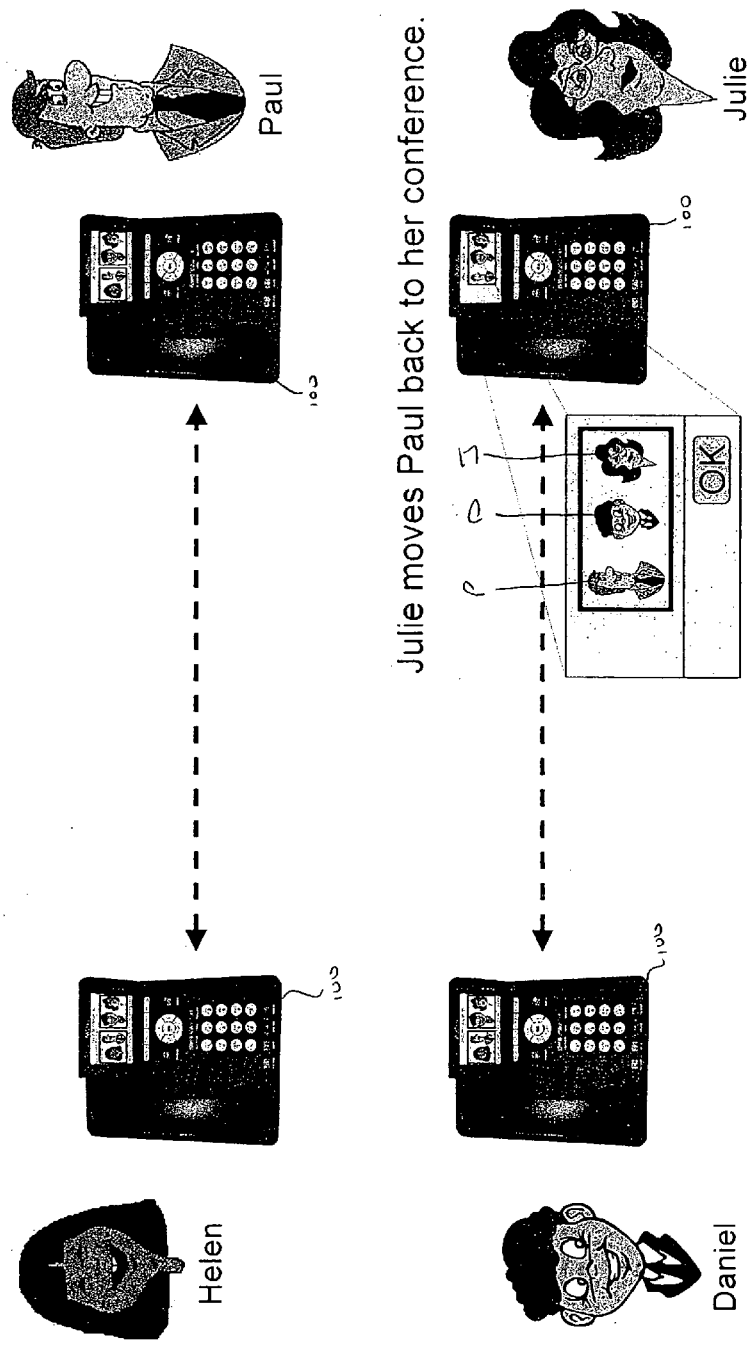
FIG. 7 is a graphical illustration of the display area of the apparatus or endpoint device provided to the users pursuant to moving a participant into a new conference call that is created by dividing an existing conference call.
Figure 7A:
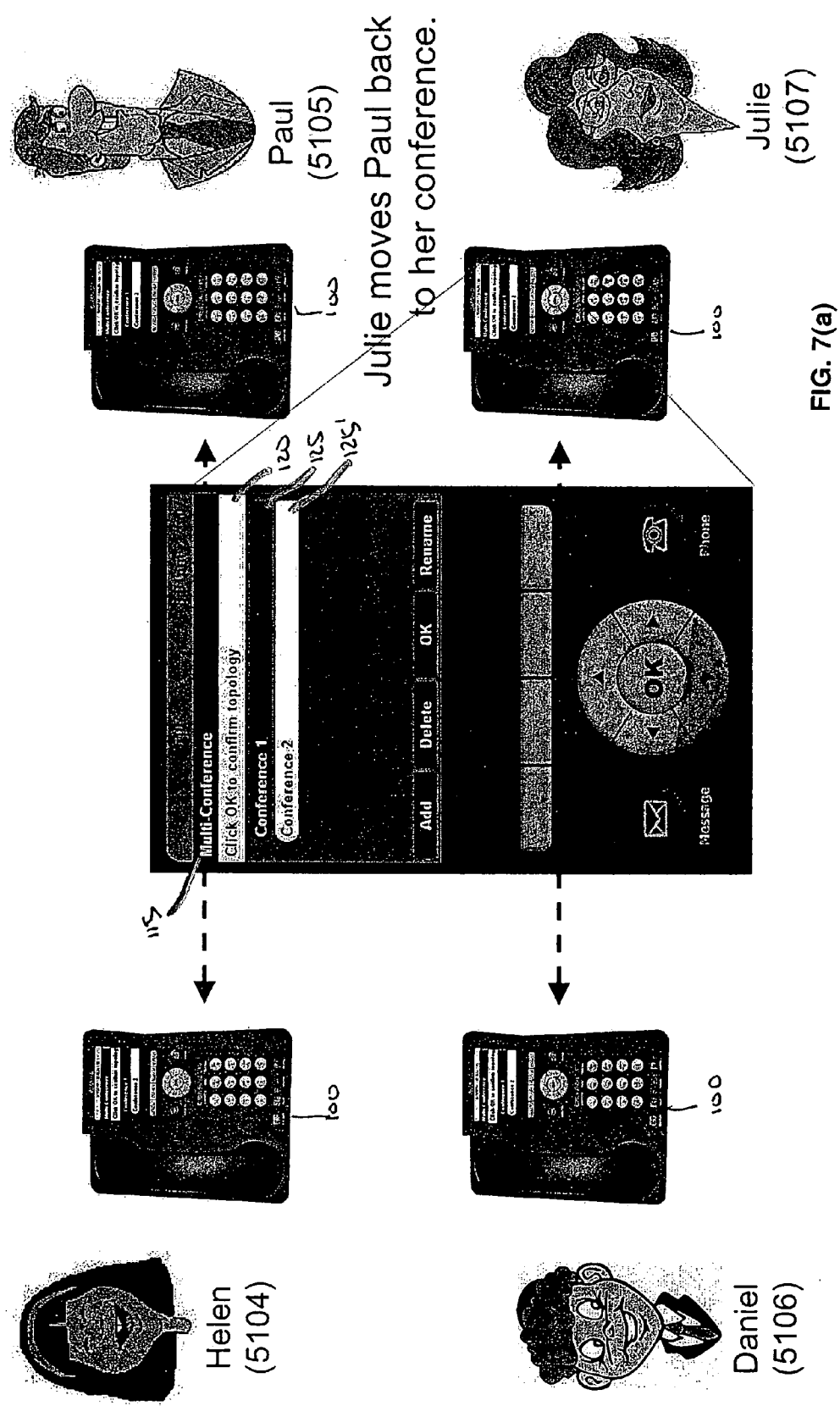
Figure 7B:
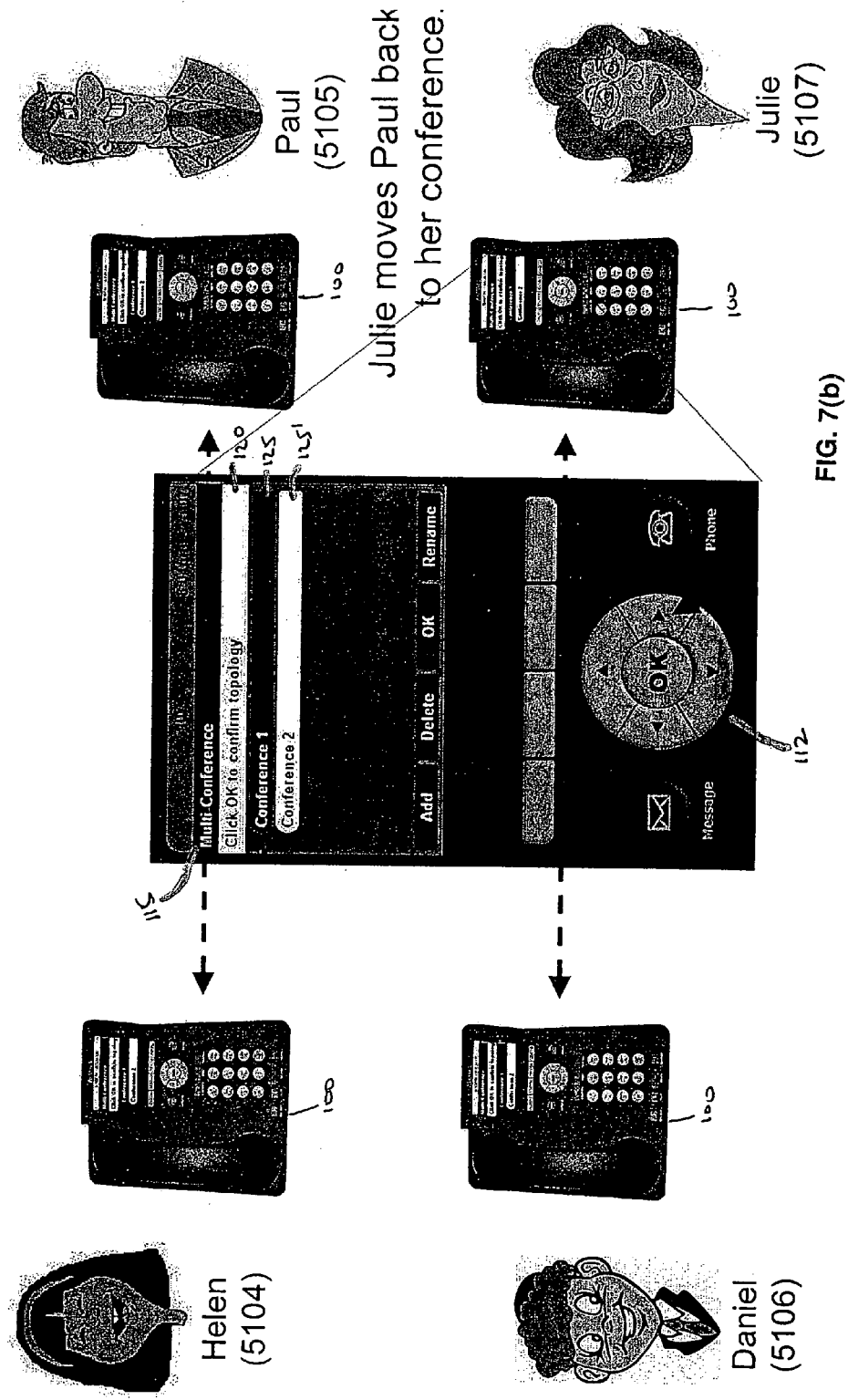
Figure 7C:
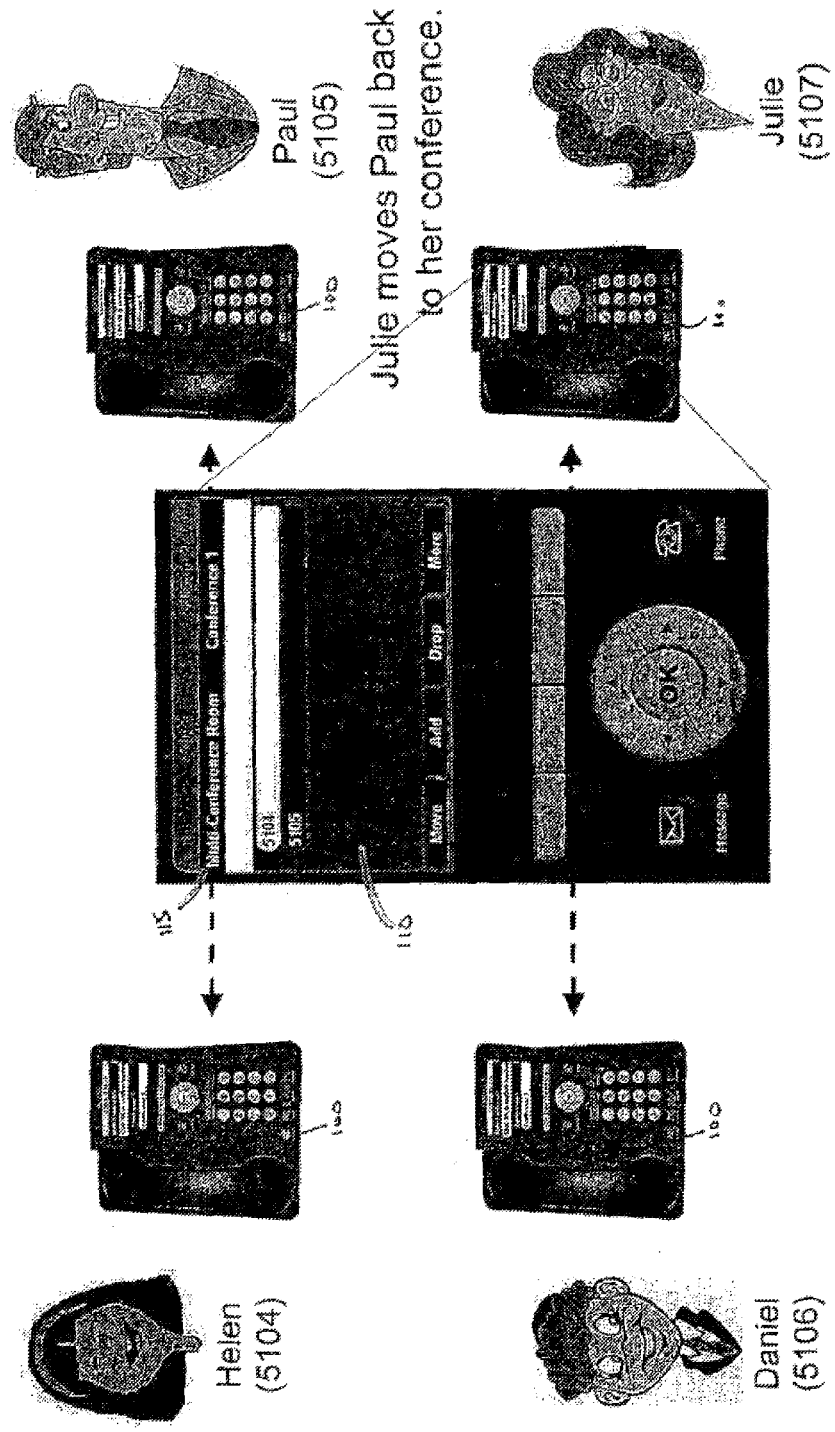
Figure 7D:
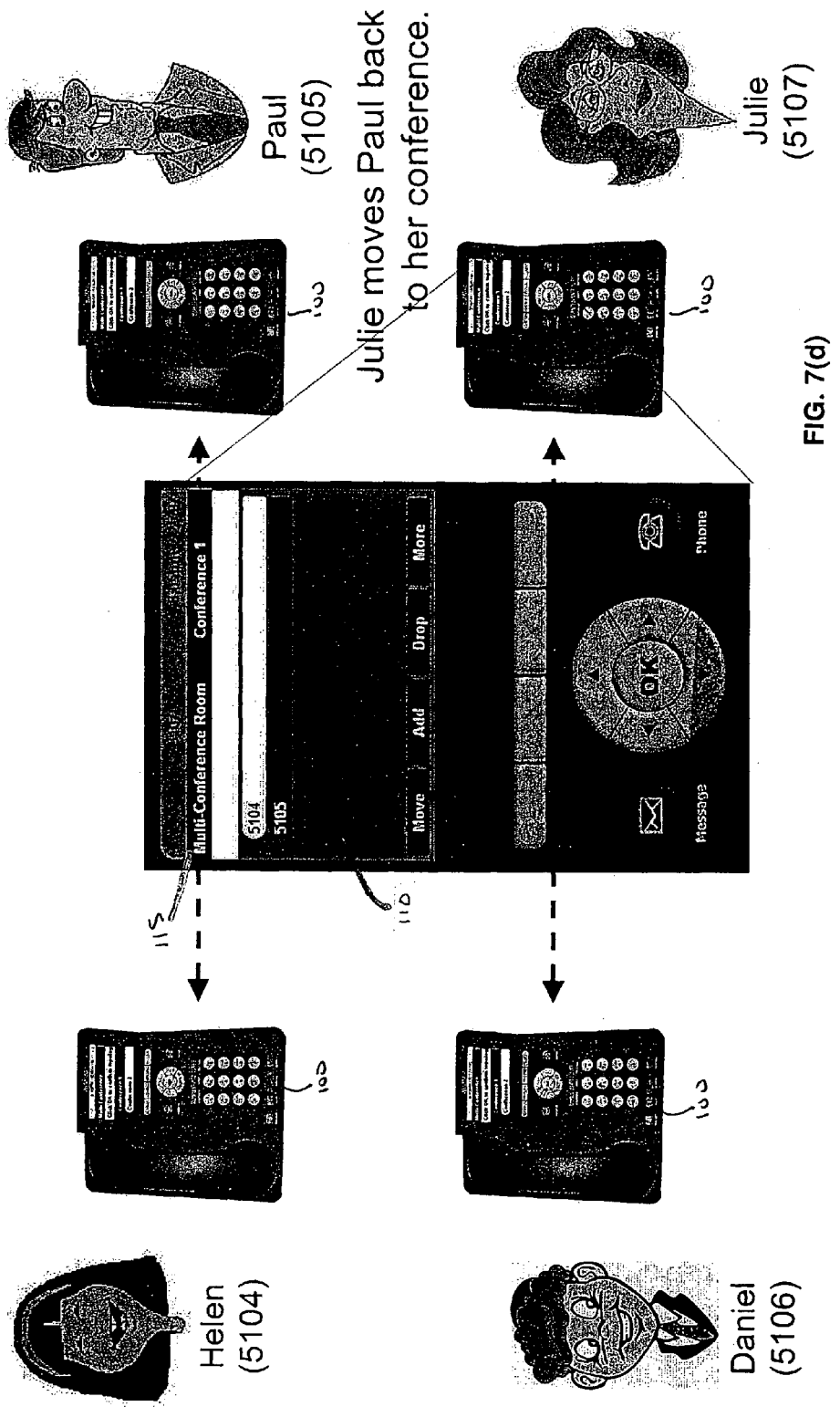
Figure 7E:
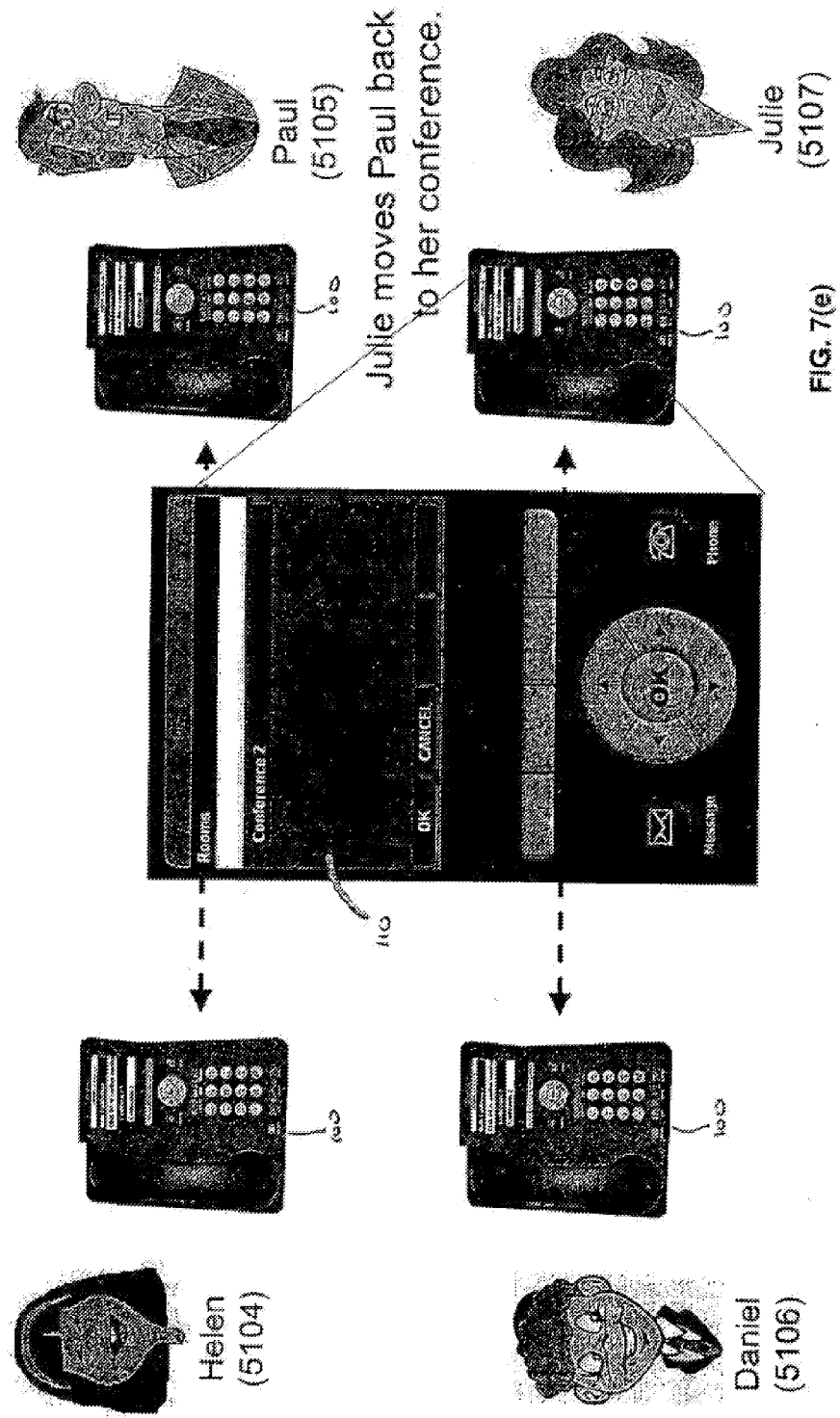
Figure 70:
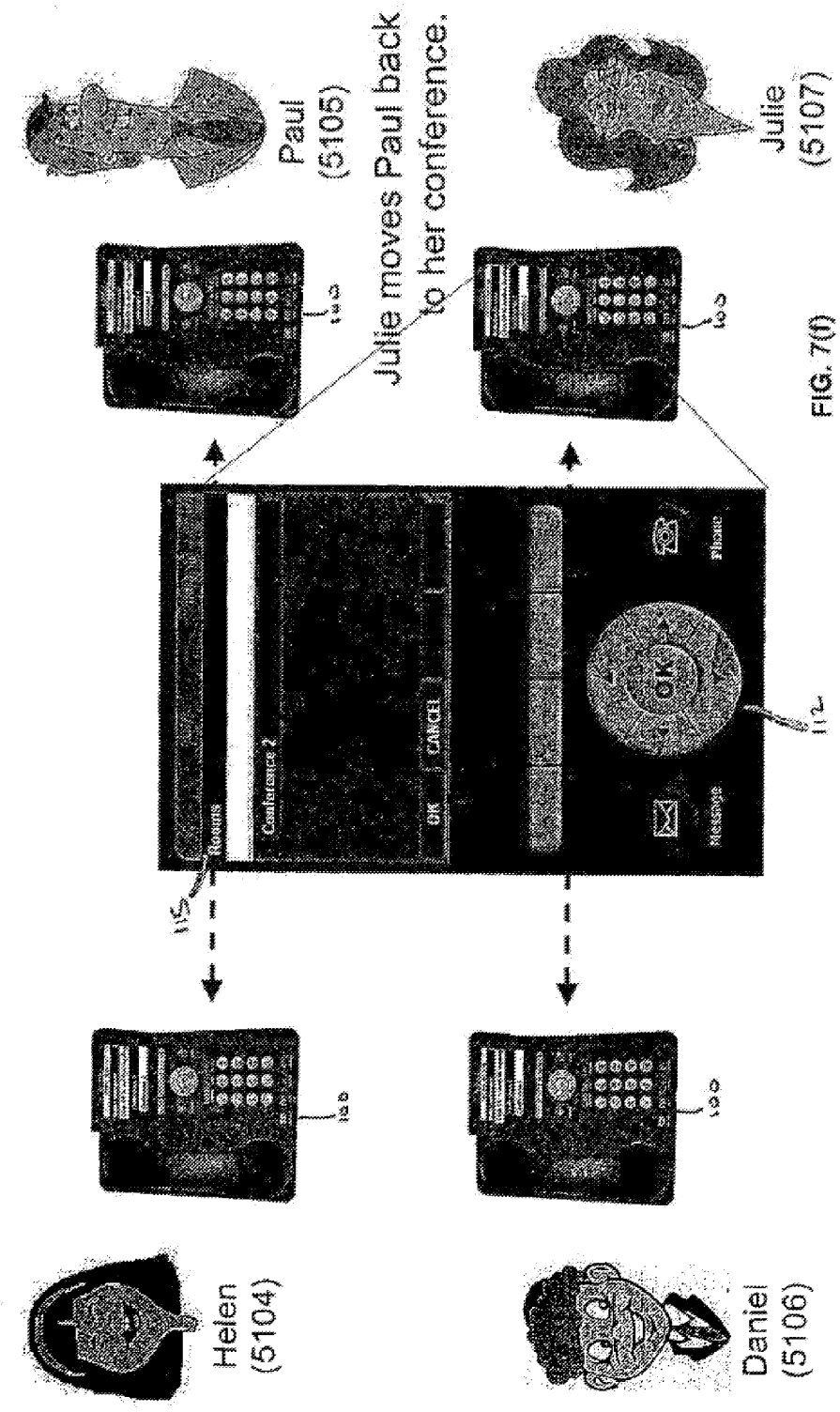
Figure 7G:
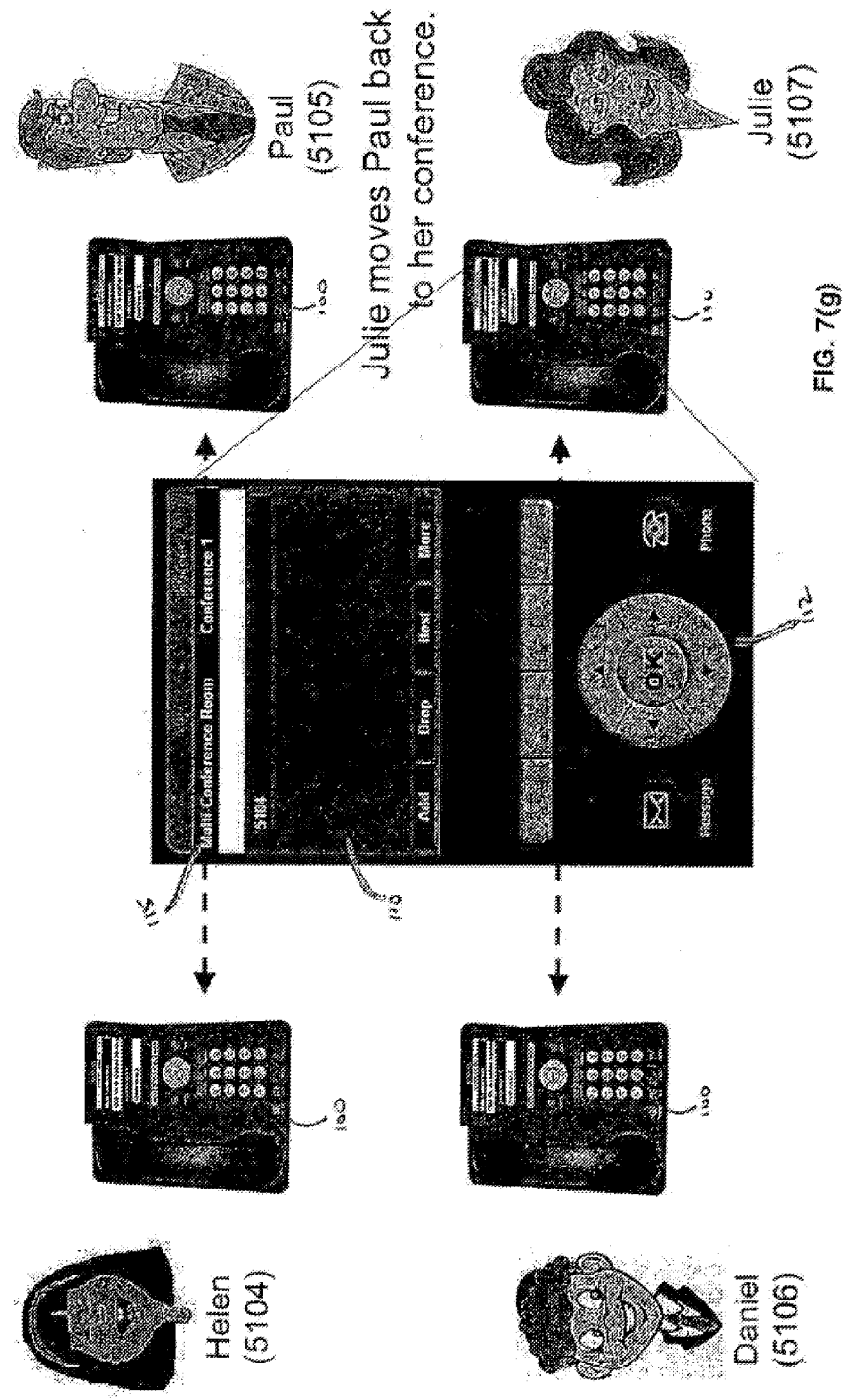
Figure 7H:
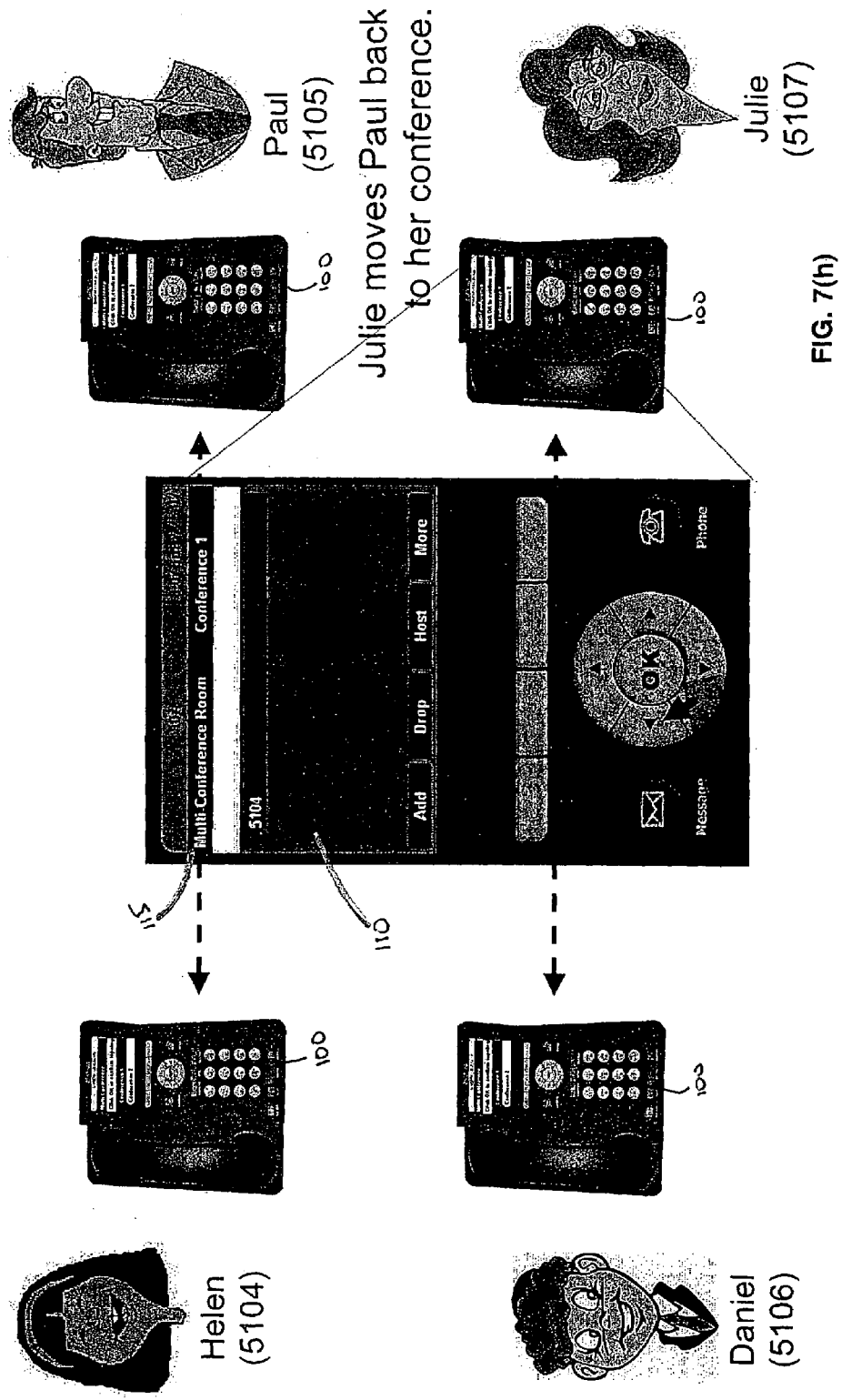

Finally, the apparatus or endpoint device 100 of the invention makes it possible to move participant P, who is involved in the conference call with participant H, into the conference call that participant J is involved in by selecting the image of participant P shown on the apparatus or endpoint device 100 of participant J, as shown in FIG. 7. Here, the endpoint device 100 at the location of participant J shows that participant P has been moved back into the conference call involving participant J, in accordance with the sequence illustrated by FIGS. 7(a) thru 7(k).

Figure 7K:
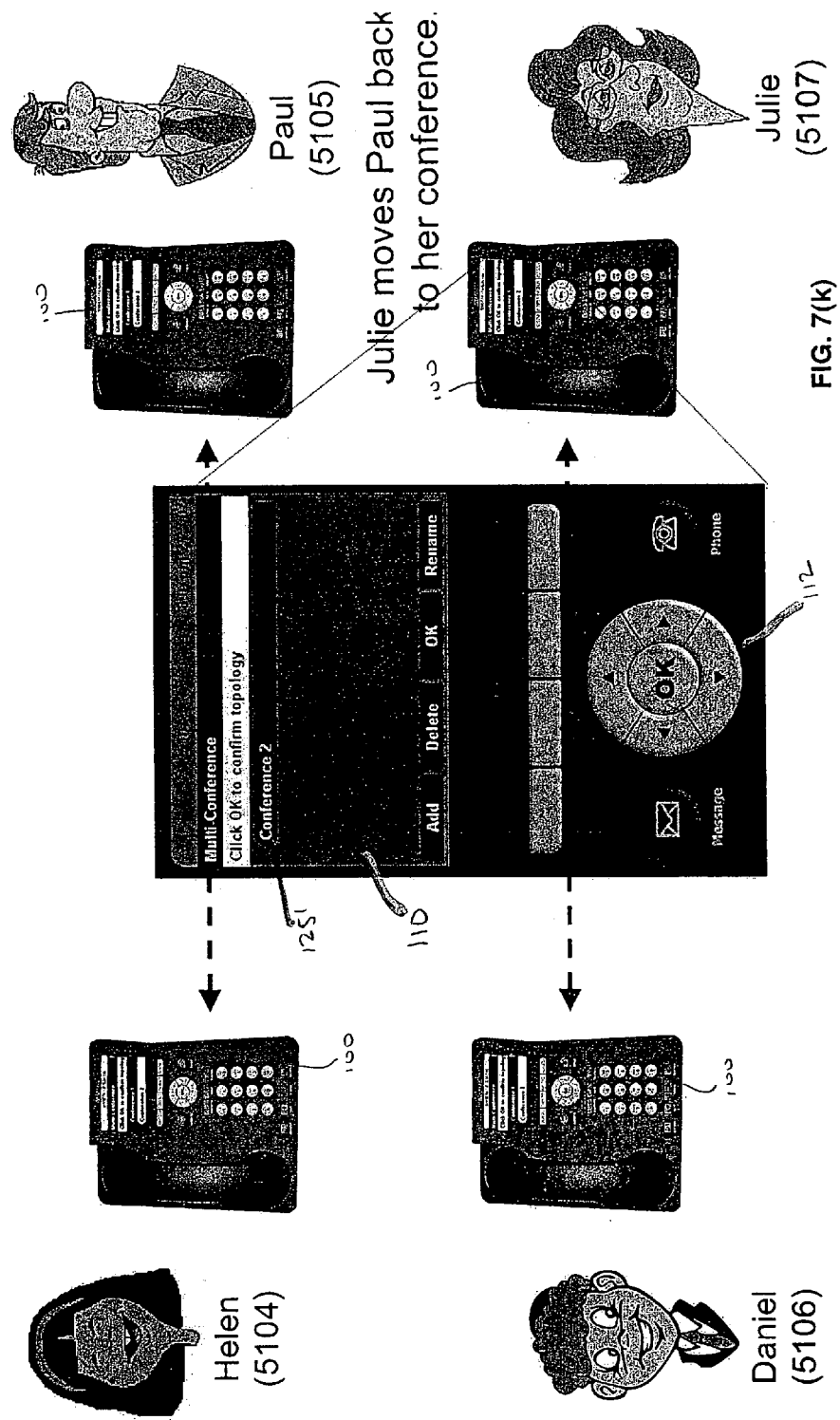

FIG. 7(k) is an exemplary illustration of the display area of the apparatus or endpoint device 100 provided to the users pursuant to moving participant P into the conference call that is created pursuant to the conference call move. With reference to the display 110 of the apparatus or endpoint device 100, participant J navigates and selects the Conference 2 section 125' using the thumb-dial mechanism 112.

Figure 8:
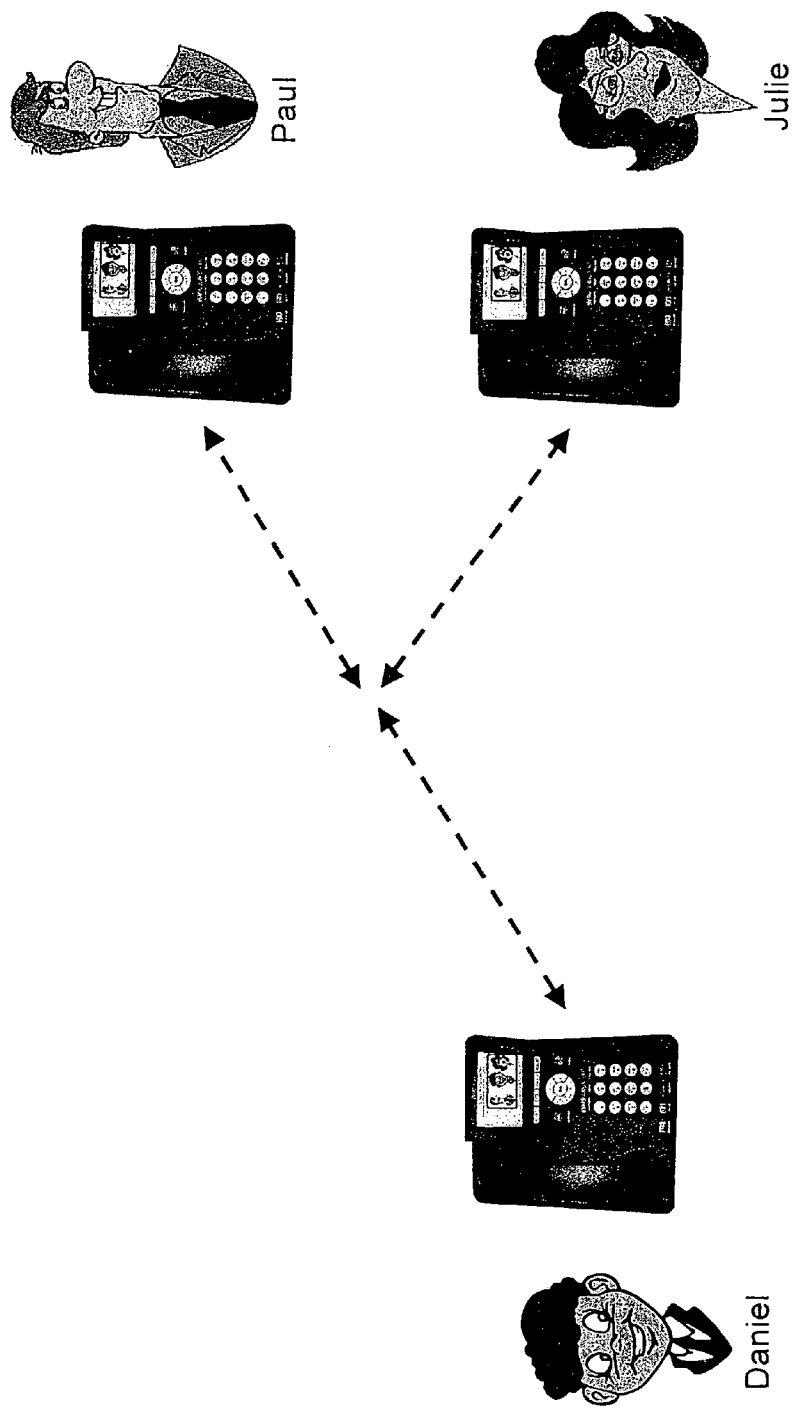
FIG. 8 is an exemplary graphical illustration of the conference call into which the participant has been moved.
Figure 8A:
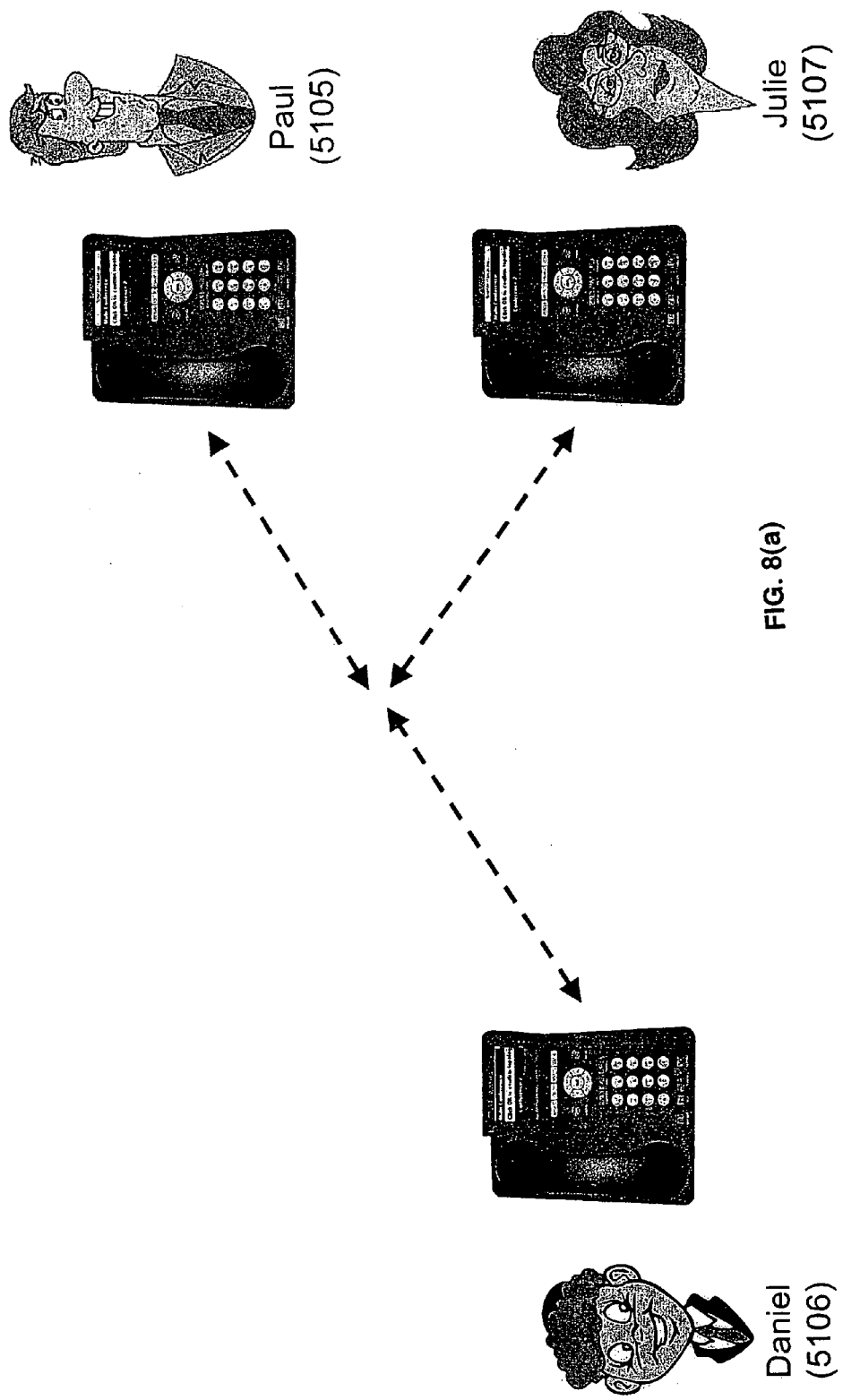
FIG. 8(a) an exemplary illustration of the display area of the apparatus or endpoint device provided to the users in the conference call into which the participant has been moved.

The movement of participant P into her call (e.g., the second conference call) occurs without having to move participant H into this conference call, who is leaving the conference to attend a meeting, and does so, as indicated in FIG. 8. The functions available to the participant in the second conference can be displayed in the display on the apparatus or endpoint device 100 of each of the conference call participants as shown in FIG. 8(a). It should be appreciated that participant H was the original initiator of the conference call. However, it is possible for a conference call to continue even though the originator of the conference call may leave the group.

Using the multi-conferencing capability of the present invention, permits the management of multiple conferences simultaneously, as well as the splitting and merging of conference calls is permitted. In addition, symmetric control at the various participating endpoints and a smooth transition of conference participants from one call to another is achieved.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for permitting a user to simultaneously manage multiple conference calls, comprising:
   a display positioned on a surface of the apparatus, said display providing an indication of available conferencing functions or a conference topology;
   a mechanism located on a body of the apparatus for permitting selection of the conferencing functions, the mechanism permitting navigation between the indicated available functions and the conference topology; and
   a plurality of keys arranged on the body of the apparatus for activating function indicators shown on the display, said function indicators being activated upon engagement of a corresponding one of said plural keys.

2. The apparatus of claim 1, wherein the mechanism is a thumb-dial mechanism.

3. The apparatus of claim 2, wherein the thumb-dial mechanism comprises a central button and a plurality of buttons that permit access and selection of conferencing functions displayed on the display, respectively.

4. The apparatus of claim 1, wherein the conferencing functions include at least one of a multi-conference indication section, a confirm topology indication section, a contacts indication section and a select contacts indication section.

5. The apparatus of claim 1, wherein the display includes a section for providing indicators of at least one of active and selectable conferences.

6. The apparatus of the claim 1, wherein the function indicators comprise at least one of conf, Add, Delete, Drop, Cancel, Host, Move, More, OK and Rename.

7. The apparatus of claim 1, wherein said conference topology provides an indication of who should form what part of each specific teleconference call.

8. The apparatus of claim 1, wherein each participant in a teleconference call manages their respective teleconference through their apparatus at their specific location by adjusting the teleconferencing topology.

9. The apparatus of claim 1, wherein the apparatus is a graphical user interface.

10. The apparatus of claim 9, wherein the graphical user interface comprises a telecommunications endpoint device.

11. The apparatus of claim 1, wherein the apparatus is a desktop device.

12. The apparatus of claim 10, wherein the telecommunications endpoint device is a desktop device.

13. The apparatus of claim 1, wherein the apparatus permits splitting of a teleconference call into multiple teleconference calls.

14. The apparatus of claim 13, wherein the display provides an indication that the teleconference has been split into multiple conference calls.

15. The apparatus of the claim 13, wherein the split conference call is the conference topology.

16. The apparatus of claim 1, wherein all participants in a conference call are displayed on the apparatus at a respective location of each participant in the conference call.

* * * * *